(12) United States Patent
Frank et al.

(10) Patent No.: US 9,224,175 B2
(45) Date of Patent: Dec. 29, 2015

(54) COLLECTING NATURALLY EXPRESSED AFFECTIVE RESPONSES FOR TRAINING AN EMOTIONAL RESPONSE PREDICTOR UTILIZING VOTING ON CONTENT

(71) Applicants: Ari M Frank, Haifa (IL); Gil Thieberger, Kiryat Tivon (IL)

(72) Inventors: Ari M Frank, Haifa (IL); Gil Thieberger, Kiryat Tivon (IL)

(*) Notice: Subject to any disclaimer, the term of this patent is extended or adjusted under 35 U.S.C. 154(b) by 0 days.

(21) Appl. No.: 14/521,894

(22) Filed: Oct. 23, 2014

(65) Prior Publication Data

US 2015/0039405 A1 Feb. 5, 2015

Related U.S. Application Data

(63) Continuation of application No. 14/052,759, filed on Oct. 13, 2013.

(60) Provisional application No. 61/713,566, filed on Oct. 14, 2012, provisional application No. 61/713,564, filed on Oct. 14, 2012, provisional application No. 61/713,567, filed on Oct. 14, 2012, provisional application No. 61/713,568, filed on Oct. 14, 2012.

(51) Int. Cl.
*G06F 15/18* (2006.01)
*G06Q 50/00* (2012.01)
*G06N 99/00* (2010.01)
*G06Q 10/00* (2012.01)
*H04N 21/442* (2011.01)

(52) U.S. Cl.
CPC ............. *G06Q 50/01* (2013.01); *G06N 99/005* (2013.01); *G06Q 10/00* (2013.01); *H04N 21/44218* (2013.01)

(58) Field of Classification Search
None
See application file for complete search history.

(56) References Cited

U.S. PATENT DOCUMENTS

| | | |
|---|---|---|
| 5,926,210 A | 7/1999 | Hackett et al. |
| 6,585,521 B1 | 7/2003 | Obrador |
| 6,622,140 B1 | 9/2003 | Kantrowitz |
| 7,271,809 B2 | 9/2007 | Fedorovskaya |
| 7,379,560 B2 | 5/2008 | Bradski et al. |
| 7,848,729 B2 | 12/2010 | Lim et al. |
| 7,983,701 B2 | 7/2011 | Bell et al. |
| 8,037,011 B2 | 10/2011 | Gadanho et al. |
| 8,043,209 B2 | 10/2011 | Horn |
| 8,224,431 B2 | 7/2012 | Drew |

(Continued)

OTHER PUBLICATIONS

"Multimodal Emotion Recognition in Response to Videos", by Soleymani, M. et al. IEEE Transactions on Affective Computing, vol. 3, No. 2, Apr.-Jun. 2012, pp. 211-223.

*Primary Examiner* — Kakali Chaki
*Assistant Examiner* — Viker Lamardo
(74) *Attorney, Agent, or Firm* — Active Knowledge Ltd.

(57) ABSTRACT

Described herein are systems, methods, and computer program products for collecting naturally expressed affective responses for training an emotional response predictor utilizing voting on content. In one embodiment, a label generator is configured to receive a vote, provided by a user, on a segment of content consumed by the user. The label generator determines whether the user consumed the segment during a duration that is shorter than a predetermined threshold, and utilizes the vote to generate a label related to an emotional response to the segment. A training module receives the label and measurement of an affective response of the user taken, at least in part, during a period that starts at most 30 seconds before the vote is provided, and trains the emotional response predictor with the measurement and the label.

20 Claims, 11 Drawing Sheets

(56) References Cited

U.S. PATENT DOCUMENTS

| | | |
|---|---|---|
| 8,494,982 B2 | 7/2013 | Jung et al. |
| 8,751,418 B1 * | 6/2014 | Sutter et al. .................... 706/12 |
| 8,768,863 B2 | 7/2014 | Gubin et al. |
| 8,775,418 B2 * | 7/2014 | Poon ............................ 707/723 |
| 2002/0120925 A1 | 8/2002 | Logan |
| 2003/0037333 A1 | 2/2003 | Ghashghai et al. |
| 2006/0041926 A1 | 2/2006 | Istvan et al. |
| 2006/0149693 A1 * | 7/2006 | Otsuka et al. ................... 706/20 |
| 2006/0232287 A1 | 10/2006 | Stemer et al. |
| 2007/0066916 A1 | 3/2007 | Lemos |
| 2007/0245375 A1 | 10/2007 | Tian et al. |
| 2007/0260596 A1 * | 11/2007 | Koran et al. ..................... 707/5 |
| 2007/0263978 A1 * | 11/2007 | Yang et al. ..................... 386/52 |
| 2008/0082352 A1 * | 4/2008 | Schmidtler et al. ............... 705/1 |
| 2008/0169930 A1 | 7/2008 | Mallinson et al. |
| 2009/0117922 A1 | 5/2009 | Bell et al. |
| 2009/0150082 A1 | 6/2009 | Kang et al. |
| 2009/0234200 A1 | 9/2009 | Husheer |
| 2009/0234718 A1 | 9/2009 | Green |
| 2010/0106220 A1 | 4/2010 | Ecker et al. |
| 2011/0087483 A1 | 4/2011 | Hsieh et al. |
| 2012/0190339 A1 | 7/2012 | Abe et al. |
| 2012/0221317 A1 | 8/2012 | Hwang |
| 2012/0246261 A1 | 9/2012 | Roh et al. |
| 2012/0290515 A1 * | 11/2012 | Frank et al. .................... 706/12 |
| 2013/0053656 A1 | 2/2013 | Mollicone et al. |
| 2013/0102852 A1 | 4/2013 | Kozloski et al. |
| 2013/0137076 A1 | 5/2013 | Perez et al. |
| 2013/0204664 A1 | 8/2013 | Romagnolo et al. |

* cited by examiner

COLLECTING NATURALLY EXPRESSED AFFECTIVE RESPONSES FOR TRAINING AN EMOTIONAL RESPONSE PREDICTOR UTILIZING VOTING ON CONTENT

BACKGROUND

One development which is changing the way humans and computers interact is the growing capability of computer systems to detect how their users are feeling. A growing number of computer applications utilize their users' affective response, as expressed via sensor measurements of physiological signals and/or behavioral cues, in order to determine the users' emotional responses. This capability enables such applications, often called affective computing applications, to determine how users feel towards various aspects of interactions between the users and computer systems.

Users often spend a lot of time interacting with computer systems through various platforms (e.g., desktops, laptops, tablets, smart phones). Through numerous interactions with computer users may be exposed to a wide array of content: communications with other users (e.g., video conversations and instant messages); communications with a computer (e.g., interaction with a user's virtual agent), and/or various forms of digital media (e.g., internet sites, television shows, movies, and/or interactive computer games). One environment in which users both spend large amounts of time and are exposed to large quantities of digital content is social networks of various types (e.g., Facebook™, Google+™, Twitter™, Instagram™, Reddit™). Such networks provide users with diverse content, often selected for the user and/or originating from people who know the user; hence, the attraction many users have to social network sites.

Throughout the many interactions a user may have, affective computing systems can measure the user's affective response to content the users consume, and analyze the information. This can enable the affective computing applications to improve the user experience, for example by selecting and/or customizing content according to the user's liking.

A factor upon which the success of affective computing applications often hinges, is the availability of models that can be used to accurately translate affective response measurements into corresponding emotional responses. Creating such models often requires the collection of ample training data, which includes samples taken from similar situations to ones with which the models are to be used in. For example, the samples for training may include a pair of (i) affective response measurements obtained by measuring a user with sensor, and (ii) labels describing the emotional response of the user while the measurements were taken. The samples may then be utilized, for instance by machine learning methods, in order to create a model for predicting emotional response from affective response measurements.

A general principle often observed when creating models from data is that the more data available, the more accurate the models crated from it become. In addition, the more similar the training data is to the instances on which the model is to be used, the more accurate the predictions using the model are likely to be.

For example, a model that predicts emotional response from facial expression is trained on a set of samples that include images of faces coupled with a label describing the emotion expressed in the images. Generally, such a model would be better if trained on a large set of samples that capture a diverse set of faces and emotions, rather than a significantly smaller set of samples that capture a much limited set of faces and emotions. In addition, if used to predict emotions from a face of a specific user, the model would be better if at least some of the training samples involved the specific user; this could help the model account for unique characteristics such as the shape of the user's face, specific mannerisms, and/or types of facial expressions. Furthermore, if used primarily in day-to-day situations, the model would probably perform better if trained on samples acquired spontaneously during the day-to-day situations rather than samples acquired in a controlled non-spontaneous manner. The conditions of the spontaneous day-to-day samples (e.g., environment, background, lighting, angle of view) might be significantly different from settings in controlled sample acquisition (e.g., when the user sits down and is prompted to express emotions). In addition, the expressions of emotion in day-to-day scenarios are likely to be more genuine than the ones expressed in controlled sample acquisition. For instance, facial expressions (such as micro expressions) are difficult to create accurately on demand; and thus, may not be the same as the spontaneous expressions.

One of the problems with collecting samples of affective response corresponding to spontaneous expressions of emotions in day-to-day scenarios is that it is often difficult to collect such data. It is not always possible to know when the spontaneous expression of emotion are likely to occur, and when expressions of emotion occur, it is not always possible to tell what the circumstances are and/or what type of emotion is expressed. Thus, collecting such training data may require a certain amount of manual curation in order to determine what type of emotion is expressed, if any. This may become impractical on a large scale, such as when collecting a large body of training data for a user and/or collecting data for a large group of users. In addition, it may inconvenience users, for instance, if they need to be actively involved in selecting the samples by providing appropriate labels to the samples. Collecting such samples may also violate user privacy; for example, if other entities get to examine the measurements and/or aspects of the users' day-to-day lives in order to generate the required training samples.

These aforementioned limitations emphasize a need to create an automated method for collecting samples that include measurements of a user's affective responses coupled with labels describing the user's corresponding emotional response.

BRIEF SUMMARY

To meet the described need, some aspects of this disclosure involve systems and/or methods that enable automated generation of samples for training models that may be used to predict a user's emotional response from the user's affective response. Some of the methods and/or systems described herein utilize the fact that users consume a lot of content on social networks. During the consumption of the content, the users often take explicit actions which indicate how they feel about the content. In particular, users may perform acts that can be conceived as explicit voting on the content, such as "liking" or "disliking" content (e.g., by pushing a "like" button related to the content), up- or down-voting content, and/or rating content (e.g., by providing a numerical or star rating for content). An explicit vote of a user on content can often be indicative of the user's emotional response to the content. For example, a user that presses a "like" button after reading a status update was probably happy and/or content while reading the update. In another example, a user that gives a video clip a "thumbs down" on YouTube most likely had a negative emotional response to the clip. Additionally or alternatively, users may comment on content (e.g., comment on an image or status update on Facebook). The comments can be analyzed, e.g., using semantic analysis, in order to determine the emotion expressed in the comment. This emotion is likely the emotion felt by the user while consuming the content.

During the time the user consumes content, the user may be monitored with sensors in order to measure the user's affective response. When an explicit vote is cast by the user, the system may select and set aside affective response measurements occurring in a certain window of time corresponding to the vote (e.g., a short window essentially ending when the vote is cast). In addition, the expected emotional response that corresponds to the vote may also be noted. This enables automatic generation of a sample that includes affective response measurement values and a label representing the emotional response. As opposed to an artificial sample, generated by prompting the user to react in a specific way, the systems and/or methods described herein are able to collect genuine samples of expression of a user's emotions. Furthermore, these genuine samples are collected in day-to-day situations, while the user consumes content that often interests him/her and/or content that was generated and/or chosen by a person with which the user may have an emotional connection; thus, the samples collected are likely to represent genuine emotional responses of the users.

Some embodiments include a label generator. The label generator is configured to receive a vote cast by a user on a voting mechanism utilized by a social network. The vote is related to a segment of content from the social network that the user consumed. The label generator generates a label based on the vote, which indicates a likely emotional response of the user to the content. Optionally, the label describes the emotions related to a certain thought or feeling the user had, which might have led the user to cast the vote. Optionally, the labels generated by the label generator may describe the votes themselves, such as "like" or "2/5 stars".

Some embodiments include a training module. A label generated by the label generator based on a vote the user casts on a segment of content may be provided to the training module. The training module may also receive, and optionally buffer, affective response measurements of the user taken by a sensor essentially while the segment of content is consumed. Optionally, the measurement values are processed before being used by the training module; for example, they may undergo filtering, signal processing, and/or feature extraction. The one or more measurement values and the label are utilized by the training module to create a sample that may be used to train a model for predicting emotional response from measurements of affective response.

In one embodiment, a system is configured to collect naturally expressed affective responses for training an emotional response predictor. The system includes a label generator that is configured to receive a vote of a user on a segment of content consumed by the user on a social network. The vote is generated via a voting mechanism belonging to the social network. The label generator is further configured to utilize the received vote to generate a label related to an emotional response to the segment. The system also includes a training module that is configured to receive the label and an affective response measurement of the user taken substantially while the user consumes the segment of content, and train a measurement emotional response predictor with the measurement and the label.

In one embodiment, a method for collecting naturally expressed affective responses for training an emotional response predictor includes several steps. One step involves receiving a vote of a user on a segment of content consumed by the user on a social network. The vote is generated via a voting mechanism belonging to the social network. Another step involves utilizing the received vote for generating a label related to an emotional response to the segment. And another step involves training a measurement emotional response predictor with the generated label and an affective response measurement of the user taken substantially while the user consumes the segment of content.

In one embodiment, a system is configured to collect naturally expressed affective responses for training an emotional response predictor. The system includes a label generator that is configured to receive a vote of a user on a segment of content to which the user was exposed for a duration shorter than one minute. The segment is consumed by the user on a social network, and the vote is generated via a voting mechanism belonging to the social network. The label generator is further configured to utilize the received vote to generate a label related to an emotional response to the segment. The system also includes a training module that is configured to receive the label and an affective response measurement of the user taken substantially while the user consumes the segment of content, and train a measurement emotional response predictor with the measurement and the label.

BRIEF DESCRIPTION OF THE DRAWINGS

The embodiments are herein described, by way of example only, with reference to the accompanying drawings. In the drawings.

DETAILED DESCRIPTION

Figure 1:
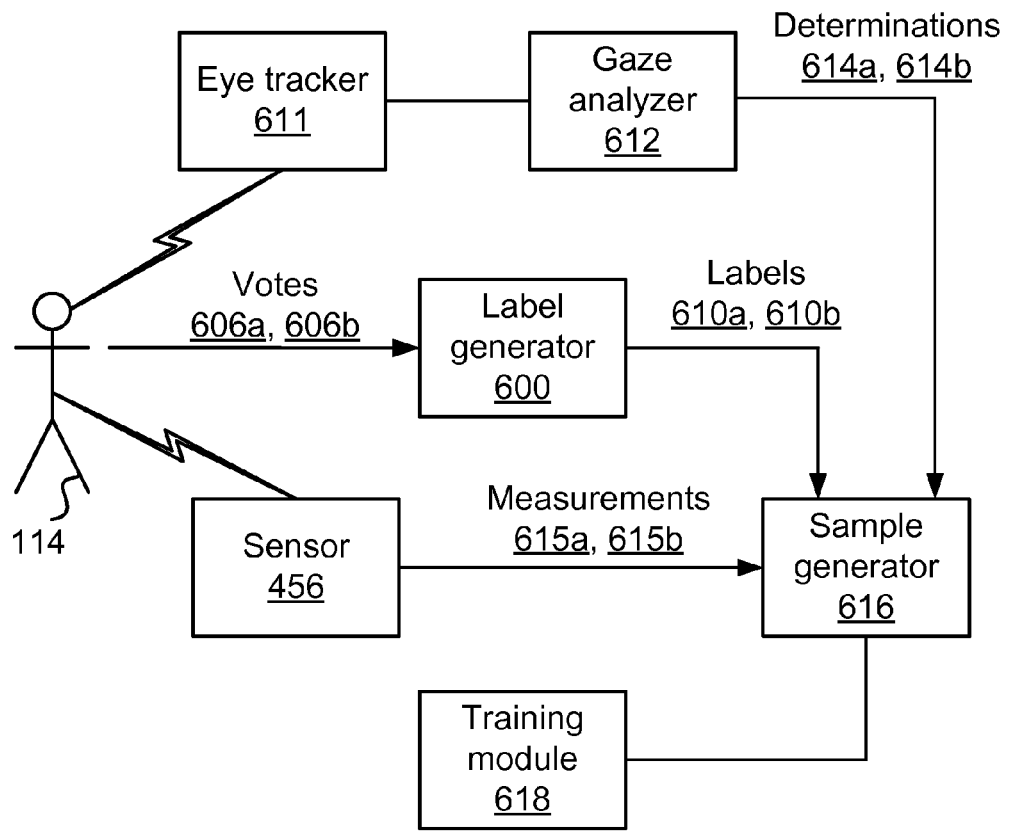
FIG. 1 illustrates one embodiment of a system configured to utilize eye tracking for collecting a naturally expressed affective response for training an emotional response predictor.

FIG. 1 illustrates one embodiment of a system configured to utilize eye tracking for collecting a naturally expressed affective response for training an emotional response predictor. The system includes at least a label generator 600, a gaze analyzer 612, and a sample generator 616.

In some embodiments, a user 114 interacts with a computer system and consumes content (e.g., by reading a post, viewing a clip, and/or conducting a conversation). Optionally, at least some of the content consumed may be from a social network 602, and/or at least some of the content may be consumed via the social network (e.g., content may be presented on a website, and/or application belonging to the social network 602). Alternatively or additionally, at least some of the content consumed by the user may be from a source other than the social network 602.

During the user's interaction with the computer system, the user 114 may perform an action that may be interpreted as casting a vote on a segment of content consumed by the user. Optionally, the action interpreted as casting a vote is done while the user consumes the segment of content. Optionally, the action is done shortly after consuming the segment of content (e.g., within 10 seconds after the end of consumption), so the user is still likely to have an emotional response to the content at the time of voting.

There are various types of voting mechanisms a user 114 may utilize when casting a vote regarding a segment of content consumed by the user 114. In one example, the user 114 may express that he/she likes or dislikes content, e.g., that allows the user to push "like" or "dislike" buttons, up-vote or down-vote buttons, and/or a "+1" button. In another example, the user 114 may cast a vote by providing an explicit rating (e.g., entering a star rating such as on a scale from 1 to 5 stars). In yet another example, the user may cast a vote via a voting mechanism that allows the user to rank or order content items (e.g., arrange the items from most to least liked). Optionally, a voting mechanism 604 comprises on or more of the aforementioned methods for voting. Optionally, the voting mechanism 604 belongs to the social network 602. Optionally, the voting mechanism 604 is offered substantially independently of whether the votes are used to trigger the sensor to acquire affective response measurements; for example, by measuring the user with the sensor. Optionally, the acquired measurements may be considered measurements of naturally expressed affective response since the user was not requested to supply them, rather, the affective response in this case is a natural physiological and/or behavioral product.

In one embodiment, voting may involve a microphone and/or a camera that may analyze the users reactions to the content to detect explicit cues that may be considered votes. It is to be noted, that the user in this embodiment is aware that he/she is being monitored by a system that may interpret behavior as votes on content. Optionally, the system comprising a microphone and/or a camera are part of the voting mechanism 604.

In one embodiment, the user 114 may vote by speaking or making a gesture that is interpreted by a computer as an explicit opinion regarding a segment of content consumed by the user 114. In one example, the user may say to the computer and/or to another person: "what a nice picture" or "that was cool!". In another example, the user may make a "thumbs up" gesture (which is detected by a camera). Such actions may be considered as positive votes. In another example, if the user 114 has a reaction like saying to a computer "that was terrible! don't show stuff like that again" or makes a "thumbs down" gesture, that may be considered a negative vote.

The label generator 600 is to receive the votes of the user on segments of content consumed by the user 114. Optionally, the segments are generated by the social network 602 and/or are located on the social network 602 (e.g., the segments are content generated by friends of the user on the social network 602).

In one embodiment, a label, such as the label 610, 610a, and/or 610b, may be indicative of an emotional response, likely felt by the user 114, which is related to a vote. For example, if the vote is positive such as a "like", an up-vote, a "+1", or high rating (e.g., 5/5 stars), the label may represent a positive emotional response such as content, excitement, and/or happiness. If the vote is negative such as a "dislike", down-vote, low rating, and/or low ranking, the label may represent a negative emotional response, such as discontent, boredom, and/or uneasiness. Alternatively or additionally, the label may include information conveyed in the vote itself, such as the rating, ranking, and/or button pushed in the vote (e.g., the label may be "like" or "dislike").

In another embodiment, a label, such as the label 610, 610a, and/or 610b, may reflect details of a response of the user to a segment of content as part of the vote. In one example, the label may include an expression used by the user to describe the content, which was provided as part of the voting (e.g., expressions like "cute", "awesome", "ugly", "hated it"). In another example, the label may include a description of a reaction of the user to the content which was identified and utilized by the voting mechanism to generate the vote (e.g., reactions like "smile", "thumbs up gesture", "yawn").

In one embodiment, the label generator 600 is configured to receive a first vote 606a, and a second vote 606b of a user 14 on first and second segments of content consumed by the user, respectively. That is the first vote 606a is related to the first segment, and the second vote is related to the second segment. Optionally, the first and second votes 606a and 606b are received shortly after they are cast (e.g., within 10 seconds from being cast). Optionally, the first and second votes 606a and 606b are received separately. Alternatively, the first and second votes 606a and 606b are received together (e.g., in a batch of multiple votes).

The label generator 600 is also configured to utilize the first and second votes 606a and 606b to generate first and second labels 610a and 610b related to first and second emotional responses to the first and second segments. That is, the first vote 606a is utilized to generate the first label 610a, related to the first emotional response to the first segment, and the second vote 606b is utilized to generate the second label 610b, related to the second emotional response to the second segment.

Herein, a first segment of content and a second segment of content, are not necessarily segments of the same content item. For example, the first segment may be a clip from a first movie, and the second segment may be a clip of a second, different, movie. In another example, the first segment a portion of a music video, and the second segment is a different type of content, such as a web page. Optionally, the first and second segments are different segments of the same content. For example, the first segment and the second segment may be first and second scenes in the video clip.

Figure 2:
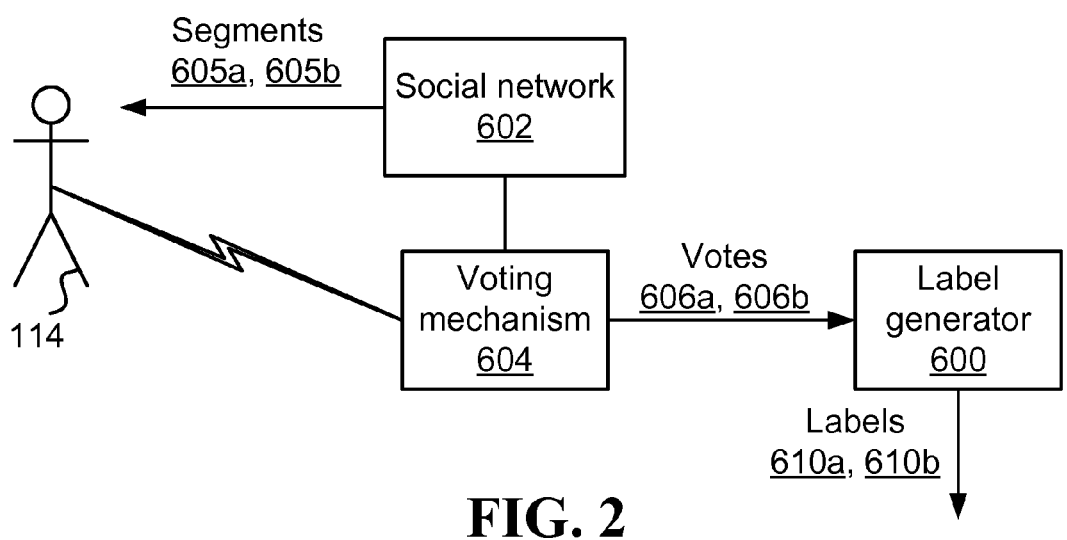
FIG. 2 illustrates one embodiment including a social network and a voting mechanism of the social network.

FIG. 2 Illustrates one embodiment in which the user 114 votes via the voting mechanism 604 belonging to the social network 602. The user 114 consumes a first segment 605a of content and a second segment 605b of content. Utilizing the voting mechanism 604 (e.g., up- and down-voting buttons on a website of the social network 602), the user 114 provides the first vote 606a related to the first segment 605a, and the second vote 606b related to the second segment 605b. The first and second votes 606a and 606b are communicated to the label generator 600, which generates the corresponding first and second labels 610a and 610b.

The gaze analyzer 612 is configured to receive eye tracking data of the user 114. Optionally, the eye tracking data is acquired by an eye tracker 611. Optionally the eye tracking data of the user corresponding to a segment of content is acquired while the user 114 consumes the segments of content. Optionally, eye tracking data of the user 114 corresponding to a certain segment of content is acquired essentially during exposure of the user to the segment.

In one example, by "essentially during" it is meant that most of the duration during which the eye tracking data was acquired overlaps with when the user was exposed to the certain segment. In another example, by "essentially during" it is meant that the eye tracking data was acquired during the exposure, or during a period starting shortly before the exposure (e.g., shortly before may be up to 15 seconds before). Thus, the eye tracking data may reflect a condition of the user 114 during the time of exposure to a segment of content, in particular it may be determined if the user is paying attention to the segment and/or a display via which the user is exposed, or is to be exposed, to the segment.

In one embodiment, the gaze analyzer 612 is configured to receive first eye tracking data of the user 114 acquired while the user consumed the first and second segments. That is the first eye tracking was acquired while the user consumed the first segment, and the second eye tracking data was acquired while the user consumed the second segment. Optionally, the first and second eye tracking data are acquired by the eye tracker 611. Optionally, the first and second eye tracking data may undergo processing, such as filtration, normalization, and/or feature extraction. Optionally, processing the first and second eye tracking data may involve analysis of the eye tracking data to determine for different times directions of gaze of the user and/or objects the user was looking at. Optionally, at least some of the processing of the eye tracking data is performed by gaze analyzer 612. Alternatively or additionally, at least some of the processing is performed by the eye tracker 611. Additionally or alternatively, at least some of the processing is performed by an external module, such as a cloud-based server running analysis software. Additional information regarding eye tracking and computing the gaze-based attention level is given below.

The gaze analyzer 612 is also configured to determine from eye tracking data it receives whether a gaze-based attention level, computed from the eye tracking data, reached a predetermined threshold. Optionally, the gaze analyzer 612 may indicate to other modules, such as the sample generator 616, whether the predetermined threshold was reached. Optionally, a gaze-based attention level, computed from eye tracking data acquired while the user 114 consumed a segment of content, may correspond to an attention level of the user to the content. Optionally, this information may be utilized in order to determine whether it a vote a user cast to the content is likely to reflect the user's affective response: if the user is not paying attention to the content, then an affective response measurement taken at that time may not actually correspond to a vote cast by the user on the content consumed at that time.

In one embodiment, the gaze analyzer 612 is configured to make a first determination 614a, from the first eye tracking data, that a gaze-based attention level to the first segment reaches a first predetermined threshold, and may optionally indicate to the sample generator 616 thereof (i.e., convey the determination 614a). Additionally, the gaze analyzer 612 is configured to make a second determination, from the second eye tracking data, that a gaze-based attention level to the second segment does not reach a second predetermined threshold, and may optionally indicate to the sample generator 616 thereof (i.e., convey the determination 614b). Optionally, indicating to the sample generator 616 is done by directly sending the sample generator 616 a message. Additionally or alternatively, information regarding the determination 614a and/or the determination 614b, may be conveyed by the gaze analyzer to one or more intermediates, which communicate the information to the sample generator 616.

Herein, by stating that a value reaches a predetermined threshold, it is meant that the value equals or exceeds the predetermined threshold. In addition, a predetermined threshold to which a value a measurement of affective response is compared, refers to a value of which there is prior knowledge. For example, the threshold value itself is known and/or computed prior to when the comparison is made. Additionally or alternatively, a predetermined threshold may utilize a threshold value that is computed according to logic (such as function) that is known prior to when the comparison is made.

In one embodiment, the first predetermined threshold and the second predetermined threshold may represent different thresholds. For example, reaching the first predetermined threshold is based on achieving different value than is required to pass the second predetermined threshold. Thus, there may be cases in which a certain value may reach the first predetermined threshold, but not reach the second predetermined threshold. Alternatively, in another embodiment, the first predetermined threshold and the second predetermined threshold may represent essentially the same predetermined threshold. Thus, in this embodiment, a value that reaches the first predetermined threshold also reaches the second predetermined. Similarly, in this embodiment, a value that does not reach the first predetermined threshold also does not reach the second predetermined threshold.

In one embodiment, a predetermined threshold, such as the first or second predetermined thresholds, has a fixed value. For example, the predetermined threshold may be 50%, representing that a user eye tracking data should indicate that the user looked at the content for at least half of the time. In another example, the predetermined threshold may be 7, and represent the fact that a user's gaze-based attention level, as determined by a certain function that computes gazed-based attention level from eye tracking data on a scale of 1 to 10, is 7 or more.

In another embodiment, when a predetermined threshold is computed various factors may be taken into account, such as the length of the duration during which eye tracking data was acquired, the type of content the use was exposed to, and/or characteristics of the user and/or the environment. Thus, based on one or more of these factors, the predetermined threshold may represent lower or higher degrees of required attention in order for the predetermined threshold to be considered reached. In one example, a longer duration in which eye tracking is acquired may lead to a decrease in a predetermined threshold that represents a percentage of time a user looks at the content; it may be difficult in some situations to continually look at content (e.g., when outside in the company of other people), so the threshold can be relaxed in such situations. In another example, the predetermined threshold used with a user that is a child may be lower than that of an adult, since for some children, it is more difficult to stay concentrated for long. In another example, the predetermined threshold used with content that is a commercial may be lower than the predetermined threshold used for content that is a movie or television program, since users tend to pay less attention to commercials (though often measurements in these situations are desired). In still another example, the type of display on which content is consumed may influence the predetermined threshold. For instance, a display that is head-mounted (e.g., an augmented reality display) may have a different, possibly higher, predetermined threshold associated with it, compared to a display on a smartphone, since content on an augmented reality display may be more clear and easy to see if the user desires to look at it.

The gaze analyzer 612 may indicate to the sample generator 616 the first determination 614a and/or the second determination 614b. There may be different ways in which the gaze analyzer 612 may convey the determination 614a and/or 614b. In one example, the gaze analyzer 612 signals (e.g., via a message communicated to the sample generator 616) the determinations 614a and/or 614b. For example, the signal may convey a value that describes if the gaze-based attention level reached the threshold, and/or the actual gaze-based attention level and/or the difference between the gaze-based attention level and the threshold. In another example, the gaze analyzer 612 sends a signal to the sample generator 616 when the gaze-based attention level reaches the threshold, and if no signal is sent, the sample generator 616 operates under the assumption that the gaze-based attention did not reach the threshold. Alternatively, the gaze analyzer 612 may send a signal to the sample generator 616 when the gaze-based attention does not reach the threshold, and if no signal is sent, the sample generator 616 operates under the assumption that the gaze-based attention reached the threshold.

In one embodiment, the gaze analyzer 612 communicates to other modules in the system such as the sample generator 616 and/or a training module durations during which the user 114 was not paying sufficient attention; for example, durations during which a gaze-based attention level of the user 114 was below a predetermined threshold. Optionally, the gaze analyzer communicates the gaze-based attention level, and other modules determine whether the gaze-based attention level reaches the predetermined threshold.

The sample generator 616 is configured to receive measurements of the user 114 taken substantially while the user 114 consumed segments of content. Additionally, the sample generator may receive labels generated by votes made by the user 114 on the segments of content. The sample generator 616 may utilize a measurement of the user taken substantially while the user 114 consumed a segment of content, and pair it with a label generated from a vote on the segment in order to generate a sample. Optionally the sample may be utilized by a training module 618 in order to train a measurement ERP (Emotional Response Predictor). Optionally, the sample generator may generate a sample comprising only measurements (an unlabeled sample), and/or a sample that includes a label that was not generated by a vote (e.g., the label is predetermined and/or determined from analysis of the content). Optionally, a label not generated by a vote may be a label generated using a content ERP (Emotional Response Predictor).

In one embodiment, the affective response measurements of the user 114 are taken substantially while the user consumes the segments of content on which the user 114 casts the votes. The affective response measurements of the user 114 may be provided by a sensor 456 coupled to the user 114. For example, the sensor 456 may be a physiological sensor (e.g., a sensor that measures heart rate, galvanic skin response, and/or brainwave activity), and/or a sensor that measures the user's behavior (e.g., a camera and/or a motion detector). In one example, a measurement taken "substantially while" consuming a segment means that the measurement is taken during a time that overlaps with when the user consumed the content, e.g., the starting time of taking the measurement is before the ending of consumption of the segment and/or the ending time of taking the measurement is after the beginning of the consumption of the segment. In another example, "substantially while" means within a short time period from exposure to the segment. For example, the measurement may be taken during a period that may extend a few seconds before and/or after the consumption of the segment. Taking a measurement spanning shortly before and/or after the consumption of the segment may be necessary with sensors that measure a signal that may change relatively slowly, such as GSR which may take a few seconds to reflect a change in affective response.

In one embodiment, the sample generator 616 may assign weights samples. Optionally, a weight assigned to a sample may determine how much the sample will influence training of a model that is generated based on the sample. Optionally, the higher the weight of a sample, the more it influences values of parameters in a model being trained. For example, a first sample that has a weight of 2 may have double the influence a second sample with weight 1 has on values of parameters of a model.

Typically, higher training weights are assigned to samples which are of better quality and/or are more likely to be accurate, compared to lower quality and/or less accurate samples. Doing so increases the influence of the more accurate and/or higher quality samples, which often contributes to the generation of better models.

In one embodiment, the sample generator 616 is configured to utilize the first determination 614a and/or the second determinations 614b to assign higher weight, for a purpose of training a measurement emotional response predictor, to a first sample comprising the first label 610a and a first affective response measurement 615a of the user 114, than to a second sample comprising the second label 610b and a second affective response measurement 615b of the user 114. Optionally, the first measurement 615a was taken by a sensor 456 substantially while the user consumed the first segment, and the second measurement 615b was taken by the sensor 654 substantially while the user consumed the second segment. Optionally, by assign a higher weight it is meant that weight of the first sample, for the purpose of training a measurement emotional response predictor is at least 25% higher than weight assigned to the second samples.

In one embodiment, the first measurement 615a and/or the second measurement 615b are taken during first and second durations, respectively. Optionally, the first and second durations are the same length. Optionally, the first duration is longer than the second duration. Optionally, taking a measurement by the sensor during a duration involves collecting one or more values at a certain time point that falls within the duration. Optionally, taking a measurement by the sensor during a duration involves collecting one or more values at multiple time points that fall within the duration.

In one embodiment, the sample generator 616 is configured to select durations during which the first measurement 615a and/or the second measurement 615b are to be taken by the sensor 456.

In one example, the durations are set in proportion to the first and second gaze-based attention levels, such that duration during which the first affective response measurement 615a is to be taken is longer than duration during which the second affective response measurement 615b is to be taken.

In another example, the gaze analyzer 612 is also configured to estimate gaze stability from the first eye tracking data, and the sample generator 616 is configured to select duration during which the first affective response measurement 615a is to be taken, as a function of the gaze stability. Optionally, gaze stability indicates the amount of time (and/or relative amount of time), that the user spent looking at a segment of content. In this case, higher gaze stability corresponds to a longer time looking at content. Optionally, gaze stability indicates relative angle between line of sight of user and direction of content relative to the user. In this case, higher gaze stability corresponds to smaller angle between the line of sight of user and the direction of the content relative to the user. Optionally, the function of the gaze stability is such that the higher the gaze stability, the longer the corresponding duration which the first affective response measurement 615a is to be taken.

In yet another example, the gaze analyzer 612 is also configured to estimate pupil diameter from the first eye tracking data, and the sample generator 616 is configured to select duration during which the first affective response measurement 615a is to be taken as function of the pupil diameter. Optionally, the larger the pupil diameter and/or the larger the change to the pupil diameter, the longer the selected duration. Optionally, a large pupil and/or increase in size of the pupil indicates attention and/or interest.

In another embodiment, the gaze analyzer 612 is configured to receive third eye tracking data of the user 114 taken while the user 114 consumed a third segment of content, and to make a third determination that a third gaze-based attention level to the third segment reaches a third predetermined threshold. However, the label generator 600 does not receive a third vote of the user on the third segment. Thus, the sample generator 616 assigns, for the purpose of training an emotional response predictor, a higher weight to the second sample, than it assigns to a third sample that includes an affective response measurement of the user 114 taken by the sensor 456 substantially while the user 114 consumed the third segment. Optionally, the third sample does not include a label based on a vote. Optionally, the third sample does not include a label at all (the third sample is unlabeled).

In another embodiment, the third sample may be assigned, for the purpose of training an emotional response predictor, a weight that is not lower than weight assigned to the second sample, but not higher than weight assigned to the first sample.

The training module 618 is also configured to train a measurement ERP (Emotional Response Predictor) with samples provided by the sample generator 616. In some cases, the training sample may represent a measurement of a genuine and/or spontaneous expression of affective response of the user 114 with a corresponding label indicative of the emotional response felt at the time of the measurement and/or the action taken by the user 114 at that time. Thus, a predictor of emotional response trained on such a sample may be able learn aspects that characterize expressions of emotional response of the user in day-to-day situations; making the predictor better suited to recognize the spontaneous and possibly subtle emotional responses of the user.

In one embodiment, the training module 618 may utilize a sample that lacks a corresponding label. Optionally, the training module 618 may utilize semi-supervised and/or unsupervised learning methods with a sample lacking a label.

In one embodiment, the training module 618 trains the measurement emotional response predictor with the first sample (for which the determination 614a indicated that the gaze-based attention level to the first segment reaches the first predetermined threshold). Additionally, the training module 618 does not train the measurement emotional response predictor with the second sample (for which the determination 614b indicated that the gaze-based attention level to the second segment does not the second predetermined threshold).

In one embodiment, a vote cast by the user 114 may relate to a segment of content, to which the user was exposed for a short duration (e.g., less than one minute, or less than 15 seconds). For example, a segment of content might be an image, a short status update (e.g., a tweet on Twitter™), a short video clip, and/or a comment on a message thread. The affective response measurement of the sensor 456 may be taken from a period essentially spanning the exposure of the user 114 to the segment of content. Optionally, the affective response measurement may be taken from a fixed period ending essentially when the vote is cast (e.g., during a period of 5 seconds before the vote is cast). Optionally, the affective response measurement may be taken during a period that extends slightly beyond when the vote is cast (e.g., a few seconds after); this may be done to reflect changes to affective response signals that change slowly.

Figure 3:
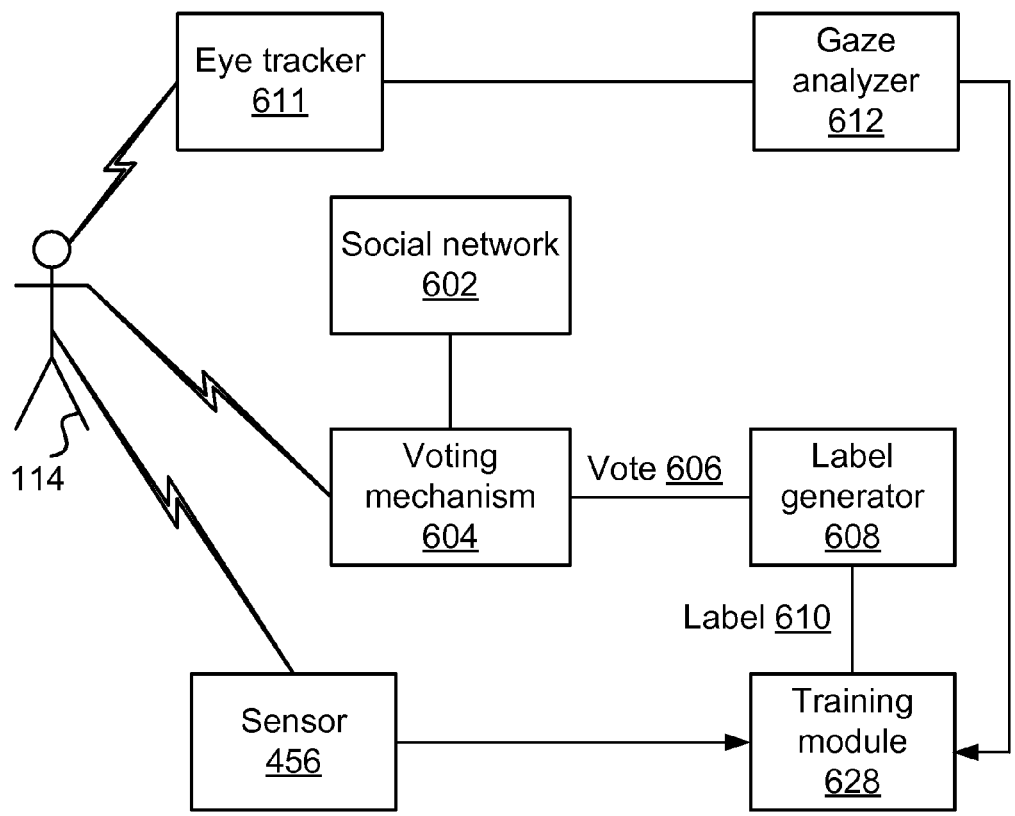
FIG. 3 illustrates one embodiment of a system configured to utilize eye tracking for train an emotional response predictor.

FIG. 3 illustrates one embodiment of a system configured to utilize eye tracking to train an emotional response predictor. The system includes at least a label generator 608, a gaze analyzer 612, and training module 628.

In one embodiment, the label generator 608 is configured to receive a vote 606 of the user 114 on a segment of content consumed by the user on the social network 602. Optionally, the vote 606 is generated via a voting mechanism 604 belonging to the social network 602. Optionally, the voting mechanism 604 is offered substantially independently of whether the vote 606 is used to trigger a sensor, such as the sensor 456, to acquire affective response measurements by measuring the user. The label generator 608 is also configured to utilize the vote 606 to generate a label 610 related to an emotional response to the segment.

In one embodiment, the gaze analyzer 612 is configured to receive eye tracking data of the user 114 taken while the user consumed the segment, to determine, based on the eye tracking data, that a gaze-based attention level to the segment reaches a predetermined threshold, and to indicate thereof to the training module 628. For example, the gaze analyzer 612 may communicate to the training module 628 times during which gaze-based attention reaches or does not reach a predetermined threshold. Optionally, the gaze analyzer 612 communicates to the training module 628 gaze-based attention level at a duration corresponding to the first segment, and the training module 628 determines whether the predetermined threshold is reached.

The training module 628 is configured to receive the label 610 and an affective response measurement of the user taken substantially while the user consumed the segment, and to train a measurement emotional response predictor with the measurement and the label 610. Optionally, the measurement is taken by the sensor 456 and the sensor 456 is coupled to the user.

In one embodiment, the label generator 608 is configured to receive, via the voting mechanism 604, a second vote of the user on a second segment of content consumed by the user on the social network 602. Optionally, the label generator 608 is configured to utilize the second vote to generate a second label related to an emotional response to the second segment. In the embodiment, the gaze analyzer 612 is also configured to receive second eye tracking data of the user taken while the user consumed the second segment, and to determine, based on the second eye tracking data, that a gaze-based attention level to the second segment does not reach a second predetermined threshold. Optionally, the gaze analyzer 612 indicates thereof to the training module 628 (i.e., it indicates that the gaze-based attention level to the second segment does not reach the second predetermined threshold). The training module 628 is also configured not to utilize a second affective response measurement of the user taken by the sensor substantially while the user consumed the second segment, in order to train the measurement emotional response predictor with the second measurement and the second label.

Figure 4:
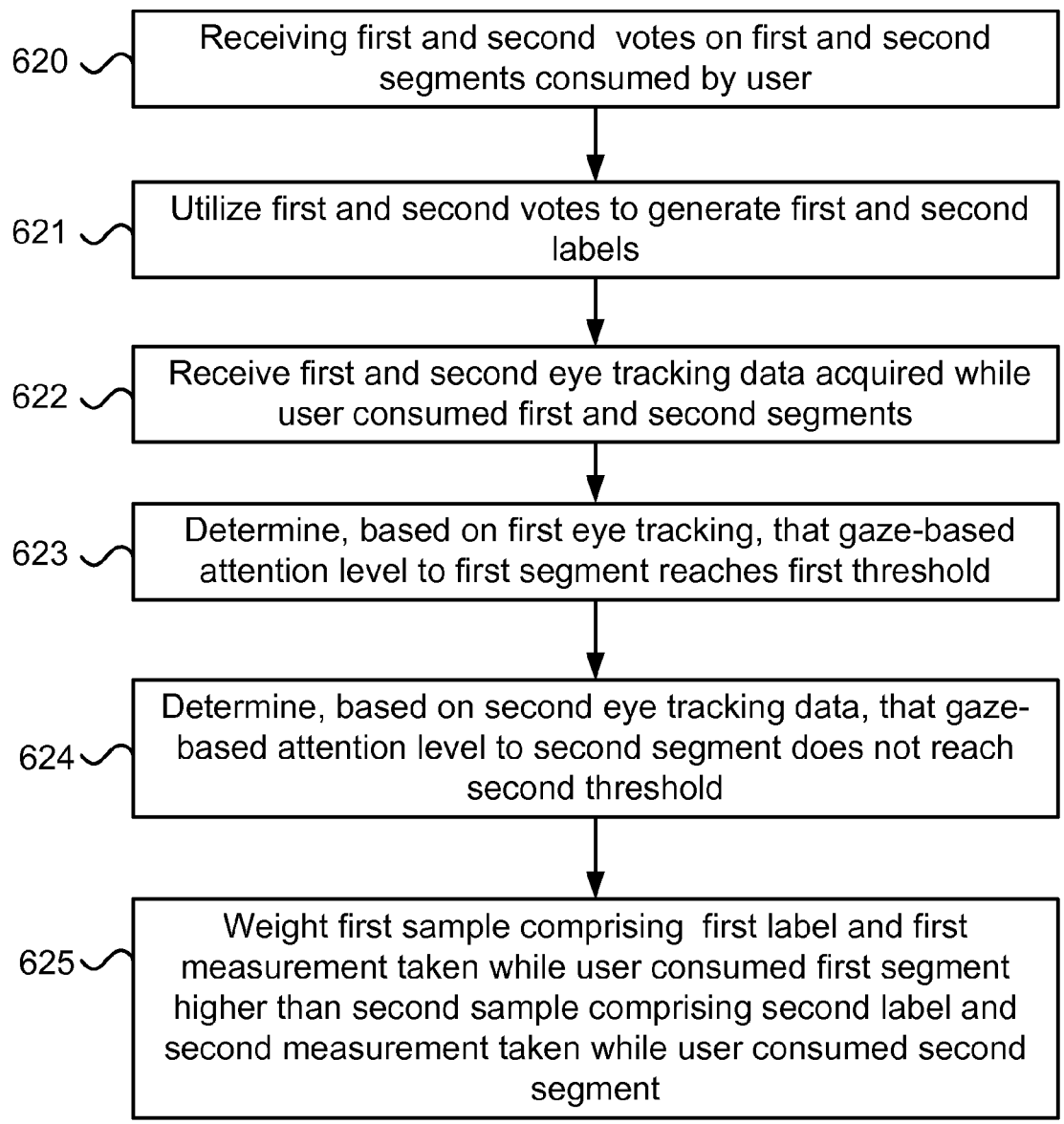
FIG. 4 illustrates one embodiment of a method for utilizing eye tracking for collecting a naturally expressed affective response for training an emotional response predictor.

FIG. 4 illustrates one embodiment of a method for utilizing eye tracking for collecting a naturally expressed affective response for training an emotional response predictor. The method includes the following steps:

In step 620, receiving first and second votes of a user on first and second segments of content consumed by the user; the first vote is on the first segment and the second vote is on the second segment.

In step 621, utilizing the first and second votes to generate first and second labels related to first and second emotional responses to the first and second segments, respectively. That is the first vote is utilized to generate the first label related to the first emotional response to the first segment, and the second vote is utilized to generate the second label related to the second emotional response to the second label.

In step 622, receiving first and second eye tracking data of the user acquired while the user consumed the first and second segments, respectively.

In step 623, making a first determination, based on the first eye tracking data, that a first gaze-based attention level to the first segment reaches a first predetermined threshold.

In step 624, making a second determination, based on the second eye tracking data, that a second gaze-based attention level to the second segment does not reach a second predetermined threshold.

In step 625, utilizing the first and second determinations to assign, for purpose of training a measurement emotional response predictor, a higher weight to a first sample comprising the first label and a first affective response measurement of the user, than a second sample comprising the second label and a second affective response measurement of the user. Optionally, the first measurement was taken by a sensor substantially while the user consumed the first segment, and the second measurement was taken by the sensor substantially while the user consumed the second segment.

In one embodiment, the method illustrated in FIG. 4 also includes the steps of receiving third eye tracking data of the user taken while the user consumed a third segment, and making a third determination that a third gaze-based attention level to the third segment reaches a third predetermined threshold; not receiving a third vote of the user on the third segment, and assigning, for the purpose of training a measurement emotional response predictor, a higher weight to the second sample, than to a third sample comprising a third affective response measurement of the user taken by the sensor substantially while the user consumed the third segment for training.

In one embodiment, the method illustrated in FIG. 4 also includes a step of training a measurement emotional response predictor with the first sample, and not training the measurement emotional response predictor with the second sample.

In one embodiment, the first and second segments are consumed by the user on a social network, the first and second votes are generated via a voting mechanism belonging to the social network, and the voting mechanism is offered substantially independently of whether the vote is used to trigger the sensor to acquire affective response measurements by measuring the user. Optionally, the voting mechanism comprises one or more of the following: a like voting mechanism, a dislike voting mechanism, a star rating mechanism, a numerical rating mechanism, an up voting mechanism, a down voting mechanism, and a ranking mechanism.

In one embodiment, the method illustrated in FIG. 4 also includes a step of selecting durations, during which the first and second affective response measurements are to be taken, to be in respective temporal vicinities to when the first and second votes are made, respectively. That is, the first affective response is to be taken in temporal vicinity to the first vote, and the second affective response measurement is to be taken in temporal vicinity of the second vote. Optionally, temporal vicinity to a vote is no longer than 30 seconds before and 10 seconds after the vote is made.

In one embodiment, a system configured to utilize eye tracking for collecting a naturally expressed affective response for training an emotional response predictor, comprising: a label generator configured to receive first and second votes of a user on first and second segments of content consumed by the user, respectively; the label generator is further configured to utilize the first and second votes to generate first and second labels related to first and second emotional responses to the first and second segments, respectively; a gaze analyzer configured to receive first and second eye tracking data of the user acquired while the user consumed the first and second segments, and to make a first determination that a first gaze-based attention level to the first segment reaches a first predetermined threshold, and to make a second determination that a second gaze-based attention level to the second segment does not reach a second predetermined threshold; and a sample generator configured to utilize the first and second determinations to assign, for purpose of training a measurement emotional response predictor, a higher weight to a first sample comprising the first label and a first affective response measurement of the user, than to a second sample comprising the second label and a second affective response measurement of the user; wherein the first measurement was taken by a sensor substantially while the user consumed the first segment, and the second measurement was taken by the sensor substantially while the user consumed the second segment. Optionally, the gaze analyzer is further configured to receive third eye tracking data of the user taken while the user consumed a third segment of content, and to make a third determination that a third gaze-based attention level to the third segment reaches a third predetermined threshold; the label generator does not receive a third vote of the user on the third segment, and the sample generator is further configured to assign, for the purpose of training a measurement emotional response predictor, a higher weight to the second sample, than to a third sample comprising an affective response measurement of the user taken by the sensor substantially while the user consumed the third segment.

Optionally, the system further comprises a training module configured to train the measurement emotional response predictor with the first sample, and not to train the measurement emotional response predictor with the second sample. Optionally, the first and second segments consumed by the user on a social network, the first and second votes are generated via a voting mechanism belonging to the social network, and the voting mechanism is offered substantially independently of whether the votes are used to trigger the sensor to acquire affective response measurements. Optionally, the first and second affective response measurements are taken during periods that end in temporal vicinity of when the first and second votes are made, respectively. Optionally, the voting mechanism comprises one or more of the following: a like voting mechanism, a dislike voting mechanism, a star rating mechanism, a numerical rating mechanism, an up voting mechanism, a down voting mechanism, and a ranking mechanism. Optionally, the sample generator is further configured to select durations, during which the first and second affective response measurements are to be taken, in proportion to the first and second gaze-based attention levels, such that the duration during which the first affective response measurement is to be taken is longer than the duration during which the second affective response measurement is to be taken. Optionally, the gaze analyzer is further configured to estimate gaze stability from the first eye tracking data, and the sample generator is further configured to select duration during which the first affective response measurement is to be taken as a function of the gaze stability. Optionally, the gaze analyzer is further configured to estimate pupil diameter from the first eye tracking data, and the sample generator is further configured to select duration during which the first affective response measurement is to be taken as function of the pupil diameter. Optionally, the label generator is further configured to receive data derived from an analysis of the content, and to utilize the data to generate the label.

In one embodiment, a method for utilizing eye tracking for collecting a naturally expressed affective response for training an emotional response predictor, comprising: receiving first and second votes of a user on first and second segments of content consumed by the user; utilizing the first and second votes to generate first and second labels related to first and second emotional responses to the first and second segments, respectively; receiving first and second eye tracking data of the user acquired while the user consumed the first and second segments, respectively; making a first determination, based on the first eye tracking data, that a first gaze-based attention level to the first segment reaches a first predetermined threshold; making a second determination, based on the second eye tracking data, that a second gaze-based attention level to the second segment does not reach a second predetermined threshold; utilizing the first and second determinations to assign, for purpose of training a measurement emotional response predictor, a higher weight to a first sample comprising the first label and a first affective response measurement of the user, than a second sample comprising the second label and a second affective response measurement of the user; wherein the first measurement was taken by a sensor substantially while the user consumed the first segment, and the second measurement was taken by the sensor substantially while the user consumed the second segment. Optionally, the method further comprises receiving third eye tracking data of the user taken while the user consumed a third segment, and making a third determination that a third gaze-based attention level to the third segment reaches a third predetermined threshold; not receiving a third vote of the user on the third segment, and assigning, for the purpose of training a measurement emotional response predictor, a higher weight to the second sample, than to a third sample comprising a third affective response measurement of the user taken by the sensor substantially while the user consumed the third segment for training. Optionally, the method further comprises training a measurement emotional response predictor with the first sample, and not training the measurement emotional response predictor with the second sample. Optionally, the method further comprises selecting durations during which the first and second affective response measurements are to be taken in proportion to the first and second gaze-based attention levels, such that the duration during which the first affective response measurement is to be taken is longer than the duration during which the second affective response measurement. Optionally, the method further comprises estimating gaze stability from the first eye tracking data, and selecting duration during which the first affective response measurement is to be taken as function of the gaze stability. Optionally, the method further comprises estimating pupil diameter from the first eye tracking data, and selecting duration during which the first affective response measurement is to be taken as function of the pupil diameter. Optionally, the first and second segments are consumed by the user on a social network, the first and second votes are generated via a voting mechanism belonging to the social network, and the voting mechanism is offered substantially independently of whether the vote is used to acquire the sensor to take affective response measurements. Optionally, the method further comprises selecting durations during which the first and second affective response measurements are to be taken, to be in respective temporal vicinities to when the first and second votes are made; whereby temporal vicinity to a vote is no longer than 30 seconds before and 10 seconds after the vote is made; and wherein the voting mechanism comprises one or more of the following: a like voting mechanism, a dislike voting mechanism, a star rating mechanism, a numerical rating mechanism, an up voting mechanism, a down voting mechanism, and a ranking mechanism.

In one embodiment, a system configured to utilize eye tracking to train an emotional response predictor, comprising: a label generator configured to receive a vote of a user on a segment of content consumed by the user on a social network; wherein the vote is generated via a voting mechanism belonging to the social network; and wherein the voting mechanism is offered substantially independently of whether the vote is used to trigger a sensor to take acquire response measurements; the label generator is further configured to utilize the vote to generate a label related to an emotional response to the segment; a gaze analyzer configured to receive eye tracking data of the user taken while the user consumed the segment, and to determine, based on the eye tracking data, that a gaze-based attention level to the segment reaches a predetermined threshold, and to indicate thereof to the training module; and a training module configured to receive the label and an affective response measurement of the user taken substantially while the user consumed the segment, and to train a measurement emotional response predictor with the measurement and the label; wherein the measurement is taken by a sensor coupled to the user. Optionally, the label generator is further configured to receive, via the voting mechanism, a second vote of the user on a second segment of content consumed by the user on the social network; the label generator is further configured to utilize the second vote to generate a second label related to an emotional response to the second segment; the gaze analyzer is further configured to receive second eye tracking data of the user taken while the user consumed the second segment, and to determine, based on the second eye tracking data, that a gaze-based attention level to the second segment does not reach a second predetermined threshold, and to indicate thereof to the training module; and wherein the training module is further configured not to utilize a second affective response measurement of the user taken by the sensor substantially while the user consumed the second segment, to train the measurement emotional response predictor with the second measurement and the second label.

Figure 5:
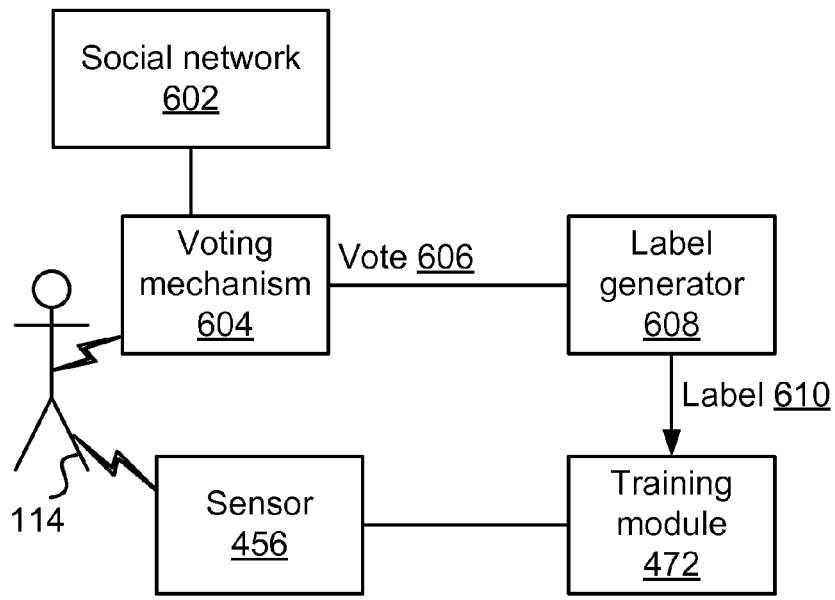
FIG. 5 illustrates one embodiment of a system configured to collect naturally expressed affective responses for training an emotional response predictor utilizing voting on a social network.

FIG. 5 illustrates one embodiment of a system configured to collect naturally expressed affective responses for training an emotional response predictor utilizing voting on a social network. The system includes at least a label generator 608 and a training module 472.

The label generator 608 is to receive a vote 606 of the user on a segment of content consumed by the user 114 on a social network 602. Optionally, the vote 606 is conveyed via the voting mechanism 604, belonging to the social network. Optionally, the label generator 608 is configured to determine whether the user 114 consumed the segment of content in a duration that is shorter than a predetermined threshold. Optionally, the predetermined threshold is selected such that, while consuming the segment in a period of time shorter than the predetermined threshold, the user 114 is likely to have a single dominant emotional response to the segment. Optionally, since the vote 606 of the user was performed doing a day-to-day task in natural settings, and not for example, in a laboratory or as part of an experiment, affective responses of the user related to the vote and/or the segment of content are likely to be naturally expressed.

In one embodiment, the label generator 608 is configured to determine that the user 114 consumed the segment during a duration that is shorter than a predetermined threshold, and to utilize the vote 606 to generate a label 610 related to an emotional response to the segment.

While consuming content over a period time, e.g., when watching a movie, at different times, a user may have various emotional responses. For example, certain portions may excite the user, certain portions may make the user sad, and other portions may make the user happy. The longer the duration is, the more likely it is for the user to have different emotional responses and/or have emotional responses of varying intensities. Thus, if the user's affective response is measured, e.g., by measuring heart-rate or brainwaves, during a long duration, the measurements are likely to fluctuate (e.g., measurement values going up and down), and/or have several peaks and/or troughs. In such a case, it may be difficult to single out a certain region of the measurements and associate it with the vote. Thus, it may not be possible to generate a useful training sample from the vote.

Things are often different if the duration is short, for example 5 or 10 seconds; in this scenario, it is less likely for the user to experience various emotions. During such a short period, most people are likely to have a single emotional response, and if the duration is near the voted (e.g., ends at the time of making the vote), that emotional response is likely to be associated with the vote. For example, if a user gives a picture on a social network an "up vote", it is likely that the user had a positive emotional response to the content in the few seconds leading up to the vote. Measurements of the affective response in such a short period are likely to reflect a single dominant emotional response. For example, heart-rate measurements may display a single unidirectional increase in the heart-rate (instead of fluctuations that may be observed when measuring over a longer period of time). In another example, brainwaves taken during a short duration, may display a distinct pattern corresponding to a certain emotional response (e.g., satisfaction from reading a witty comment on post).

In one embodiment, a user may be considered to have a single dominant emotional response during a certain period, if during the period there was a single emotional response, or a response comprising a single combination of emotions, that stood out compared to the background or baseline feelings. For example, if the user has a single dominant emotional response during a period, the user may characterize his/her feelings during the period as "I felt happy", or "I became more and more excited", or "I felt a combination of fear and excitement". Thus, in these examples, throughout the period in which the emotions where felt, is far as the user is concerned, there was only one emotion, or one combination of emotions, that the user felt; and as such, that emotion, or combination of emotions, dominated. However, if the user has a more than a single dominant emotional response, the characterization would more likely be along the lines of these examples: "first I was happy, then I became sad, and in the end I was just angry!", or "I was bored, then for a bit it got exciting, then it was sad". In these examples, during a certain period several different emotions were felt, and over time, the type of emotion that was being felt changed. Thus, it may not be possible to single out one emotion or combination that dominated.

In another embodiment, a single dominant emotional response during a period of time is reflected in affective response measurements taken during the time. Measurements corresponding to a single dominant emotional response are likely to show consistency. For example, they might comprise signals at a certain level (e.g., a certain level of skin conductivity), or a consistent change of a signal (e.g., an increase in heart-rate during the period). In another example, the affective response measurements may reflect a certain type of pattern (e.g., a certain type of brainwave patterns). However, if there is a single dominant emotional response, it is not likely to see signals changing in many directions. For example, the heart-rate is not likely to increase, decrease, and then increase again in a short period. In another example, with a single dominant emotional response, it is not likely to capture images of a user smiling, and then frowning, since these are more likely to be two different emotions.

The predetermined threshold, to which the duration corresponding to consumption of content is compared, may be set in various ways. Herein, a predetermined threshold is a threshold whose value is known prior to when the comparison is made, and/or a threshold that is computed according to logic that is known prior to when the comparison is made.

In one embodiment, the predetermined threshold is set according to the type content and/or characteristics of the content. For example, if the segment of content is an image, the threshold may be set to 15 seconds, which is enough time to view and process the image. However, if the segment of content comprises text, a longer threshold may be set, the threshold may be extended to account for the longer time it may take to comprehend the content. Optionally, the predetermined threshold is proportional to the length of the content (e.g., the length of a video clip or the number of words in a post). For example, the longer a clip, the larger the threshold may be since it might take more time for an emotional response to form for longer content. Optionally, the predetermined threshold depends on the type of content. For example, the threshold may be short for action sequences in games since an emotional response is likely to happen quickly in intense fight-or-flight experiences, while for slow tempo music segments, the predetermined threshold may be longer since an emotional response may form more slowly in this case.

In another embodiment, the predetermined threshold may depend on the type of sensor used to measure affective response of the user. For example, if the signal being measured changes quickly (e.g., EEG measuring brainwaves), then a shorter threshold may be appropriate, in order to increase the chances of capturing a single dominant emotional response. However, if a signal changes slowly, e.g., skin conductivity measured by GSR (Galvanic Skin Response), then a larger threshold may be used.

In one embodiment, the predetermined threshold is determined according to the social network 602 and/or the voting mechanism 604. For example, the threshold used when voting is done by entering a text comment may be longer than the threshold used when voting is done by pushing a "like" button; it may take longer for an emotional response to form or manifest when the user is busy formulating a comment. In another example, a social network that is typically fast-paced, e.g., it involves exchanges of short messages, may lead to a usage of short predetermined thresholds. However, a social network in which each segment of content is typically contemplated about (e.g., a news aggregation site), may utilize larger predetermined thresholds.

In one embodiment, label generator 608 receives an indication of how long the user 114 consumed the segment of content which the vote 606 relates to. Optionally, the indication is received via the vote 606 itself, deduced from multiple votes, and/or is received from another source such as the social network 602 and/or the voting mechanism 604. Alternatively or additionally, the label generator 608 may receive an indication of whether or not the duration is shorter than the predetermined threshold from another module such as the voting mechanism 604 and/or the social network. In this case, determining that the user 114 consumed the segment during a duration that is shorter than the predetermined threshold may amount to receiving and/or interpreting the indication. In one example, the voting mechanism 604 and/or the social network 602 may forward the vote 606 and/or other related information (e.g., the segment of content) to the label generator 608 in instances where the duration is shorter than the predetermined threshold. While in other instances, in which the duration is not shorter than the predetermined threshold, the vote 606 and/or other related information are not forwarded to the label generator 608.

The training module 472 is configured to utilize the label 610 and an affective response measurement of the user 114 corresponding to the vote 606 to generate the label 610. Optionally, the affective response measurement is taken by the sensor 456. Optionally, the sensor 456 is coupled to the user. The affective response measurement is taken substantially during the duration during which the user consumes the segment of content on which the user 114 casts the vote 606. The affective response measurement of the user 114 may be provided by a sensor 456 coupled to the user 114. For example, the sensor 456 may be a physiological sensor (e.g., a sensor that measures heart rate, galvanic skin response, and/or brainwave activity), and/or a sensor that measures the user's behavior (e.g., a camera and/or a motion detector). In one example, "substantially during the duration" means a time that overlaps with the duration, e.g., the starting time of taking the measurement is before the ending of the duration and/or the ending time of taking the measurement is after the beginning of the duration. In another example, "substantially during the duration" means within a short time period from the duration. For example, the measurement may be taken a during a period that may extend a few seconds before and/or after the duration. Taking a measurement spanning shortly before and/or after the duration may be necessary with sensors that measure a signal that may change relatively slowly, such as GSR which may take a few seconds to reflect a change in affective response.

The training module 472 is also configured to train a measurement ERP (Emotional Response Predictor) with the label 610 and the affective response measurement corresponding to the vote 606. The label 610 together with the affective response measurement can represent a training sample corresponding to the user 114. In some cases, the training sample may represent a measurement of a genuine and/or spontaneous expression of affective response of the user 114 with a corresponding label indicative of the emotional response felt at the time of the measurement and/or the action taken by the user 114 at that time. Thus, a predictor of emotional response trained on such a sample may be able learn aspects that characterize expressions of emotional response of the user in day-to-day situations; making the predictor better suited to recognize the spontaneous and possibly subtle emotional responses of the user.

In one embodiment, the vote 606 cast by the user 114 may relate to a segment of content, to which the user was exposed for a short duration (e.g., less than one minute, or less than 15 seconds). For example, a segment of content might be an image, a short status update (e.g., a tweet on Twitter™), a short video clip, and/or a comment on a message thread. The affective response measurement of the sensor 456 utilized by the training module 472 may be taken from a period essentially spanning the exposure of the user 114 to the segment of content. Optionally, the affective response measurement may be taken from a fixed period ending essentially when the vote 606 is cast (e.g., during a period of 5 seconds before the vote is cast). Optionally, the affective response measurement may be taken during a period that extends slightly beyond when the vote is cast (e.g., a few seconds after); this may be done to reflect changes to affective response signals that change slowly.

Figure 6:
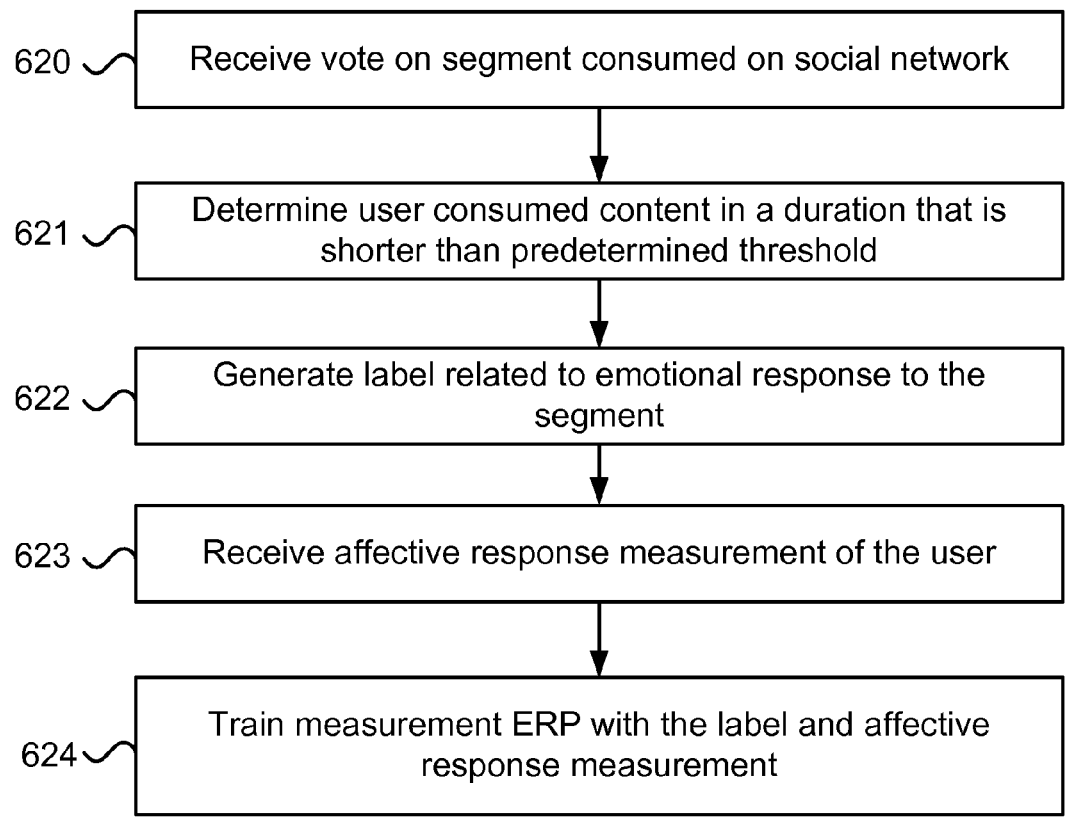
FIG. 6 illustrates one embodiment of a method for collecting naturally expressed affective responses for training an emotional response predictor utilizing voting on a social network.

FIG. 6 illustrates one embodiment of a method for collecting naturally expressed affective responses for training an emotional response predictor utilizing voting on a social network. The method includes the following steps:

In step 620, receiving a vote of a user on a segment of content consumed by the user on a social network. Optionally, the vote is generated via a voting mechanism belonging to the social network.

In step 621 determining that the user consumed the segment in a duration that is shorter than a predetermined threshold. Optionally, the predetermined threshold is selected such that, while consuming the segment in a period of time shorter than the predetermined threshold, the user is likely to have a single dominant emotional response to the segment.

In step 622, utilizing the vote for generating a label related to an emotional response to the segment.

In step 623, receiving an affective response measurement of the user taken substantially during the duration. Optionally, the measurement is taken by a sensor coupled to the user.

And in step 624, training a measurement emotional response predictor with the label and the affective response measurement. Optionally, the measurement along with the generated label may serve as a training sample used to train and/or refine a model utilized by the measurement ERP to make predictions of emotional response from measurements of affective response. Optionally, since the vote of the user was performed doing a day-to-day task in natural settings, and not for example, in a laboratory or as part of an experiment, affective responses of the user related to the vote and/or the segment of content are likely to be naturally expressed.

In one embodiment, a system configured to collect naturally expressed affective responses for training an emotional response predictor utilizing voting on a social network, comprising: a label generator configured to receive a vote of a user on a segment of content consumed by the user on the social network; wherein the vote is generated via a voting mechanism belonging to the social network; the label generator is further configured to: determine that the user consumed the segment during a duration that is shorter than a predetermined threshold, and utilize the vote to generate a label related to an emotional response to the segment; wherein the predetermined threshold is selected such that, while consuming the segment in a period of time shorter than the predetermined threshold, the user is likely to have a single dominant emotional response to the segment; and a training module configured to receive the label and an affective response measurement of the user taken substantially during the duration, and to train a measurement emotional response predictor with the measurement and the label. Optionally, the affective response measurement of the user is taken by a sensor coupled to the user, the segment is an image, and the predetermined threshold is less than 15 seconds. Optionally, the voting mechanism is offered substantially independently of whether the vote is used to trigger a sensor to acquire the naturally expressed affective responses. Optionally, the affective response measurement is taken during a period that ends in temporal vicinity of when the vote is made. Optionally, the voting mechanism comprises one or more of the following: a like voting mechanism, a dislike voting mechanism, a star rating mechanism, a numerical rating mechanism, an up voting mechanism, a down voting mechanism, and a ranking mechanism. Optionally, the voting mechanism is configured to enable the user to enter a comment comprising data representing text; and wherein the label generator is further configured to perform semantic analysis on the text in order to generate the label. Optionally, the system is configured not to forward to the training module a second affective response measurement that does not have a corresponding label generated from a vote. Optionally, the label generator is further configured to suggest to the training module a training weight for the affective response measurement of the user. Optionally, the label generator is further configured to receive data derived from an analysis of the content, and to utilize the data to generate the label. Optionally, the label generator is further configured to receive an estimated label based on affective responses of other users to substantially the same segment of content, and to utilize the estimated label to generate the label. Optionally, at least one affective response measurement that has a corresponding label generated from a vote, and at least one affective response measurement that does not have a corresponding label generated from a vote, comprise affective response measurements of the user to content provided by same friend of the user on the social network. Optionally, the training module is further configured to apply a significantly higher training weight to a first measurement that has a corresponding label generated from a vote, compared to a training weight applied to a second measurement that does not have a corresponding label generated from a vote.

In one embodiment, a method for collecting naturally expressed affective responses for training an emotional response predictor utilizing voting on a social network, comprising: receiving a vote of a user on a segment of content consumed by the user on the social network; wherein the vote is generated via a voting mechanism belonging to the social network; determining that the user consumed the segment in a duration that is shorter than a predetermined threshold, and utilizing the vote for generating a label related to an emotional response to the segment; wherein the predetermined threshold is selected such that, while consuming the segment in a period of time shorter than the predetermined threshold, the user is likely to have a single dominant emotional response to the segment; receiving an affective response measurement of the user taken substantially during the duration; and training a measurement emotional response predictor with the label and the affective response measurement. Optionally, the voting mechanism is offered substantially independently of whether the vote is used to trigger a sensor to acquire the affective response measurements. Optionally, the affective response measurement is taken during a period that ends in temporal vicinity to when the vote is made. Optionally, the voting mechanism comprises one or more of the following: a like voting mechanism, a dislike voting mechanism, a star rating mechanism, a numerical rating mechanism, an up voting mechanism, a down voting mechanism, and a ranking mechanism. Optionally, the voting mechanism enables the user to enter a comment comprising data representing text; and generating the label involves performing semantic analysis on the text. Optionally, the method further comprises suggesting to the training module a training weight for the affective response measurement of the user. Optionally, the training of the measurement emotional response predictor further comprises applying a significantly higher training weight to a first measurement that has a corresponding label generated from a vote, compared to a training weight applied to a second measurement that does not have a corresponding label generated from a vote.

In one embodiment, a system configured to collect naturally expressed affective responses for training an emotional response predictor utilizing voting on a social network, comprising: a label generator configured to receive a vote of a user on a segment of content consumed by the user on the social network; wherein the vote is generated via a voting mechanism belonging to the social network; and wherein the voting mechanism is offered substantially independently of whether the vote is used to trigger a sensor to acquire the naturally expressed affective responses; the label generator is further configured to: determine that the user consumed the segment during a duration that is shorter than a predetermined threshold, utilize the vote to generate a label related to an emotional response to the segment, and to indicate the training module thereof; wherein the predetermined threshold is selected such that, while consuming the segment in a period of time shorter than the predetermined threshold, the user is likely to have a single dominant emotional response to the segment; and a training module configured to receive the label and an affective response measurement of the user taken substantially during the duration, and to train a measurement emotional response predictor with the measurement and the label; wherein the measurement is taken by a sensor coupled to the user.

Figure 7:
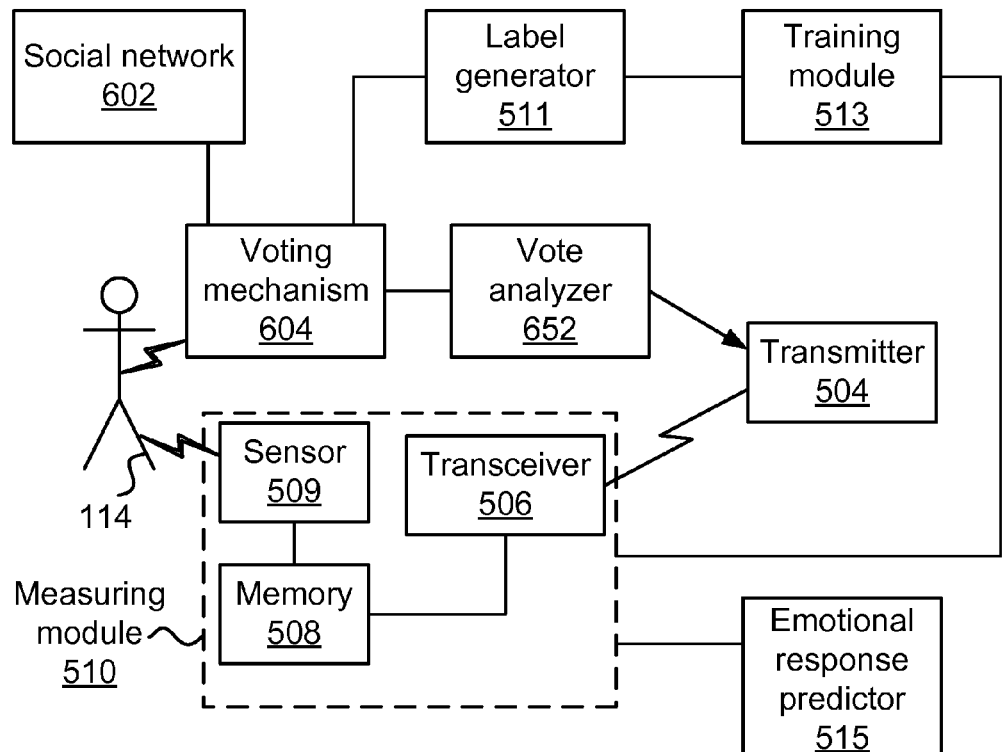
FIG. 7 illustrates one embodiment of a system configured to reduce volume of transmissions of sensor measurements of affective response corresponding to voting on a social network.

FIG. 7 illustrates one embodiment of a system configured to reduce volume of transmissions of sensor measurements of affective response corresponding to voting on a social network. The system includes at least a vote analyzer 652 and a transmitter 504.

In one embodiment, the vote analyzer 652 is configured to receive and indication of a vote cast by the user regarding the segment of content. Optionally, the vote was cast via the voting mechanism 604 belonging to the social network 602. Optionally, the indication indicates that the vote was cast at a certain time. Optionally, the indication indicates a duration during which the segment of content was consumed. Optionally, the indication includes the vote itself and/or data derived from the vote and/or the segment of content.

The vote analyzer 652 is configured to determine whether the user consumed the segment in a duration that is shorter than a predetermined threshold. Optionally, the predetermined threshold is selected such that, while consuming the segment in a period of time shorter than the predetermined threshold, the user is likely to have a single dominant emotional response to the segment.

In one example, if the vote was cast on a short segment of content, it is likely that the user had a single emotional response to the segment of content. For instance, if the user presses a down-vote button regarding a title of a content item on a social media site (e.g., one sentence description of the item), it is likely that the user felt a single dominant emotional response to the content, such as feeling disinterested in the content. In this case, it is possible to associate an affective response measurement of the user measured essentially during the duration the content is consumed with the down-vote (due to the short duration there is likely only one dominant affective response). However, if the user casts a similar down-vote after spending five minutes consuming the content (e.g., watching a video clip), it is likely that the user felt more than one dominant emotional response to the segment of content; at different times during the viewing of the clip, the user might have felt various types of emotions—possibly being bored and/or disinterested at certain times, while interested and/or mildly amused at other. In this case, it may be difficult to associate an affective response measurement of the user measured essentially during the duration the content is consumed with the down-vote. In this case the duration is likely to contain a plurality of different affective responses (corresponding to different emotions felt by the user), so it may be difficult to choose which of the affective responses should be associated with the down-vote.

In one embodiment, the vote analyzer 652 indicates to the transmitter 504 to send a request for measurements when it determines that the user consumed the segment in a duration that is shorter than the predetermined threshold. Optionally, if the vote analyzer does not determine that the user consumed the segment in a duration that is shorter than the predetermined threshold, it does not indicate the transmitter 504 to send the request. Optionally, indicating to the transmitter 504 involves signaling the transmitter 504 directly and/or indirectly (e.g., via intermediates).

The transmitter 504 is configured to send a request to a measuring module 510 to transmit measurements of the affective response of the user, taken by a sensor, which relate to consumption of the segment. Optionally, at least some of the measurements transmitted are taken before the request is sent. Optionally, the request is sent based on the vote analyzer 652 determining that the user consumed the segment in a duration that is shorter than a predetermined threshold.

In one embodiment, the vote analyzer 652 is configured to receive an indication that the user provided a second vote regarding a second segment of content consumed by the user on the social network 602. Optionally, the vote analyzer determines that the user consumed the second segment in a duration that is not shorter than a second predetermined threshold. Optionally, the second predetermined threshold is selected such that, while consuming the second segment in a period of time shorter than the second predetermined threshold, the user is likely to have a single dominant emotional response to the second segment. Consequently, the transmitter 504 does not send a second request to the measuring module 510 to transmit affective response measurements of the user related to the consumption of the second segment.

In one embodiment, the measuring module 510 includes at least a sensor 509, memory 508, and a transceiver 506. Optionally, the transmitter 504 transmits the request to the transceiver 506. Optionally, to fulfill the request, the transceiver 506 transmits measurements taken by the sensor 509. Optionally, the memory 508 has a capacity sufficient to store measurements of the user taken between essentially start of exposure of the user to the segment and the time the request is received by the measuring module. Additionally, the transceiver 506 is configured to fulfill the request, while reducing unnecessary transmissions, by transmitting, after receiving the request, measurements stored in the memory to fulfill the request. Optionally, if a request for a certain measurement is not received within a predetermined duration, the measuring module is configured not to transmit the certain measurement. For example, if a request is not received for a measurement within 5 minutes of when the measurements were taken, the measuring module will not transmit the measurements, even if requested.

In one embodiment, the request may be associated with a period during which affective response measurements of the user should be taken. For example, the request may be associated with a fixed period of time (e.g., the last five seconds before the request is sent). In another example, the request may be associated with the duration considered by the vote analyzer (e.g., the request is for measurements taken during the period of consumption of the segment of content). In yet another example, the request indicates a start time for the measurements, e.g., the request is to send measurements taken after the start time in the request.

In another embodiment, the request may mention an actual period from which the measurements should be taken (e.g., the request may include a start and/or end time). Alternatively, receiving the request indicates the period to the recipients (e.g., the sensor is configured to send measurements taken during a fixed period relative to the time the request is received). The request may include additional information indicating what type of procedures should be used to process the measurements that are required to fulfill the request. Alternatively or additionally, the request may specify what is to be done with certain memory cells in the memory 508 that store at least some of the measurements that are transmitted by the transceiver 506.

It is to be understood that the transmitter 504 may be implemented as a transceiver, and the transceiver 506 may be implemented as a transmitter and a receiver that are not necessarily placed together. In some embodiments, the transmitter 504 and/or the transceiver 506 may send at least some of the information they transmit wirelessly.

The transceiver 506 may be coupled to the sensor 509 and/or the memory 508. Upon receiving the request, the transceiver may access the memory 508 in order to retrieve at least some of the measurements required to fulfill the request. Additionally or alternatively, the transceiver 506 may obtain affective response measurement from the sensor 509 in order to fulfill the request. Optionally, the transceiver 506 sends at least some of the measurements required to fulfill the request to other modules that may be part of the system, such as a module that trains an Emotional Response Predictor (ERP), and/or a module that utilizes an ERP to predict emotional response of the user. Additionally or alternatively, the transceiver 506 may send at least some of the measurements required to fulfill the request to recipients that are not part of the system.

In some embodiments, the sensor 509 is a device used to measure an affective response of the user 114. For example, the sensor 509 may be a physiological sensor (e.g., a sensor that measures heart rate, galvanic skin response, and/or brainwave activity), and/or a sensor that measures the user's behavior (e.g., a camera, and/or a motion detector). Optionally, the sensor may be attached to the user and/or the user's clothing (e.g., a bracelet that measures GSR, and/or a headset that measures EEG), implanted in the user's body (e.g., electrodes implanted in the scalp to measure brainwaves), and/or it may be used from a distance (e.g., a camera). The sensor 509 may write at least some of the measurements it takes in the memory 508. Optionally, measurements taken by the sensor 509 undergo processing prior to being stored in the memory and/or being transmitted by the transceiver 506. For example, the measurements may undergo filtering, normalization, signal processing, feature extraction, encryption, and/or compression.

The memory 508 may be capable of storing measurements taken during certain periods of time that occur before the request is received. For example, for a certain request, the memory may be sufficient to store measurements taken during a duration starting from at least 100 milliseconds, 1 second, 1 minute, and/or 1 hour before the request is received until the time the request is received. Optionally, the amount of measurements the memory is configured to store corresponds to how far back in time a measurement needed to fulfill the request is likely to precede the time at which the request is sent and/or received. Thus, in some embodiments, the capacity of the memory is sufficient to store historical measurements (taken before a request is sent and/or received) that are required to be sent by the transceiver 506 in order to fulfill the request. For example, most of the memory 508 may hold measurements that may be required to fulfill a request. In one example, most of the measurements stored in the memory refer to at least half of the measurements.

It is to be noted that by fulfilling a request it is meant that the transceiver 506 sends measurements taken by the sensor 509 essentially during the period associated with the request. Optionally, fulfilling the request involves the transceiver 506 sending essentially all the measurements taken by the sensor 509 during the period associated with the request. If fulfilling the request involves sending measurements taken at the time the request was sent, and/or prior to when the request was sent, the transceiver 506 may obtain at least some of those measurements from the memory 508. Additionally or alternatively, if fulfilling the request involves sending measurements taken after the request was sent, the transceiver 506 may obtain at least some of those measurements from the memory 508 and/or directly from the sensor 509. By transmitting, after receiving the request, measurements stored in the memory to fulfill the request, the transceiver 506 is able to reduce the amount of unnecessary transmissions it makes. For example, if no memory were available for storing measurements of the sensor 509, the transceiver 506 might need to transmit certain measurements that may possibly be required to fulfill a request. However, if ultimately no request is sent that involves those certain measurements, the transceiver would have transmitted the certain measurements unnecessarily.

In some embodiments, after measurements are transmitted they are deleted from the memory 508. Additionally or alternatively, measurements stored in the memory that were taken during a period that is not likely to be associated with a request may be deleted. Thus, the memory may have a limited, and even small capacity, but still be sufficient to store measurements required for fulfilling typical requests. It is to be noted that in some embodiments, allowing memory cells to be overwritten is considered the same as deleting those memory cells, since it is very likely that within a certain time frame the cells will have new values written in them. Additionally, after allowing memory cells to be overwritten, the system may treat those memory cells as if they were deleted (e.g., if the cells are not overwritten, the system may indicate that an access to them involves uninitialized values). In some embodiments, if no request is received within a predefined duration (e.g., 100 milliseconds or 10 seconds), in which a measurement stored in the memory 508 is needed in order to fulfill a request, the measurement may be deleted without being transmitted.

In one embodiment, the sensor 509 is implanted in the body of the user 114. The sensor includes a memory 508 with capacity that is sufficient for fulfilling typical requests: the memory is capable of storing measurements taken between the start of a period associated with the request and the time the request is sent and/or received by the sensor 509 and/or transceiver 506. For example, the capacity of the memory 508 may be sufficient for storing measurements taken in a period of 100 milliseconds, or 10 seconds, prior to when the request is received by the sensor 509 and/or the transceiver 506.

In one embodiment, the sensor 509, the memory 508, and the transceiver 506 are realized in the same device. Optionally, the processor 507 may also be realized in the same device. Optionally, the device is implanted in the user's body. Additionally or alternatively, the sensor 509, the memory 508 and the transceiver 506 draw power from the same power source. Optionally, the processor 507 also draws power from the same device. Optionally, the power source is a battery.

In one embodiment, the sensor 509, the memory 508, and/or the transceiver 506 draw power from an external source. For example, the sensor 509, the memory 508, and/or the transceiver 506 may harvest energy from radio waves (e.g., ambient ratio waves and/or radio waves from a source near the sensor 509, the memory 508, and/or the transceiver 506, such as a radio wave transmitter carried by the user).

In one embodiment, a vote from the voting mechanism 604 is sent to a label generator 511 that is configured to generate a label based on the vote. Optionally, the label is indicative of an emotional response, likely felt by the user, which is related to the vote. A training module 513 is configured to train a measurement emotional response predictor (measurement ERP) utilizing the label and a corresponding measurement received from the measuring module 510.

In another embodiment, a measurement emotional response predictor 515 (measurement ERP) is configured to predict emotional response of the user from data comprising a measurement received from the measuring module 510. Optionally, the measurement is transmitted by the transceiver 506.

Figure 8:
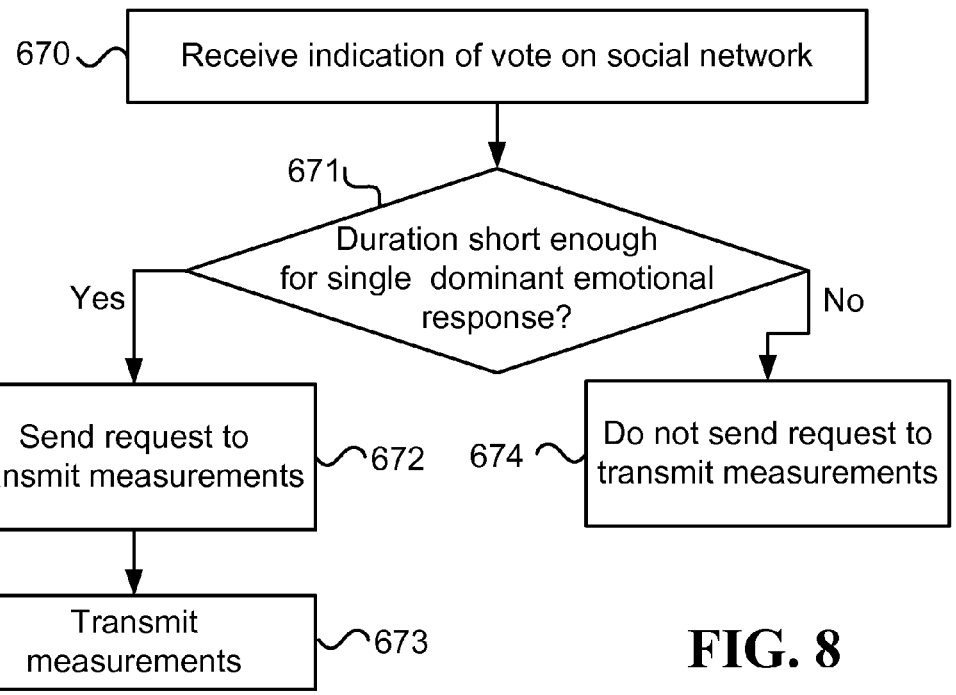
FIG. 8 illustrates one embodiment of a method for reducing volume of transmissions of sensor measurements of affective response corresponding to voting on a social network.

FIG. 8 illustrates one embodiment of a method for reducing volume of transmissions of sensor measurements of affective response corresponding to voting on a social network. The method includes the following steps:

In step 670, receiving an indication that a user provided a vote regarding a segment of content consumed by the user on the social network. Optionally, the vote is provided via a voting mechanism belonging to the social network.

In step 671, determining whether the user consumed the segment in a duration that is shorter than a predetermined threshold. Optionally, the predetermined threshold is selected such that, while consuming the segment in a period of time shorter than the predetermined threshold, the user is likely to have a single dominant emotional response to the segment In step 672, following the "Yes" branch, sending a request to a measuring module to transmit measurements of affective response of the user, taken by the sensor, which are related to consumption of the segment. Optionally, at least some of the measurements are taken before the request is sent.

In optional step 673, transmitting, by the measuring module, after receiving the request, measurements of the affective response of the user taken by the sensor, which fulfill the request.

And in optional step 674, following the "No" branch, refraining from sending a request similar to the one sent in step 672, to the measuring module. This may cause the measuring module not to transmit measurements in a volume that is greater or equal to the volume of measurements sent in step 673. For example, in step 674 no request may be sent, thus the sensor may effectively not transmit measurement data that is related to the vote, if step 674 is executed.

In one embodiment, the method illustrated in FIG. 8 optionally includes the following steps: receiving an indication that the user provided a second vote regarding a second segment of content consumed by the user on the social network; determining that the user consumed the second segment in a second duration that is not shorter than a second predetermined threshold; and not sending a second request to the measuring module to transmit measurements related to the consumption of the second segment. Optionally, the second predetermined threshold is selected such that, while consuming the second segment in a period of time shorter than the second predetermined threshold, the user is likely to have a single dominant emotional response to the second segment. Optionally, the method illustrated in FIG. 8 also includes a step of not transmitting, by the measuring module, after receiving the second request, measurements that fulfill the second request.

In one embodiment, the method illustrated in FIG. 8 optionally includes a step involving receiving a characteristic of the segment, and selecting the predetermined threshold based on the characteristic of the segment.

In one embodiment, the method illustrated in FIG. 8 optionally includes a step involving generating a label based on the vote. Optionally, the label is indicative of an emotional response likely felt by the user, which is related to the vote. The method may optionally also include a step of training a measurement emotional response predictor (measurement ERP) utilizing the label and corresponding measurements of affective response received from the measuring module.

Figure 9:
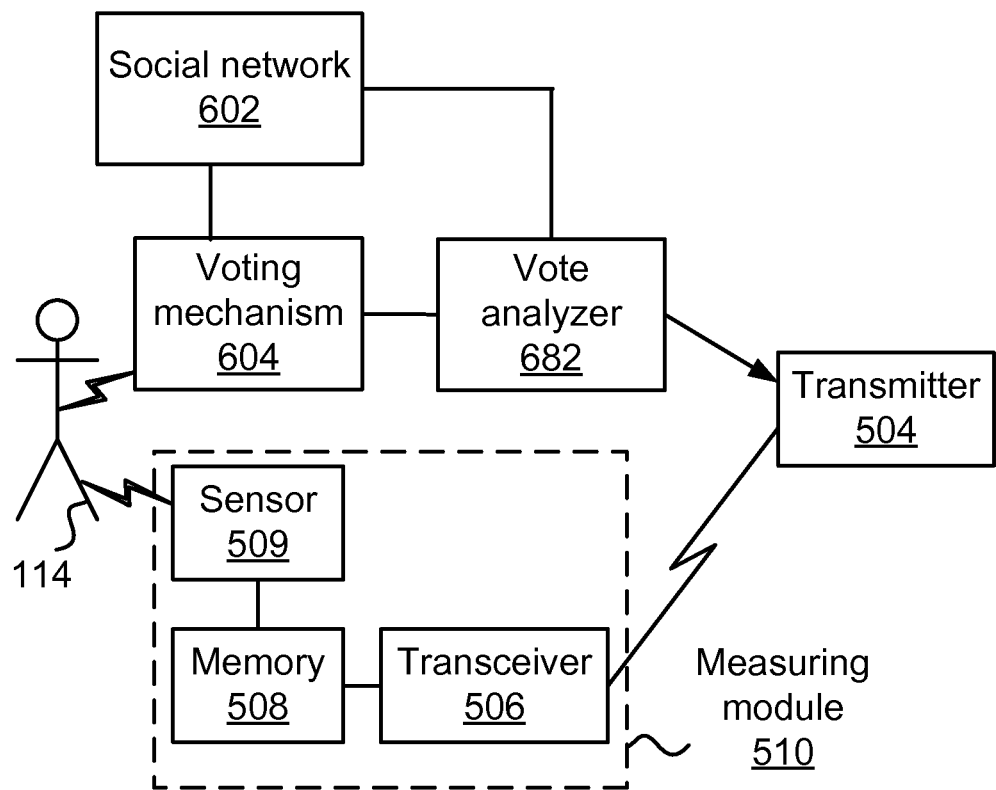
FIG. 9 illustrates an embodiment system configured to reduce volume of transmissions of sensor measurements of affective response corresponding to voting on a social network.

FIG. 9 illustrates one embodiment of a system configured to reduce volume of transmissions of sensor measurements of affective response corresponding to voting on a social network. The system includes at least a vote analyzer 682 and a transmitter 504.

The vote analyzer 682 is configured to receive an indication that the user 114 provided a vote regarding a segment of content consumed by the user 114 on a social network 602. The vote is provided via a voting mechanism 604 that belongs to the social network 602 (e.g., the vote is a "like" or star rating for the segment of content). Additionally, the vote analyzer 682 is configured to receive a characteristic of the segment of content. The characteristic may be received from the voting mechanism 604 and/or the social network 602. In one example, the characteristic of the segment of content describes an attribute such as the duration the user consumed the segment of content, the type of content, and/or the expected emotional response of the user or other users to the segment of content.

The vote analyzer 682 is configured to select, based on the characteristic, a window representing a period of time during which the user 114 likely expressed an affective response related to the vote. The window, selected by the vote analyzer 682, is intended to be a period in time that overlaps, at least in part, with the time during which the affective response is expressed. Since affective responses often have short durations, spanning fractions of seconds (e.g., EEG measurements and/or facial micro-expressions) to several seconds (e.g., changes to heart rate and/or GSR), and possibly tens of seconds (e.g., skin temperature changes), the window may be relatively short compared to the period during which the user 114 consumes the content to which the user 114 has the affective response.

The transmitter 504 is configured to send a request to a measuring module to transmit measurements of affective response of the user, taken by the sensor 509 during the window. Optionally, at least some of the measurements are related to the consumption of the segment. Optionally, the transceiver 506 is a recipient of the request. In some embodiments, the request may be for measurements taken in a window that starts before the request is sent by the transmitter 504. For example, the request may be for measurements taken by the sensor 509 in a window that starts 10 seconds before the vote is cast and ends when the vote is cast.

In one embodiment, the measuring module 510 includes the sensor 509, a memory 508 with capacity sufficient to store measurements of the user taken between the start of the window and the time the request is received by the measuring module, and a transceiver 506 configured to fulfill the request, while reducing unnecessary transmissions, by transmitting, after receiving the request, measurements stored in the memory to fulfill the request. In order to fulfill the request sent by the transmitter 504, the transceiver 506 may send measurements taken by the sensor 509 essentially during the window sent in the request. By transmitting, after receiving the request, measurements stored in the memory 508 to fulfill the request (e.g., measurements taken before the request is sent), the transceiver 506 is able to reduce the amount of unnecessary transmissions it makes. For example, if no memory were available for storing measurements of the sensor 509, the transceiver 506 might need to transmit certain measurements that may possibly be required to fulfill a request. However, if ultimately no request is sent that involves those certain measurements, the transceiver would have transmitted the certain measurements in vain.

In one embodiment, if measurements of the sensor 509 are not discernible, then they are not transmitted by the transceiver 506. For example, the measurements may be in a range that is not physiologically feasible (e.g., heart-rate of 500 beats per minute). In another example, the measurements do not represent a proper signal (e.g., EEG sensor show brainwave display an unknown pattern). In one example, the vote analyzer 682 is configured to receive a second indication that the user 114 provided a second vote regarding a second segment of content consumed by the user on the social network 602. The system is configured to receive a third indication that affective response expressed by the user in relation to the consumption of the second segment is not discernible (e.g., the indication may be given by the sensor 509 and/or a processor utilized by the measuring module). Based on the indication, the transceiver 506 is configured not to transmit affective response measurements of the user related to the consumption of the second segment.

In one embodiment, a system configured to reduce volume of transmissions of sensor measurements of affective response corresponding to voting on a social network, comprising: a vote analyzer configured to receive an indication that a user provided a vote regarding a segment of content consumed by the user on the social network; wherein the vote is provided via a voting mechanism belonging to the social network; the vote analyzer is further configured to determine that the user consumed the segment in a duration that is shorter than a predetermined threshold; wherein the predetermined threshold is selected such that, while consuming the segment in a period of time shorter than the predetermined threshold, the user is likely to have a single dominant emotional response to the segment; and a transmitter configured to send a request to a measuring module to transmit measurements of the affective response of the user, taken by a sensor, which relate to consumption of the segment; wherein at least some of the measurements are taken before the request is sent. Optionally, the measuring module comprises a sensor, a memory with capacity sufficient to store measurements of the user taken between essentially start of exposure of the user to the segment and the time the request is received by the measuring module, and a transceiver configured to fulfill the request, while reducing unnecessary transmissions, by transmitting, after receiving the request, measurements stored in the memory to fulfill the request. Optionally, the measuring module is further configured not to transmit a certain measurement if a request for the certain measurement is not received by the measuring module within a predetermined duration. Optionally, the system further comprises a label generator configured to generate a label based on the vote; wherein the label is indicative of an emotional response, likely felt by the user, which is related to the vote; and further comprising a module configured to train a measurement emotional response predictor (measurement ERP) utilizing the label and a corresponding measurement received from the measuring module. Optionally, the system further comprises a measurement emotional response predictor (measurement ERP) configured to predict emotional response of the user from data comprising a measurement received from the measuring module. Optionally, the sensor is implanted in the user. Optionally, no request is received for a certain measurement within a predetermined duration, and the measuring module is further configured not to transmit the certain measurement. Optionally, the vote analyzer is further configured to: receive an indication that the user provided a second vote regarding a second segment of content consumed by the user on the social network, and determine that the user consumed the second segment in a duration that is not shorter than a second predetermined threshold; wherein the transmitter is further configured not to send a second request to the measuring module to transmit affective response measurements of the user related to the consumption of the second segment; and wherein the second predetermined threshold is selected such that, while consuming the second segment in a period of time shorter than the second predetermined threshold, the user is likely to have a single dominant emotional response to the second segment. Optionally, the vote analyzer is further configured to receive a characteristic of the segment and to set the predetermined threshold based on the characteristic of the segment.

In one embodiment, a method for reducing volume of transmissions of sensor measurements of affective response corresponding to voting on a social network, comprising: receiving an indication that a user provided a vote regarding a segment of content consumed by the user on the social network; wherein the vote is provided via a voting mechanism belonging to the social network; determining that the user consumed the segment in a duration that is shorter than a predetermined threshold; wherein the predetermined threshold is selected such that, while consuming the segment in a period of time shorter than the predetermined threshold, the user is likely to have a single dominant emotional response to the segment; and sending a request to a measuring module to transmit measurements of affective response of the user, taken by the sensor, which are related to consumption of the segment; wherein at least some of the measurements are taken before the request is sent. Optionally, the method further comprises transmitting, by the measuring module, after receiving the request, measurements of the affective response of the user taken by the sensor, which fulfill the request. Optionally, the method further comprises receiving an indication that the user provided a second vote regarding a second segment of content consumed by the user on the social network; determining that the user consumed the second segment in a second duration that is not shorter than a second predetermined threshold; and not sending a second request to the measuring module to transmit measurements related to the consumption of the second segment; wherein the second predetermined threshold is selected such that, while consuming the second segment in a period of time shorter than the second predetermined threshold, the user is likely to have a single dominant emotional response to the second segment. Optionally, the method further comprises not transmitting, by the measuring module, after receiving the second request, measurements that fulfill the second request. Optionally, the method further comprises receiving a characteristic of the segment, and selecting the predetermined threshold based on the characteristic of the segment. Optionally, the method further comprises generating a label based on the vote; wherein the label is indicative of an emotional response likely felt by the user, which is related to the vote. Optionally, the method further comprises training a measurement emotional response predictor (measurement ERP) utilizing the label and corresponding measurements of affective response received from the measuring module. Optionally, the method further comprises predicting emotional response of the user from data comprising measurements of affective response received from the measuring module.

In one embodiment, a system configured to reduce volume of transmissions of sensor measurements of affective response corresponding to voting on a social network, comprising: a vote analyzer configured to receive an indication that a user provided a vote regarding a segment of content, and receive a characteristic of the segment; wherein the segment is consumed by the user on the social network, and the vote is provided via a voting mechanism belonging to the social network; the vote analyzer is further configured to select, based on the characteristic, a window during which the user likely expressed an affective response related to the vote; wherein the window is shorter than duration in which the user consumes the content; and a transmitter configured to send a request to a measuring module to transmit measurements of affective response of the user, taken by the sensor during the window, which relate to consumption of the segment; wherein start of the window precedes time the request is sent. Optionally, the measuring module comprises the sensor, a memory with capacity sufficient to store measurements of the user taken between the start of the window and the time the request is received by the measuring module, and a transceiver configured to fulfill the request, while reducing unnecessary transmissions, by transmitting, after receiving the request, measurements stored in the memory to fulfill the request. Optionally, the vote analyzer is further configured to receive a second indication that the user provided a second vote regarding a second segment of content consumed by the user on the social network; the system is further configured to receive a third indication that affective response expressed by the user in relation to the consumption of the second segment is not discernible; and the transceiver is further configured not to transmit affective response measurements of the user related to the consumption of the second segment.

Figure 10:
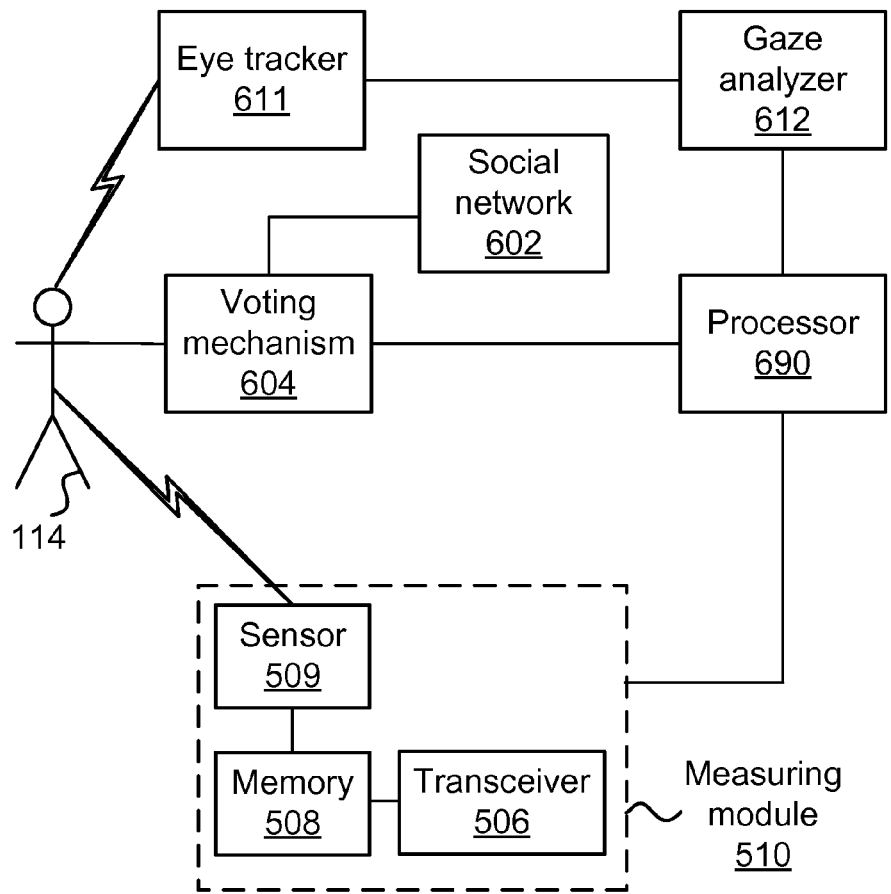
FIG. 10 illustrates one embodiment of a system configured to utilize eye tracking data to reduce volume of transmissions of affective response measurements corresponding to voting on a social network.

FIG. 10 illustrates one embodiment of a system configured to utilize eye tracking data to reduce volume of transmissions of affective response measurements corresponding to voting on a social network. The system includes at least a processor 690 and a gaze analyzer 612.

The processor 690 is configured to receive an indication that a user provided a vote regarding a segment of content consumed by the user on a social network. Optionally, the vote was cast via the voting mechanism 604 belonging to the social network 602. Optionally, the indication indicates that the vote was cast at a certain time. Optionally, the indication indicates a duration during which the segment of content was consumed. Optionally, the indication includes the vote itself and/or data derived from the vote and/or the segment of content.

In one embodiment, the gaze analyzer 612 is configured to receive eye tracking data of the user 114 taken while the user consumed the segment, and to make a determination, based on the eye tracking data, that a gaze-based attention level to the segment reaches a predetermined threshold. Optionally, the gaze analyzer 612 utilizes the eye tracker 611 for obtaining the eye tracking data. Optionally, the predetermined threshold refers to a minimal level of attention the user 114 should be paying to the content. Optionally, the predetermined threshold refers to a minimal duration the user 114 should be looking at the content. Optionally, the processor 690 is also configured to receive a characteristic of the segment, and to set the predetermined threshold based on the characteristic of the segment.

The processor 690 is also configured to request from the measuring module 510, based on the indication and determination, to transmit affective response measurements of the user which are related to consumption of the segment. Optionally, at least some of the measurements that are requested were taken before the request is received by the measuring module. Thus, at least some of the requested measurements may be stored in the memory 508 belonging to the measuring module 510. Optionally, the processor 690 indicates to a transmitter to send a request for measurements to the measuring module 510. Optionally, the measuring module 510 and/or the sensor 509 are implanted in the user.

If the determination received from the gaze analyzer 612 indicates that the user 114 did not pay sufficient attention to the content, e.g., the gaze-based attention level to the segment does not reach the predetermined threshold, the processor 690 may elect not to request measurements. For example, in one embodiment, the processor 690 is configured to receive a second indication that the user 114 provided a second vote regarding a second segment of content consumed by the user on the social network 602, the gaze analyzer 612 is also configured to receive second eye tracking data of the user taken while the user consumed the second segment and to make a second determination that a gaze-based attention level to the second segment does not reach a second predetermined threshold. Based on the second determination, the processor 690 is configured to request significantly more affective response measurements of the user related to consumption of the segment, than affective response measurements of the user related to consumption of the second segment. For example, significantly more is at least 4 times more. In another example, the processor 690 does not request measurements based on the second determination.

Figure 11:
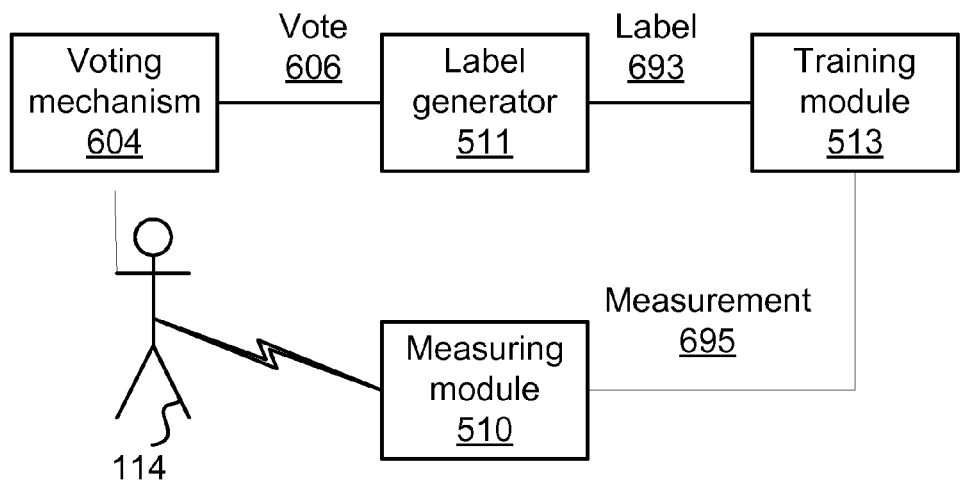
FIG. 11 illustrates an embodiment including a training module that trains an emotional response predictor based on votes and measurements of affective response.

FIG. 11 illustrated one embodiment which includes training module 513 which receives measurement 695 from the measuring module. The training module also receives a label 693 generated by the label generator 511, based on the vote 606, which is received from the voting mechanism 604 on which the user 114 cast a vote. Optionally, label generator 511 is configured to generate the label 693 based on the vote 606, such that the label 693 is indicative of an emotional response, likely felt by the user, which is related to the vote. Optionally, the training module 513 is configured to train a measurement emotional response predictor (measurement ERP) utilizing the label 693 and the corresponding measurement 695 received from the measuring module. Optionally, the label 693 and the corresponding measurement 695 are utilized as a training sample by the training module 513.

In one embodiment, a measurement emotional response predictor (measurement ERP) is utilized by the system to predict emotional response of the user from data comprising a measurement received from the measuring module 510.

Figure 12:
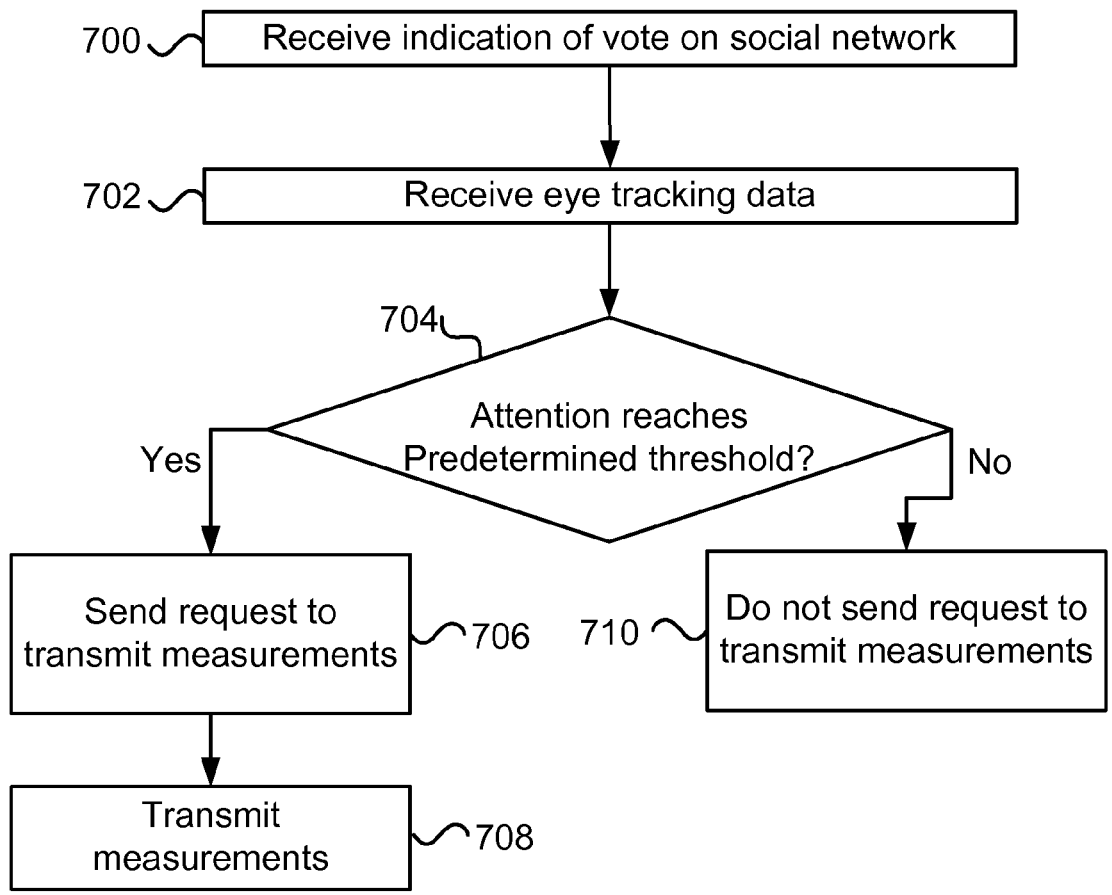
FIG. 12 illustrates one embodiment of a method for utilizing eye tracking data to reduce volume of transmissions of affective response measurements corresponding to voting on a social network.

FIG. 12 illustrates one embodiment of a method for utilizing eye tracking data to reduce volume of transmissions of affective response measurements corresponding to voting on a social network. The method includes the following steps:

In step 700, receiving an indication that a user provided a vote regarding a segment of content consumed by the user on the social network. Optionally, the vote is provided via a voting mechanism belonging to the social network.

In step 702, receiving eye tracking data of the user acquired while the user consumed the segment.

In step 704, determining, based on the eye tracking data, whether a gaze-based attention level to the segment reaches a predetermined threshold. Optionally, the predetermined threshold indicates a minimal desired level of attention of the user.

In step 706, following the "Yes" branch, sending a request to a measuring module to transmit measurements of affective response of the user, taken by the sensor, which are related to consumption of the segment. Optionally, at least some of the measurements are taken before the request is sent.

In optional step 708, transmitting, by the measuring module, after receiving the request, measurements of the affective response of the user taken by the sensor, which fulfill the request.

And in optional step 710, following the "No" branch, refraining from sending a request similar to the one sent in step 672, to the measuring module. This may cause the measuring module not to transmit measurements in a volume that is greater or equal to the volume of measurements sent in step 673. For example, in step 674 no request may be sent, thus the sensor may effectively not transmit measurement data that is related to the vote, if step 674 is executed.

In one embodiment, the method illustrated in FIG. 12 optionally includes the following steps: receiving an indication that the user provided a second vote regarding a second segment of content consumed by the user on the social network; receiving second eye tracking data of the user taken while the user consumed the second segment; determining, based on the second eye tracking data, that a gaze-based attention level to the second segment does not reach a second predetermined threshold; and not sending a second request to the measuring module to transmit measurements related to the consumption of the second segment. Optionally, the method illustrated in FIG. 12 also includes a step of not transmitting, by the measuring module, after receiving the second request, measurements that fulfill the second request.

In one embodiment, the method illustrated in FIG. 12 optionally includes a step involving receiving a characteristic of the segment, and selecting the predetermined threshold based on the characteristic of the segment.

In one embodiment, the method illustrated in FIG. 12 optionally includes a step involving generating a label based on the vote. Optionally, the label is indicative of an emotional response likely felt by the user, which is related to the vote. The method may optionally also include a step of training a measurement emotional response predictor (measurement ERP) utilizing the label and corresponding measurements of affective response received from the measuring module.

In one embodiment, a system including a processor utilizes eye tracking data to reduce volume of transmissions of affective response measurements corresponding to voting on a social network. The system also includes the gaze analyzer 612.

The processor is configured to receive first and second indications that the user 114 provided first and second votes regarding first and second segments of content consumed by the user on the social network 602. That is the first vote corresponds to the first segment, and the second vote corresponds to the second segment. Optionally, the first and second votes are provided via the voting mechanism 604 belonging to the social network 602.

In one embodiment, the a gaze analyzer 612 receives first and second eye tracking data of the user acquired while the user consumed the first and second segments, respectively. Optionally, the gaze analyzer 612 makes a first determination, based on the first eye tracking data, that a gaze-based attention level to the first segment reaches a first predetermined threshold. Optionally, the gaze analyzer 612 makes a second determination, based on the second eye tracking data, that a gaze-based attention level to the second segment does not reach a second predetermined threshold. Optionally, the first and/or second predetermined thresholds represent a minimal level of attention the user should be paying to the content. Optionally, the first and second predetermined thresholds are based on characteristics of the first and second segment, respectively.

The processor is also configured to request, based on the first and second indications and the first and second determinations, significantly more affective response measurements of the user related to consumption of the first segment, than affective response measurements of the user related to consumption of the second segment; whereby significantly more is at least 4 times more. Optionally, the processor does not request measurements for the second segment. In one example, "significantly more" may be infinitely more in the case where the processor requests measurements of the user related to consumption of the first segment and does not request measurements of the user related to consumption of the second segment. Optionally, the processor transmits the request with the transmitter 504.

In embodiment, the processor sends a request for the measurements to the measuring module 510 which provides the affective response measurements of the user. Optionally, the measuring module 510 includes the sensor 509, the memory 508 with capacity sufficient to store measurements of the user 114 taken between the start of consuming the first segment and the time the request for the affective response measurements of the user 114 related to consumption of the first segment is received by the measuring module 510, and a transceiver 506 configured to fulfill the request. Optionally, at least some of the affective response measurements of the user related to consumption of the first segment are taken before the respective request is received by the measuring module. Optionally, the sensor 509 is implanted in the user.

In one embodiment, the measuring module 510 is also configured not to transmit a certain measurement if a request for the certain measurement is not received by the measuring module within a predetermined duration.

In one embodiment, a system configured to utilize eye tracking data to reduce volume of transmissions of affective response measurements corresponding to voting on a social network, comprising: a processor configured to receive an indication that a user provided a vote regarding a segment of content consumed by the user on the social network; wherein the user provided the vote via a voting mechanism belonging to the social network; a gaze analyzer configured to receive eye tracking data of the user taken while the user consumed the segment, and to make a determination, based on the eye tracking data, that a gaze-based attention level to the segment reaches a predetermined threshold; and the processor is further configured to request from a measuring module, based on the indication and determination, to transmit affective response measurements of the user which are related to consumption of the segment; wherein at least some of the measurements are taken before the request is received by the measuring module. Optionally, the processor is further configured to receive a second indication that the user provided a second vote regarding a second segment of content consumed by the user on the social network, the gaze analyzer is further configured to receive second eye tracking data of the user taken while the user consumed the second segment and to make a second determination that a gaze-based attention level to the second segment does not reach a second predetermined threshold; wherein the processor is further configured to request significantly more affective response measurements of the user related to consumption of the segment, than affective response measurements of the user related to consumption of the second segment; whereby significantly more is at least 4 times more. Optionally, the measuring module comprises a sensor, a memory with capacity sufficient to store measurements of the user taken between essentially start of exposure of the user to the segment and the time the request is received by the measuring module, and a transceiver configured to fulfill the request, while reducing unnecessary transmissions, by transmitting, after receiving the request, measurements stored in the memory to fulfill the request. Optionally, the measuring module is further configured not to transmit a certain measurement if a request for the certain measurement is not received by the measuring module within a predetermined duration. Optionally, the system further comprises a label generator configured to generate a label based on the vote; wherein the label is indicative of an emotional response, likely felt by the user, which is related to the vote; and further comprising a module configured to train a measurement emotional response predictor (measurement ERP) utilizing the label and a corresponding measurement received from the measuring module. Optionally, the system further comprises a measurement emotional response predictor (measurement ERP) configured to predict emotional response of the user from data comprising a measurement received from the measuring module. Optionally, the sensor is implanted in the user. Optionally, no request is received for a certain measurement within a predetermined duration, and the measuring module is further configured not to transmit the certain measurement. Optionally, the processor is further configured to receive a characteristic of the segment, and to set the predetermined threshold based on the characteristic of the segment.

In one embodiment, a method for utilizing eye tracking data to reduce volume of transmissions of affective response measurements corresponding to voting on a social network, comprising: receiving an indication that a user provided a vote regarding a segment of content consumed by the user on the social network; wherein the user provided the vote via a voting mechanism belonging to the social network; receiving eye tracking data of the user taken while the user consumed the segment; determining, based on the eye tracking data, that a gaze-based attention level to the segment reaches a predetermined threshold; and sending a request to a measuring module to transmit measurements of affective response of the user, taken by a sensor, which are related to consumption of the segment; wherein at least some of the measurements are taken before the request is sent. Optionally, the method further comprises transmitting, by the measuring module, after receiving the request, measurements of the affective response of the user taken by the sensor, which fulfill the request. Optionally, the method further comprises: receiving an indication that the user provided, via the voting mechanism, a second vote regarding a second segment of content consumed by the user on the social network; receiving second eye tracking data of the user taken while the user consumed the second segment; determining, based on the second eye tracking data, that a gaze-based attention level to the second segment does not reach a second predetermined threshold; and not sending a second request to the measuring module to transmit measurements of affective response of the user, taken by the sensor, which are related to consumption of the second segment. Optionally, the method further comprises receiving a characteristic of the segment, and selecting the predetermined threshold based on the characteristic of the segment. Optionally, the method further comprises generating a label based on the vote; wherein the label is indicative of an emotional response likely felt by the user, which is related to the vote. Optionally, the method further comprises training a measurement emotional response predictor (measurement ERP) utilizing the label and corresponding measurements of affective response received from the measuring module. Optionally, the method further comprises predicting emotional response of the user from data comprising measurements of affective response received from the measuring module.

In one embodiment, a system configured to utilize eye tracking data to reduce volume of transmissions of affective response measurements corresponding to voting on a social network, comprising: a processor configured to receive first and second indications that a user provided first and second votes regarding first and second segments of contents consumed by the user on the social network, respectively; wherein the user provided the first and second votes via a voting mechanism belonging to the social network; a gaze analyzer configured receive first and second eye tracking data of the user acquired while the user consumed the first and second segments, respectively; the gaze analyzer is further configured to make a first determination, based on the first eye tracking data, that a gaze-based attention level to the first segment reaches a first predetermined threshold, and to make a second determination, based on the second eye tracking data, that a gaze-based attention level to the second segment does not reach a second predetermined threshold; and the processor is further configured to request, based on the first and second indications and determinations, significantly more affective response measurements of the user related to consumption of the first segment, than affective response measurements of the user related to consumption of the second segment; whereby significantly more is at least 4 times more. Optionally, the system further comprises a measuring module which provides the affective response measurements of the user; the measuring module comprises a sensor, a memory with capacity sufficient to store measurements of the user taken between the start of consuming the first segment and the time the request for the affective response measurements of the user related to consumption of the first segment is received by the measuring module, and a transceiver configured to fulfill the request; wherein at least some of the affective response measurements of the user related to consumption of the first segment are taken before the respective request is received by the measuring module. Optionally, the measuring module is further configured not to transmit a certain measurement if a request for the certain measurement is not received by the measuring module within a predetermined duration. Optionally, the sensor is implanted in the user, and the first and second predetermined thresholds are based on characteristics of the first and second segment, respectively.

Figure 13:
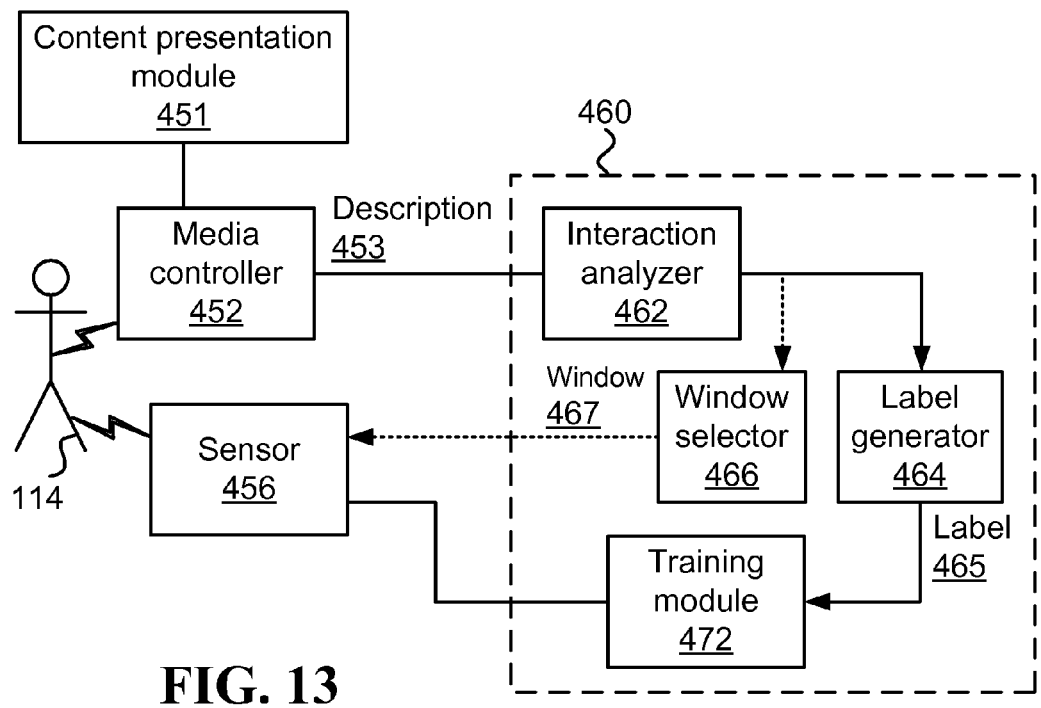
FIG. 13 illustrates one embodiment of a system configured to train an emotional response predictor.

FIG. 13 illustrates one embodiment of a system 460 configured to collect samples comprising labels and affective response measurements. The system 460 includes at least an interaction analyzer 462, a label generator 464, a window selector 466, and a training module 472.

In some embodiments, the system receives information from a media controller 452. The media controller 452 is a module that controls, at least in part, the progression of presentation of content on the content presentation module 451 to which the user 114 may be exposed. The user 114 may perform actions while interacting with the media controller 452 that may influence the progression of presentation of content on the content presentation module 451. For example, a user may choose to play a video clip, and perform actions such as zooming in on certain regions, repeating the video clip or portions of it, and/or resizing the video clip. In still another example, a user watching television may choose to change a channel, and/or turn the volume up or down. In another example, a user browsing a virtual store may select to closely examine an item in the store, reexamine a previously seen item, request additional information about an item, and/or add item or remove an item from a shopping cart.

An action performed by the user 114 may be indicative of an implicit emotional response felt by the user essentially when performing the action. For example, if the user selects a content item to watch, it may imply the user has an emotional response of interest; however, if the user takes an action that terminates the viewing of content, especially after a short while, the implied emotional response may be of discontent and/or disinterest. This emotional response is considered implied by the action, since the user 114 does not explicitly provide feedback regarding his/her emotional response, such as clicking a "like" button and/or providing a rating for content just consumed. It is noted that actions of the user 114 may be considered implying emotional response even if the user may be aware that emotional response may be determined by the system from the user's actions. For example, the user may be aware of the fact that actions are monitored (e.g., actions are logged by the media controller 452) and/or that the affective response of the user 114 may be measured (e.g., with sensors).

The content presentation module 451 may include elements that expose the user 114 to visual content such as a screen (e.g., television, tablet, smartphone), and/or a head-mounted display (e.g., virtual and/or augmented reality glasses). Additionally or alternatively, the content presentation module 451 may include elements that expose the user to content in which the user utilizes other senses. These elements may include speakers, electrical stimulation, and/or hardware that can expose the user to haptic content (e.g., a moving or vibrating chair and/or game controller) and/or olfactory stimulation.

The user 114 may interact with the media controller 452 in order to perform an action that may influence the presentation of content. The interaction with the media controller 452 may involve various channels of communication depending on the type of input channels the media controller 452 is capable of receiving and/or interpreting. For example, the user 114 may provide verbal commands, perform gestures (detected for instance by a movement-detecting glove and/or a camera), click buttons (e.g., mouse, joystick, touch-screen, keyboard), and/or think of actions (which may be detected by EEG).

The interaction analyzer 462 is configured to receive a description 453 of an interaction of the user 114 with a media controller 452. In one embodiment, the description 453 includes codes or titles that identify specific actions taken by the user. Alternatively or additionally, in one embodiment, the description 453 may include information that may be analyzed in order to detect actions of the user 114. For example, the description 453 may include logs or portions of logs of events and/or triggers of the media controller's API. In another example, the description 453 may include portion of the content presented to the user, and/or measurements of the user 114 (such as, video feed of the user), which can be analyzed to detect actions of the user (e.g., video of the user can be analyzed to determine whether the user performed certain gestures.)

In one embodiment, the interaction analyzer 462 is configured to identify from the description 453 an action that causes a deviation from a typical progression of presentation of the content. Optionally, the typical progression of presentation of content may be considered to be the "natural" way the content would have been presented had the action not taken by the user 114. For example, a typical presentation of a video clip is to play it without interruption; the user does not perform specific actions via the media controller 452 such as pausing, repeating portions, and/or zooming in on certain parts of the clip. Optionally, information obtained by the interaction analyzer 462 regarding the action may be provided to other modules in the system via an indication of the action. In one example, the indication of the action provided by the interaction analyzer 462 includes describes of aspects of the action, such as the type of action, the time when the action took place, and/or the portion of content that may have triggered the action and/or to which the action may relate. In another example, the indication of the action is a form of a code from which other modules in the system may deduce aspects of the identified action (e.g., the type of action and/or when it took place). In yet another example, the description 453 itself, or a portion of the description 453, are used as the indication of the action. Optionally, the interaction analyzer 462 provides the indication of action to the window selector 466.

The label generator 464 is configure to generate a label 465 based on the description 453 received from the interaction analyzer 462 and/or the indication of the action generated based on the description 453. The label 465 may be indicative of an emotional response, likely felt by the user 114, which is related to the action. For example, if the action involves the user 114 changing a channel after a few seconds of viewing, the label 465 may represent an emotional response such as discontent and/or dislike on the part of the user 114. Alternatively, the label 465 may be indicative of the action. For example, the label 465 may be "closing content" or "bringing content to foreground". The label generator 464 forwards the label 465 to the training module 472.

In one embodiment, the label 465 is indicative of an expected affective response of the user 114. For example, the label 465 may correspond to a smiling face (e.g., the label may be used to annotate images of the user). In another example, the label 465 may indicate physiological phenomena like "increased heart rate" (of the user) or "brainwave patterns of high arousal levels".

In one embodiment, the label 465 assigned by the label generator 464 essentially depends on the type of the action. For example, any action that involves stopping content, or replacing it (e.g., changing a channel) may be assigned a label corresponding to a negative emotional response (e.g., disinterest). In another example, any action involving a user requesting additional information about an object from an augmented reality system, may be labeled as the user showing interest.

The label generator 464 may be required to perform analysis the indication of action in order to generate the label 465. For example, the indication of action may include text corresponding to a command issued by the user, and the label generator 464 utilizes semantic analysis of the text in order to determine the emotion expressed by the user. In some cases, the manner in which the action was performed may be utilized by the label generator 464. For example, if the indication of action indicates that the user pressed a button to stop the presentation of content, the label 465 may correspond to an emotional response of disinterest. However, if the indication of action indicates that the user 114 pushed the button three times while applying pressure, the emotional response may be set to something on the lines of "significantly annoyed".

Often, determining the emotional response which may be associated with an action depends, at least in part, on the context in which the action is performed. Factors such as the type of content, the type of action, the situation in which the user 114 is, and/or how long the user 114 has been consuming the content, may all influence the likely emotional response that may be determined. For example, under usual conditions, if the user changes a channel it may indicate disinterest in a television show; however, if it is 8 o'clock, and it is known that the user likes to watch the news at 8, then the changing of the channel does not have to indicate disinterest in the program that was shown, since in that context, it is expected that the user would change the channel. In another example, the fact that the user switched a channel after viewing content for an hour, should not be judged the same as switching a channel after ten seconds. In the latter case, the action is more likely to express disinterest of the user (seeing what is on, the user decided to change the channel). In the former case, the program might have ended, and that is the reason the user switched a channel (and thus there might not be a negative emotional response associated with the action).

In one embodiment, the label generator 464 is configured to generate the label utilizing features derived from the content presented to the user 114. Analyzing the content, such as determining the type of content and/or its genre, identifying characters in the content, and/or events may help the label generator 464 determine the label 465. Optionally, the label generator 464 may utilize information related to past content consumed by the user in its analysis of the content. Optionally, the label generator may utilize a content ERP (Emotional Response Predictor) to determine the expected emotional response of the user to content (and the accompanying action). Optionally, the prediction of emotional response made by the content ERP is a prediction of the emotional response of the user 114. Alternatively or additionally, the prediction of emotional response made by the content ERP is a prediction of emotional response of a representative user. Utilizing the content as a source of information may assist the label generator 464 in order to assign more accurate and/or refined labels.

In one example, the label generator 464 may analyze video content to determine whether the football team playing is the user's favorite team, and what is the score. This can help the label generator 464 decide whether the fact that the user chose to replay a portion of the game, is an expression of excitement (the user's team scored a goal), or an expression of disappointment at the rival's success. In another example, purchasing items on an online store is likely to be labeled with an accompanying emotional response of excitement. Analysis of the content may reveal whether the purchase is a new game (the label may correspond to "very exciting"), or car insurance (the label may correspond to "mildly annoyed").

In one embodiment, the label generator 464 is configured to utilize physiological measurements of the user 114 to generate the label 465. Optionally, the measurements are obtained from the sensor 456. The physiological measurements of the user (e.g., heart rate, EEG, and/or GSR) taken during the window 467 corresponding to the indication of action, are provided to a measurement ERP (Emotional Response Predictor). The measurement ERP may be utilized to predict the emotional response of the user that corresponds to the action. Optionally, the prediction of emotional response made by the measurement ERP is a prediction of the emotional response of the user 114. Alternatively or additionally, the prediction of emotional response made by the measurement ERP is a prediction of emotional response of a representative user. Utilizing the measurements as a source of information may assist the label generator 464 in order to assign more accurate and/or refined labels. For example, an indication of action, which indicates that the user 114 selected to purchase an item, may be labeled as the user showing interest and/or excitement. However, measurements of the user's physiological signals, such as heart rate and/or GSR can be used to determine the extent of the emotional response (e.g., "mildly interested" or "ecstatic").

In one embodiment, the label generator 464 is configured to utilize a facial expression analyzer to analyze an image of a face of the user 114 captured substantially during the window 467, in order to generate the label 465. By stating that the image was captured substantially during the window 467, it is meant that the image was captured in the window, or very close to it (such as one or two seconds before and/or after the window). A facial expression analyzer is a type of measurement ERP that receives as input images of a face, and predicts an emotional response corresponding to the image. Optionally, the prediction of emotional response made by the facial expression analyzer is a prediction of the emotional response of the user 114. Alternatively or additionally, the prediction of emotional response made by the facial expression analyzer is a prediction of emotional response of a representative user. Utilizing the images of the face of the user 114 as a source of information may assist the label generator 464 in order to assign more accurate and/or refined labels. In one example, an action of the user 114 may indicate a request by the user to replay a portion of a clip. Generally, this indicates interest on the part of the user. Analysis of the user's face may help to create a more accurate label. For instance, if the user's face expresses fixation and concentration, it is likely that the user is interested in the clip; however, if the user has a neutral expression, that may indicate a low level of interest (perhaps the user was distracted and simply wants to see what he or she missed). In another example, the user 114 is presented with search results, and the action indicates that the user selected a certain result. Analysis of an image of the face, taken at the time of selection, may indicate how excited the user is regarding the result.

By utilizing the measurement ERP in determining the label 465, the system may bootstrap training of models of the user, to form a personal ERP. For example, initially, a measurement ERP that is primarily trained on other users' data may be used to predict emotional responses of the user. However, as the system acquires more data of the user 114 (e.g., sample that include measurements of the user 114 and their corresponding labels), and trains an ERP on this data, the ERP becomes more personalized for the user 114, and is better able to make accurate predictions for the user 114.

Figure 14:
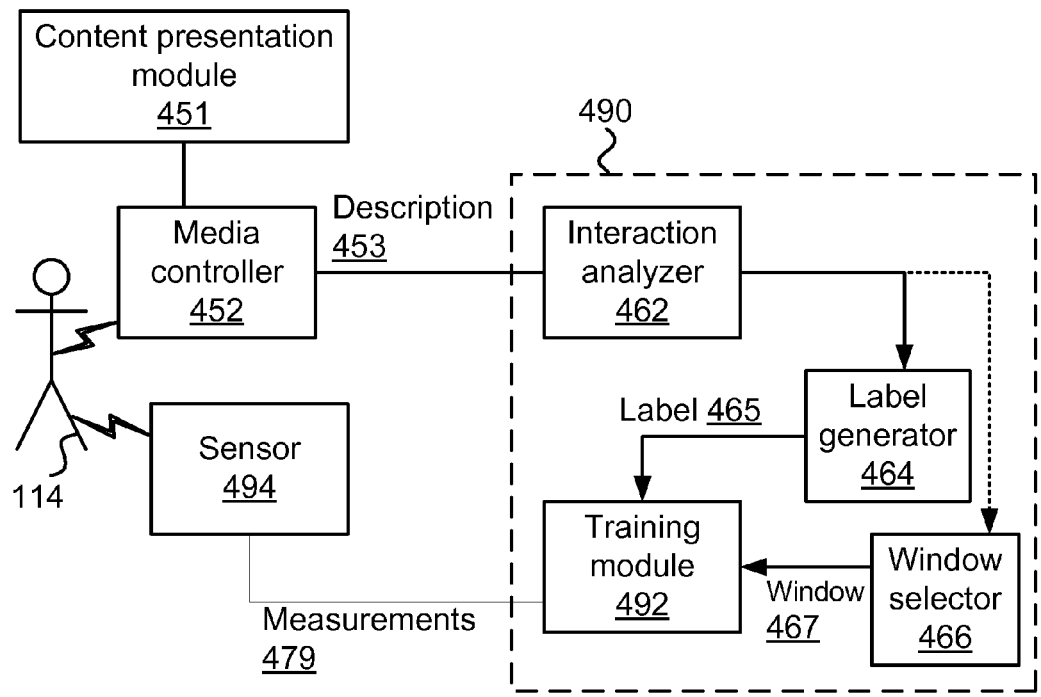
FIG. 14 illustrates one embodiment of a system configured to train an emotional response predictor in which a window is forwarded to a training module.

In one embodiment, the window selector 466 is configured to select a window 467 representing a period of time during which the user 114 likely expressed an affective response. FIG. 13 illustrates one embodiment in which the window 467 is forwarded to the sensor 456, which provides the training module 472 affective response measurements corresponding to the label 465. In the case of FIG. 1, the sensor 456, or a module coupled to the sensor, may include a memory and a processor configured to select from the memory relevant measurements according to the window, and to provide the relevant measurements to the training module. FIG. 14 illustrates a variation in which the window 467 is forwarded to the training module 492. In the case of FIG. 14, the training module 492 may select, according to the window 467, a relevant affective response measurement from amongst the affective response measurements 479 received from the sensor 494. The training module 492 proceeds to utilize the relevant measurement in training an affective response model.

The affective response expressed by the user 114 may be a physiological and/or behavioral manifestation of the emotional response that may be associated with the label 465. The affective response may be measured with a sensor. The window 467, selected by the window selector 466, is intended to be a period in time that overlaps, at least in part, with the time during which the affective response is expressed by the user 114. Since affective responses often have short durations, spanning fractions of seconds (e.g., EEG measurements and/or facial micro-expressions) to several seconds (e.g., changes to heart rate and/or GSR) and possibly tens of seconds (e.g., skin temperature changes), the window 467 may be relatively short compared to the period during which the user 114 consumes the content to which the user 114 has the affective response. Optionally, the window 467 may be selected according to characteristics of the action and/or the content. For example, a window's duration may correspond to a duration of a video clip that is being replayed by the user.

In one embodiment, the window selector 466 is configured to select a window 467 during which the user 114 likely expressed an affective response related to the label 465. Optionally, the length of the window 467 may be shorter than duration in which the user consumes the content, and corresponds to the expected duration of the affective response and/or the duration required to acquire a representative measurement of the affective response related to the action. In the embodiments, a first duration that is significantly shorter than a second duration means that the first duration is at most half of the second duration. For example, a user may view a video clip lasting minutes, but the window 467 generated due to an action might span a few seconds (e.g., in order to collect and/or analyze EEG signals).

In one embodiment, the duration of the window 467 is set in accordance with the sensor 456 which is used to measure the affective response of the user 114. For example, measuring brainwaves with EEG may require a short measuring period (e.g., around a second) to acquire relevant measurements. However, detecting changes in GSR may require longer periods (e.g., ten seconds).

In some embodiments, the window selector 466 sets the window 467 based on the indication of action received from the interaction analyzer 462. Setting the window 467 may depend on various characteristics of the indication of action, and/or of the content presented to the user (e.g., how the action changed the progression of the presentation of the content).

In one example, the user 114 views content that includes video, and the indication of action is indicative of a request by the user to play a segment of the video again. It is likely that the user felt interested in the content during the period corresponding to the segment, so the window may be set to overlap, at least in part, with the length of the initial segment chosen by the user to be played again, and optionally at least in part with the length of the replayed segment.

In another example, the user is exposed to content that includes items presented substantially serially, such as browsing comments and/or updates on a social network. The action may be indicative of a request by the user 114 to have one of the items presented again (e.g., by hitting the "back" button to go back to a previously viewed message). In this case, the items may include text, and the window may be set to be proportional to size of a portion of the text the user requests to have presented again. This may correspond to the amount time the user expressed an emotional response to the text. Alternatively, the window may set to be proportional to first duration the user spent reading the portion of the text that was presented again to the user.

In yet another example, the content the user 114 is exposed to may include an image, and the action is indicative of a request by the user to edit the image. Editing an image may involve actions such as resizing the image, rotating it, focusing the image, cropping the image, and/or applying various visual effects to the image (e.g., changing color and/or lighting schemes). In this example, the window 467 may be set to be proportional to how long the image was presented to the user 114 prior to the editing action, because it is likely that during this time the user found something of interest in the image.

In some embodiments, the window selector 466 sets the window 467 to end in temporal vicinity of when the action is taken by the user. Herein, temporal vicinity refers to closeness in time. For example, two events that occur in temporal vicinity, occur at times close to each other. Thus, in some cases, the window 467 may end slightly after the action is taken, however the majority of the window 467 corresponds to a period before the action is taken. Since a large part, if not all, of the window 467 falls before the action takes place, the measurements of affective response of the user 114 need to be stored in a memory. Upon the setting of the window 467, measurement values stored in the memory may be forwarded to the training module, e.g., to be used in training.

In order to accurately capture an affective response of the user related to an action taken while consuming content, in some embodiments, a window selected by the window selector 466 is typically shorter than the time the user spent consuming the content. Thus, the affective response measurements taken in the window are more likely to accurately reflect the emotional response related to the action, compared to affective response measurements taken throughout the period in which the user consumes the content; the latter measurements are more likely to reflect an emotional response of the user that relates to the content, rather than an emotional response related to the action. Additionally or alternatively, in some embodiments, the window is selected such that it ends in temporal vicinity of when the action is taken. Thus, affective response measurements taken in the window are likely to reflect an emotional response of the user to the action; during the time corresponding to the window, the user is likely to be thinking of the action since the user is either about to perform the action or is in the process of performing the action.

In some embodiments, the window selector 466 may select the window based on analysis of the content. Optionally, the analysis of the content may reveal a portion of the content that likely is associated with the action identified by the content analyzer. Optionally, the portion identified as associated with the action may have a shorter duration than the content being consumed by the user 114. For example, in a case where the user 114 watches a video clip, and requests to replay a portion, the window selector may analyze the replayed portion to determine the likely event or portion that triggered the action. For example, the video might be analyzed to detect changes in the scenes or sound energy (e.g., crowd cheering or sound of a gunshot). A window might be selected around the identified event (e.g., starting when the crowd begins to cheer); the window can be shorter than the whole clip being viewed by the user (e.g., the clip may include game play spanning minutes). In another example, semantic analysis may be analyzed in order to detect portions of content that are likely to evoke an emotional response (e.g., portions that include expressions of strong language and/or emotionally charged expressions). The window selector may place a window at the beginning of the appearance of the identified portions, which are likely associated with actions performed by the user (e.g., turning up the volume of a clip, or selecting portions of text or a video clip). These portions are likely to be shorter than the entire segment of content consumed by the user (e.g., a full dialogue between characters in a movie).

In one embodiment, characteristics of the content that are indicative of a length and/or intensity of an emotional response of the user to the content may influence the selection of the length of a window. For example, the user may be consuming personal content to which the user has a strong emotional connection (e.g., viewing old pictures of family on a tablet). Given that the user may be nostalgic, it is likely that the user may feel an intense emotional response, and possibly for a longer duration, compared to when the user views ordinary images; such as images of cats on a website—unless the user has very strong feeling towards cats, in that case this example may be reversed. Thus, in the case that the user has strong nostalgic feelings, the window selector may tend to select longer windows, such as when the user views ten year-old family pictures, compared to the length of windows selected when the user views images of internet memes involving cats (or vice versa).

The training module 472 is configured to utilize the label 465 and an affective response measurement of the user 114 taken substantially during the window 467. Optionally, the affective response measurement of the user 114 is provided by the sensor 456. In one example, the sensor 456 may be a physiological sensor (e.g., a sensor that measures heart rate, galvanic skin response, and/or brainwave activity), and/or a sensor that measures the user's behavior (e.g., a camera and/or a motion detector). The training module 472 is also configured to train an emotional response predictor with the label 465 and the affective response measurement taken during the window 467.

The label 465 and affective response measurement can represent a training sample corresponding to the user 114. In some cases, the training sample may represent a measurement of a genuine and/or spontaneous expression of affective response of the user 114 with a corresponding label indicative of the emotional response felt at the time of the measurement and/or the action taken by the user 114 at that time. Thus, a predictor of emotional response trained on such a sample may be able learn aspects that characterize expressions of emotional response of the user in day-to-day situations; making the predictor better suited to recognize the spontaneous and possibly subtle emotional responses of the user.

In one embodiment, the training module 472 receives one or more affective response measurements from the sensor 456. The one or more affective response measurements are taken by the sensor 456 essentially during the window 467 and correspond to the label 465. Optionally, the training module includes a mechanism able to associate the measurements sent by the sensor 456 with their corresponding label 465.

In one embodiment, the training module receives measurements of affective response that may have been taken during periods that span the window 467 and perhaps additional periods of time before and/or after the window 467. The training module may utilize one or more values from the received measurements of affective response in order to obtain the affective response measurement of the user 114 taken substantially during the window 467 and store it in a memory. For example, the measurements before and/or after the window 467 may be used to establish a baseline value against which measurements taken during a period defined by the window 467 may be compared.

In one embodiment, the affective response measurement stored by the training module includes a time series with multiple values. For example, the training module may store a plurality of values representing a pattern of brainwave activity of the user 114 corresponding to measurements taken during a plurality of time points in the window 467. In another example, the training module may store a plurality of images of the user 114, such as a short video clip taken during the window 467.

The window 467 may include multiple measurements which may be received by the training module. In some cases, the training module may need to select one or more measurements from the plurality of measurements it received. Optionally, the selected measurements are ones that reflect the emotional response indicated by the label 465. There are different approaches that may be utilized by the training module in order to select relevant measurements from the plurality of measurements taken in a window.

In one embodiment, the training module selects and/or computes a measurement from a plurality of measurements taken essentially during the window 467, in order to store the measurement in a memory. Optionally, the training module selects a value that corresponds to a statistic of the plurality of measurements, such as a maximum, minimum, average, median, and/or other statistics that may be computed from the plurality of measurements.

In one embodiment, the training module utilizes a measurement ERP in order to identify a measurement, from amongst a plurality of measurements taken during the window 467, which corresponds to an emotional response indicated by the label 465. For example, the label 465 may indicate that the user 114 is disinterested (e.g., due changing a channel after less than a minute). The window 467 in this example may be set to have a duration of 20 seconds essentially ending at the time of the channel changing. During this time, the user 114 is measured by the sensor 456 which measures EEG brainwave activity. The training module may utilize a measurement ERP that predicts emotional response from EEG measurements in order to determine which time point, or period within the window, best reflects a state of disinterest, and store in memory the measurement from that time or period. In another example, the label 465 may indicate the user 114 is excited (e.g., due to repetitively viewing a chase sequence in a movie). The window 467 in this example may be ten seconds long, and during this time the user was filmed with a video camera. The training module may utilize a facial expression analyzer in order to detect which frames reflect an expression of excitement, and store those in a memory accessible to the training module.

In one embodiment, the training module may utilize analysis of content to which the user is exposed in order to select time points in a window 467 that are likely to represent an emotional response indicated by a label 465. For example, a user watching a television channel may change a channel. As a result, a window of 20 seconds may be defined, and a label indicating an emotional response of disinterest is generated. Analysis of the content may help to reveal if a commercial began during the window, making around that time point the likely moment in which the user most likely expressed the disinterest. Thus, the sample collector may select to store a measurement of the user essentially from that time.

In one embodiment, illustrated in FIG. 2, the training module 492 receives measurements of affective response taken by the sensor 494, essentially as they are measured (i.e., there might be a slight delay due to processing and/or transmitting issues). The training module 492 may store or buffer these measurements for a certain duration. For example, the measurements may be stored by the training module 492 for a duration that goes back as least as far back as the start of a window is likely to be. Thus, upon receiving a window, the sample collector is able to retrieve from its memory measurement values that fall within the window.

Alternatively or additionally, the training module 492 may be configured to request measurements of affective response taken during a period defined by the received window 467. For example, after receiving the window 467, the training module 492 may request from the sensor 494 and/or another component with access to measurement values, to send the measurement values. The sensor 494 and/or another component with access to measurement values may have a memory storage, such as a buffer, in which it stores measurement values. Upon receiving a request from the training module, the sensor 494 and/or the other component with access to measurement values, may retrieve the relevant values from the storage and send them to the training module 492.

In some embodiments, the training module is configured to train an Emotional Response Predictor (ERP) with the label and the received and/or stored affective response measurement. Optionally, the ERP is a measurement ERP that predicts an emotional response from a measurement of affective response.

In one example, the affective response measurement received from the sensor may be converted by the training module to one or more feature values of a training sample, and the label may serve as the corresponding label for the training sample. The training module may adjust one or more parameters in a model utilized by and ERP, according to the training sample, and by doing so may improve the performance of the ERP; for instance, making the ERP more accurate.

In one embodiment, the ERP trained by the training module is configured to predict emotional response from facial expressions. The affective response measurement received from the sensor, which may be an image capturing device, and includes a certain representation of an image of a face of the user (e.g., a file of the image and/or feature values derived from the image).

In one embodiment, the training module is configured to utilize the label and a facial expression analyzer in order to select the certain image, from among images received during the window. The training module may receive a plurality of images of the user taken essentially during the window. However, not all images are likely to clearly depict a facial expression corresponding to an emotional response indicated by the label. Thus a facial expression analyzer, which is a measurement ERP that receives measurement values derived from images, may be utilized in order to select an image and/or multiple images (e.g., a video clip), in which the indicated emotional response is expressed. For example, the training module may scan images taken during a window of ten seconds, in order to find an image of the user, in which the user has an expression that resembles an expression of concentration, as determined by a facial expression analyzer. Doing this enables the training module to obtain a sample image of how the user looks when concentrating (which might be slightly different from how other people look when they concentrate). Thus, if the training module utilizes the sample for training a model used for facial expression analysis, the trained model may become better suited for analyzing facial expressions of the user.

In one embodiment, the training module is configured to utilize a physiological measurement of the user, taken substantially during the window, in order to select the certain image, from among images acquired during the window. For example, the physiological measurement is taken between a couple of seconds before to a couple of seconds after the window. During that time there may be several values of physiological measurements corresponding to various physiological states. For example, GSR measurements may indicate different levels of excitement the user experienced during window. Thus, in order to select the certain image used by the training module, the training module may choose an image taken essentially the same time the user was in a desired physiological state. For example, the training module may receive EEG measurements of the user taken while the sensor, which is a camera, captures images of the user. The label may indicate that the user likely expressed an emotional response of interest (e.g., because the user zoomed in on a portion of an image); and the window defines the period during which the user likely expressed the interest. Thus, in order to choose an appropriate image that reflects the emotional response indicated by the label, the training module can utilize the EEG measurements taken essentially during the window. The training module may use the EEG measurements to determine when the user was most alert and/or concentrated during the window, and select an image taken in proximity to that time.

In one embodiment, the ERP is configured to predict emotional response from physiological measurements (measurement ERP), and the affective response measurement used by the ERP includes a physiological measurement of the user. Optionally, the physiological measurement is taken by the sensor while measuring the user. For example, the measurement ERP may predict emotional response from physiological signals such as heart rate, GSR, and/or brainwaves measured by EEG.

In one embodiment, the system 460 is implemented on a single device, such as a computer, a laptop, a smart phone, or a tablet. Optionally, the media controller 452, and/or the content presentation module 451, are part of the same device (e.g., the content presentation module 451 includes a screen belonging to the device). Similarly, in another embodiment, the system 490 is implemented on a single device, such as a computer, a laptop, a smart phone, or a tablet.

In one embodiment, one or more of the components of the system 460 run, at least in part, on a processor typically remote of the user 114, such as a cloud-based server. For example, the description 453 may be sent to a cloud-based server, which may generate the label 465, and/or the window 467, which may be sent to the training module which may run, at least in part, on a processor belonging to a device of the user 114. Alternatively or additionally, the training module may also run, at least in part, on a remote cloud-based server. The sensor 456 may send, to the cloud-based server, measurements of the affective response of the user 114, which are used to generate the measurement stored in the memory accessible to the training module. Similarly, in another embodiment, one or more of the components of the system 469 run, at least in part, on a processor typically remote of the user 114, such as a cloud-based server.

FIG. 14 illustrates one embodiment of a system 490 configured to collect samples comprising labels and affective response measurements. The system 490 includes at least an interaction analyzer 462, a label generator 464, a window selector 466, and a training module 492. In this embodiment, The training module 492 is configured to receive the label 465, the window 467, and affective response measurements 479 of the user 114 taken by the sensor 494 during the interaction of the user 114 with the media controller. The training module 492 is configured to utilize the measurements 479 to obtain a relevant affective response measurement that corresponds to the window 467.

In one embodiment, the sensor 494 may be a physiological sensor (e.g., a sensor that measures heart rate, galvanic skin response, and/or brainwave activity), and/or a sensor that measures the user's behavior (e.g., a camera and/or a motion detector).

In one embodiment, the system 490 includes a processor that is configured to receive the window 467 and affective response measurements 479 taken by the sensor 494. The processor is configured to select a relevant affective response measurement according to the window 467. In one example, the relevant affective response measurement may be chosen from amongst one or more measurements 479, which were taken substantially during the window 467. In another example, the relevant affective response measurement is computed from one or more of the measurements 479 substantially during the window 467 (e.g., the relevant measurement is a result of processing one or more of the received measurements). Optionally, the processor is part of the training module 492. Alternatively, the training module 492 may run on the processor.

The training module 492 is also configured to train an emotional response predictor with the label 465 and the relevant affective response measurement. The label 465 and relevant affective response measurement can represent a training sample corresponding to the user 114. In some cases, the training sample may represent a measurement of a genuine and/or spontaneous expression of affective response of the user 114 with a corresponding label indicative of the emotional response felt at the time of the measurement and/or the action taken by the user 114 at that time. Thus, a predictor of emotional response trained on such a sample may be able learn aspects that characterize expressions of emotional response of the user in day-to-day situations; making the predictor better suited to recognize the spontaneous and possibly subtle emotional responses of the user.

Figure 15:
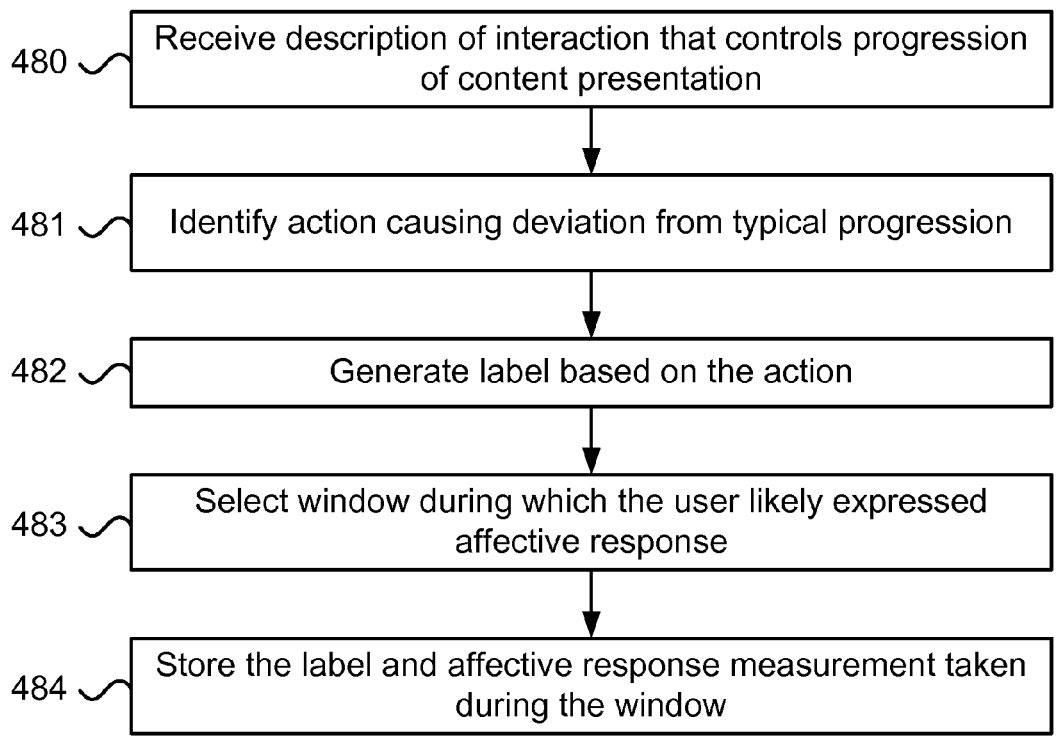
FIG. 15 illustrates one embodiment of a method for training an emotional response predictor with an automatically collected sample.

FIG. 15 illustrates one embodiment of a method for collecting samples comprising labels and affective response measurements. The method includes the following steps:

In step 480, receiving a description of an interaction of a user with a media controller configured to control progression of presentation of content consumed by the user. Optionally, the content is presented on a content presentation module. The description may include one or more actions taken at the user's discretion that may influence the presentation of the content to the user.

In step 481, identifying from the description an action that causes a deviation from a typical progression of presentation of the content. A typical progression is a progression that would have occurred had the action not taken place. Alternatively or additionally, a typical progression is the most common progression of presentation of content presented to a plurality of users consuming substantially the same content.

In step 482, generating a label based on an indication of the action identified in step 481. The label is indicative of an emotional response, likely felt by the user, which is related to the action. Optionally, the action and the emotional response likely felt by the user are a result of the same cognitive process of the user. Optionally, the indication of the action and the action are essentially the same. Optionally, the indication of the action is derived from the identified action using a lookup table.

In step 483, selecting a window of time during which the user likely expressed an affective response related to the label. Affective responses typically can happen relatively quickly, and often last for short durations (e.g., EEG signals change within fractions of a second); thus, the window is typically shorter than duration in which the user consumes the content. Optionally, the selected window is set to end substantially at the time the action is taken. For example, the window is set to end between a second before to a second after the action is taken by the user. Optionally, to set the duration of the window, at least some of the content the user is exposed to leading up to the time of the action (including the time of the action) is analyzed. The analysis may examine various characteristics of the content in order to determine the length of the window. For example, the analysis may examine aspects such as the length of a scene (e.g., a car chase) to which the user made an action indicating interest; in this example, it is likely that the length of the window may be set not to exceed the length of the scene.

And in step 484, storing in a memory the label and an affective response measurement of the user taken substantially during the window. Optionally, the affective response measurement is received from a sensor that measured the user during the window.

In one embodiment, the affective response measurement stored in the memory in step 484 includes an image of a face of the user. Following step 484, an additional step may include training an ERP (Emotional Response Predictor) with the label and the image. Optionally, the ERP is a measurement ERP that predicts emotional response from facial expressions. The training of the ERP may utilize the stored measurement and label as a training sample. By utilizing a training sample that includes a facial expression of the user, the ERP may improve its ability to more accurately identify characteristics of the user's facial expressions. Thus, the ERP may increase the accuracy of predictions it makes for the user.

In one embodiment, the affective response measurement stored in the memory in step 484 includes a physiological measurement of the user (e.g., measurement of heart-rate, GSR, brainwave activity, muscle tension, and/or electrodermal activity). Following step 484, an additional step may include training an ERP (Emotional Response Predictor) with the label and the physiological measurement. Optionally, the ERP is a measurement ERP that predicts emotional response from physiological measurements.

In one embodiment, a system configured to train an emotional response predictor with an automatically collected sample, comprising: an interaction analyzer configured to receive a description of an interaction of a user with a media controller; wherein the media controller is configured to control progression of presentation of content consumed by the user; the interaction analyzer is further configured to identify from the description an action that causes a deviation from a typical progression of presentation of the content; whereby the typical progression is a progression that would have occurred had the action not taken place; a label generator configured to generate a label based on an indication of the action received from the interaction analyzer; wherein the label is indicative of an emotional response, likely felt by the user, which is related to the action; a window selector configured to select a window during which the user likely expressed an affective response related to the label; wherein the window is shorter than duration in which the user consumes the content; and a training module configured to train the emotional response predictor with the label and an affective response measurement of the user taken substantially during the window. Optionally, the label generator is further configured to utilize features derived from the content to generate the label. Optionally, to generate the label, the label generator is further configured to utilize at least one of: physiological measurements of the user captured substantially during the window, and an image of a face of the user captured substantially during the window. Optionally, the emotional response predictor is configured to predict emotional response from facial expressions; and the affective response measurement comprises a certain representation of image of a face of the user. Optionally, the training module is further configured to utilize the label and a facial expression analyzer in order to select the certain representation of image, from among images received during the window. Optionally, the training module is further configured to utilize a physiological measurement of the user, taken substantially during the window, in order to select the certain representation of image, from among images acquired during the window; wherein the certain representation of image corresponds to a certain physiological state of the user. Optionally, the emotional response predictor is configured to predict emotional response from physiological measurements, and the affective response measurement comprises a physiological measurement of the user. Optionally, the window selector sets the window to end in temporal vicinity of when the action is taken. Optionally, the window selector sets the window based on at least one of: analysis of the indication of the action, and characteristics of the content. Optionally, the action is taken at discretion of the user during the presentation of the content consumed by the user. Optionally, the content comprises video, and the action is indicative of a request by the user to play a segment of the video again; and wherein the window is proportional to length of the segment that is played again. Optionally, the content comprises items presented substantially serially, and the action is indicative of a request by the user to have one of the items presented again. Optionally, the items comprise text, and the window is proportional to at least one of: size of a portion of the text the user requests to have presented again and duration the user spent reading the portion of the text that is presented again. Optionally, the content comprises an image, and the action is indicative of a request by the user to edit the image; and wherein the window is proportional to how long the image was presented to the user. Optionally, the content comprises items, and the action is indicative of at least one of the following: a request by the user to zoom in on a certain item, and a request by the user to bring a certain item to substantially a center of a display. Optionally, the content comprises a result returned from a search query, and the action is indicative of a selection by the user of the result.

In one embodiment, a method for training an emotional response predictor with an automatically collected sample, comprising: receiving a description of an interaction of a user with a media controller that controls progression of presentation of content consumed by the user; identifying from the description an action that causes a deviation from a typical progression of presentation of the content; whereby the typical progression is a progression that would have occurred had the action not taken place; generating a label based on the action; wherein the label is indicative of an emotional response, likely felt by the user, which is related to the action; selecting a window during which the user likely expressed an affective response related to the label; wherein the window is shorter than duration in which the user consumes the content; and training the emotional response predictor with the label and an affective response measurement of the user taken substantially during the window. Optionally, the affective response measurement comprises an image of a face of the user, and the emotional response predictor predicts emotional responses from facial expressions. Optionally, the affective response measurement comprises a physiological measurement of the user, and the emotional response predictor predicts emotional responses from physiological measurements. Optionally, the selecting of the window comprises selecting the window to end in temporal vicinity of when the action is taken.

In one embodiment, a system configured to train an emotional response predictor, comprising: an interaction analyzer configured to receive description of an interaction of a user with a media controller; wherein the media controller is configured to control progression of presentation of content consumed by the user; the interaction analyzer is further configured to analyze the description in order to identify an action that causes a deviation from a typical progression of presentation of the content; whereby the typical progression is a progression that would have occurred had the action not taken place; a label generator configured to generate a label based on an indication of the action received from the interaction analyzer; wherein the label is indicative of an emotional response, likely felt by the user, which is related to the action; a window selector configured to select a window during which the user likely expressed an affective response related to the action; wherein the window is shorter than duration in which the user consumes the content; a training module configured to receive: the label, the window, and affective response measurements of the user taken during the interaction of the user; the training module is further configured to: select, according to the window, a relevant affective response measurement from amongst the affective response measurements, and to train the emotional response predictor with the label and the relevant affective response measurement.

Figure 16:
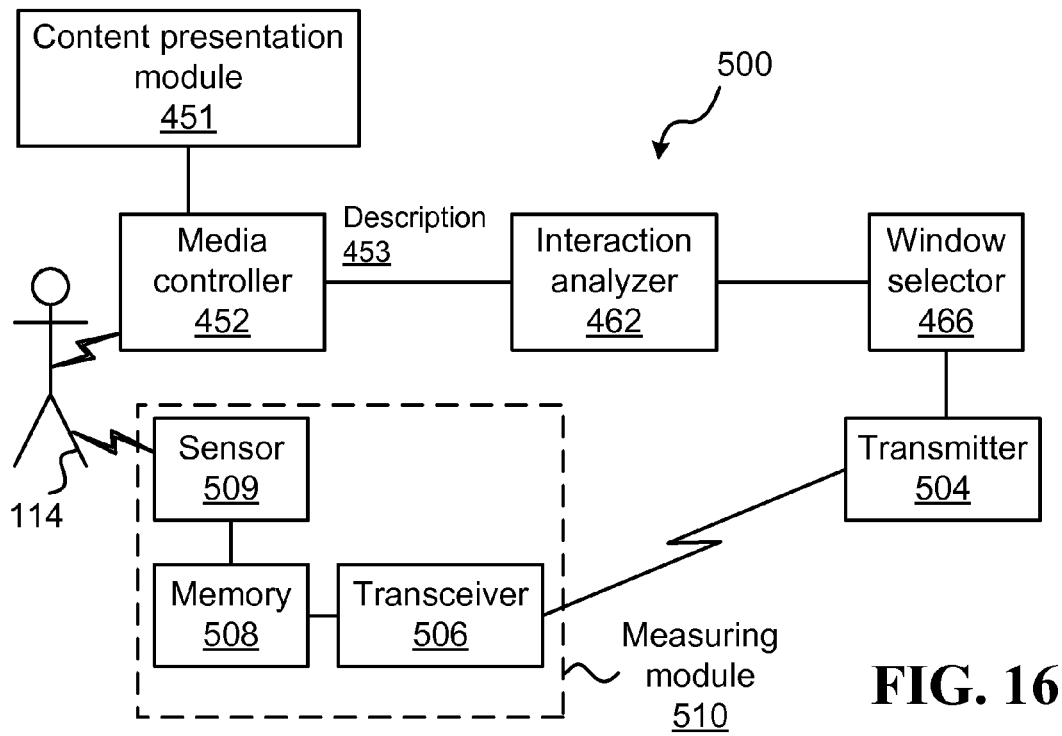
FIG. 16 illustrates one embodiment of a system configured to collect sensor measurements in a manner that reduces volume of transmissions.

FIG. 16 illustrates one embodiment of a system 500 configured to collect sensor measurements in a manner that reduces volume of transmissions. The system 500 includes at least the interaction analyzer 462, the window selector 466, and the transmitter 504. In some embodiments, the system 500 may also include the measuring module 510.

In one embodiment, the interaction analyzer 462 is configured to receive description 453 of an interaction of the user 114 with the media controller 452 that controls progression of presentation of content consumed by the user 114. The interaction analyzer 462 is also configured to analyze the description 453 in order to identify an action that causes a deviation from a typical progression of presentation of the content. Optionally, the typical progression is a progression that would have occurred had the action not taken place.

In one embodiment, the window selector 466 is configured to select a window during which the user likely expressed an affective response related to the action. Optionally, the window is shorter than duration in which the user consumes the content.

In one embodiment, the transmitter 504 is configured to send a request to the measuring module 510 to transmit measurements of the user, taken by the sensor 509, during the window. Optionally, the sensor 509 is implanted in the user. Optionally, start of the window precedes time the request is sent. Optionally, the measurements are received by a receiver and conveyed to a processor that processes the measurements. Optionally, the measurements are provided to a measurement ERP that predicts emotional response of the user 114 based on the measurements.

Figure 17:
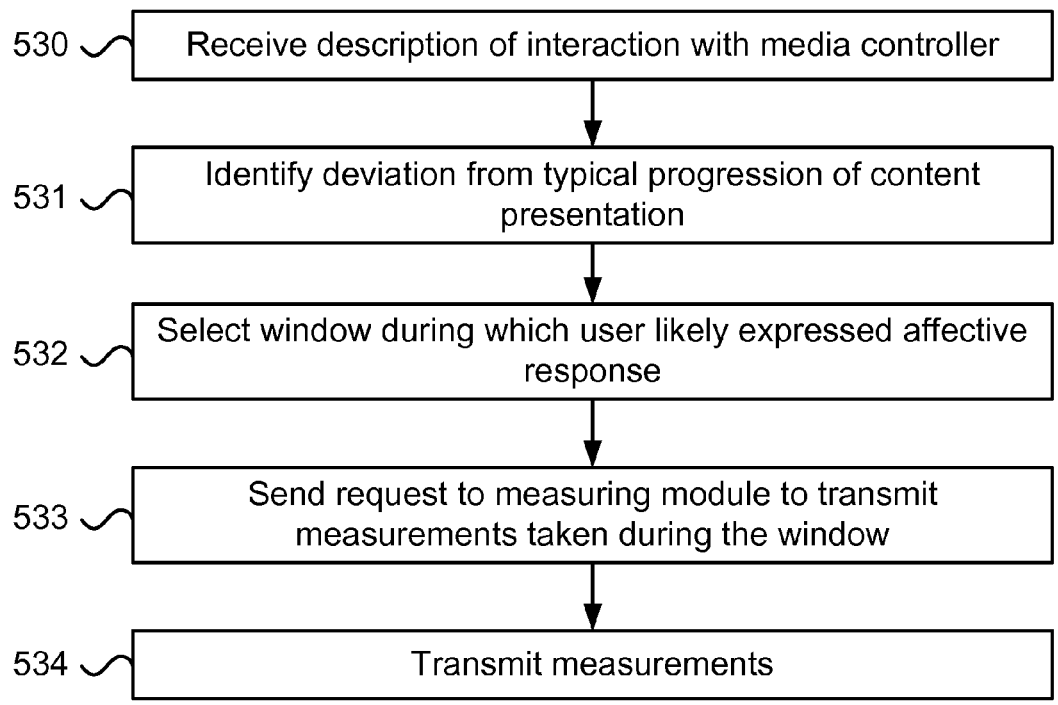
FIG. 17 illustrates one embodiment of a method for collecting sensor measurements in a manner that reduces volume of transmissions.

FIG. 17 illustrates one embodiment of a method for collecting sensor measurements in a manner that reduces volume of transmissions. The method includes the following steps:

In step 530, receiving a description of an interaction of a user with a media controller that controls progression of presentation of content consumed by the user. Optionally, the content is presented on a content presentation module. The description may include one or more actions taken at the user's discretion that may influence the presentation of the content to the user.

In step 531, identifying from the description an action that causes a deviation from a typical progression of presentation of the content. A typical progression is a progression that would have occurred had the action not taken place. Alternatively or additionally, a typical progression is the most common progression of presentation of content presented to a plurality of users consuming substantially the same content.

In step 532, selecting a window of time during which the user likely expressed an affective response related to the action. Affective responses typically can happen relatively quickly, and often last for short durations (e.g., EEG signals change within fractions of a second); thus, the window is typically shorter than duration in which the user consumes the content. Optionally, the selected window is set to end substantially at the time the action is taken. For example, the window is set to end between a second before to a second after the action is taken by the user. Optionally, to set the duration of the window, at least some of the content the user is exposed to leading up to the time of the action (including the time of the action) is analyzed. The analysis may examine various characteristics of the content in order to determine the length of the window. For example, the analysis may examine aspects such as the length of a scene (e.g., a car chase) to which the user made an action indicating interest; in this example, it is likely that the length of the window may be set not to exceed the length of the scene.

And In step 533 sending a request to a measuring module to transmit measurements taken by the sensor during the window. The request may involve a window with a start time that precedes the time in which the request is sent.

Optionally the method described in FIG. 17 may include an additional optional step of transmitting, by the measuring module, after receiving the request, measurements that fulfill the request. Optionally, at least some of the measurements transmitted to fulfill the request are obtained from a memory included in the measuring module, in which measurements of the sensor are stored.

In one embodiment, a system configured to collect sensor measurements in a manner that reduces volume of transmissions, comprising: an interaction analyzer configured to receive description of an interaction of a user with a media controller that controls progression of presentation of content consumed by the user; the interaction analyzer is further configured to analyze the description in order to identify an action that causes a deviation from a typical progression of presentation of the content; whereby the typical progression is a progression that would have occurred had the action not taken place; a window selector configured to select a window during which the user likely expressed an affective response related to the action; wherein the window is shorter than duration in which the user consumes the content; and a transmitter configured to send a request to a measuring module to transmit measurements of the user, taken by a sensor, during the window; wherein start of the window precedes time the request is sent. Optionally, the measuring module comprises the sensor, a memory with capacity sufficient to store measurements of the user taken between the start of the window and the time the request is received by the measuring module, and a transceiver configured to fulfill the request, while reducing unnecessary transmissions, by transmitting, after receiving the request, measurements stored in the memory to fulfill the request. Optionally, the measuring module is further configured not to transmit a certain measurement if a request for the certain measurement is not received by the measuring module within a predetermined duration. Optionally, the sensor is implanted in the user. Optionally, the system further comprises, a label generator configured to generate a label based on the action; wherein the label is indicative of an emotional response, likely felt by the user, which is related to the action. Optionally, the system further comprises a module configured to train a measurement emotional response predictor (measurement ERP) utilizing the label and corresponding measurements received from the measuring module. Optionally, the system further comprises a measurement emotional response predictor (measurement ERP) configured to predict emotional response of the user from data comprising measurements received from the measuring module. Optionally, the window selector sets the window to end in temporal vicinity of when the action is taken. Optionally, the window selector sets the window based on analysis of the action. Optionally, the window selector sets the window based on characteristics of the content.

In one embodiment, a method for collecting sensor measurements in a manner that reduces volume of transmissions, comprising: receiving a description of an interaction of a user with a media controller that controls progression of presentation of content consumed by the user; identifying from the description an action that causes a deviation from a typical progression of presentation of the content; whereby the typical progression is a progression that would have occurred had the action not taken place; selecting a window during which the user likely expressed an affective response related to the action; wherein the window is shorter than duration in which the user consumes the content; and sending a request to a measuring module to transmit measurements taken by the sensor during the window; wherein start of the window precedes time the request is sent. Optionally, the method further comprises transmitting, by the measuring module, after receiving the request, measurements that fulfill the request. Optionally, the method further comprises determining that no request for a certain measurement was received within a predetermined duration, and not transmitting the certain measurement. Optionally, the sensor is implanted in the user, and the measuring module comprises a memory with capacity sufficient to store measurements of the user taken by the sensor between the start of the window and time the request is received by the sensor. Optionally, capacity of the memory is sufficient to store measurements of the user taken at least 100 milliseconds before the request is received by the measuring module. Optionally, the method further comprises generating a label based on the action; wherein the label is indicative of an emotional response, likely felt by the user, which is related to the action; and further comprising training a measurement emotional response predictor (measurement ERP) utilizing the label and received measurements corresponding to the action. Optionally, the window ends in temporal vicinity of when the action is taken. Optionally, selecting the window is based on analysis of the action. Optionally, the selecting of the window is based on characteristics of the content.

In one embodiment, a system configured to collect sensor measurements in a manner that reduces volume of transmissions, comprising: an interaction analyzer configured to receive description of an interaction of a user with a media controller that controls progression of presentation of content consumed by the user; the interaction analyzer is further configured to analyze the description in order to identify an action that causes a deviation from a typical progression of presentation of the content; whereby the typical progression is a progression that would have occurred had the action not taken place; a window selector configured to select a window during which the user likely expressed an affective response related to the action; wherein the window is shorter than duration in which the user consumes the content; a transmitter configured to send a request for measurements of the user, taken by a sensor, during the window; wherein start of the window precedes the time the request is sent; and a measuring module comprising the sensor, a memory with capacity sufficient to store measurements of the user taken between the start of the window and the time the request is received, and a transceiver configured to transmit requested measurements of the user.

Content

Content the user 114 consumes during interactions with a digital device, such as interacting on and/or with a social network, can take many forms. Optionally, at least some of the content the user 114 consumes is presented on a content presentation module. Optionally, consumption of content occurs when the user 114 is exposed to the content (e.g., hears a conversation, sees a text message, or views a video clip). Additionally or alternatively, consumption of content may occur when the user 114 is aware of the content and/or pays attention to the content (e.g., when the user thinks about the content the user is exposed to). Additionally, in some cases, gaining the information conveyed by the content may cause the user to have an affective response; such an affective response is considered an affective response of the user to the content (or phrased alternatively, "the user's affective response to the content").

In one embodiment, the user 114 consumes a segment of content that is generated as part of a conversation between entities, such as humans and/or computers (e.g., an artificial intelligence). The conversation may be between same types of entities (e.g., a conversation between humans), or different types of entities (e.g., a conversation between a user and a computer). Optionally, one of the sides to the conversation may be the user 114. The conversation may take place utilizing one or more channels for conveying information, such as a voice conversation, video conversation, exchange of instant messages, and dialogue between characters in a virtual environment (e.g., characters in a multi-player game).

In one embodiment, the user 114 consumes a segment of content comprising a text message. The text message may be one or more of the following: an instant message, an e-mail, blog post, an article, and/or status update on a social network site.

In one embodiment, the user consumes a segment of content comprising images such as still images and/or video. In one example, the content originates from a computerized source, such as a video clip from an Internet site, and/or a video content generated by a computer game (e.g., depicting characters in a virtual world).

In one embodiment, the user consumes a segment of content comprising non-verbal audio sounds. In one example, the content includes music. In another example, the content includes sound effects, such as sound effects accompanying a computer game (e.g., noises corresponding to shots and/or explosions).

In one embodiment, the user consumes a segment of content in the form of messages and/or feedback from a computerized system the user interacts with. For example, these messages can be system messages such as an indication that the user received a message, an event reminder, a hardware-related message (e.g., no wireless signal). In another example, the content may include feedback from a message composition system, such as highlighting spelling and/or grammar mistakes in a text being composed by a user.

In some embodiments, a segment of content includes one or more portions of content that the user may be exposed to over a period of time. In some cases, a portion of content may belong to multiple segments, for example, a scene from a movie may belong to several segments of the movie, having different lengths and/or starting times in the movie. The segment of content may possess varying lengths and sizes, optionally depending on the type of content it includes and the context in which the segments are used. In one example, the segment of content includes a portion of video lasting a fraction of a second (e.g., a portion of video depicting a gunshot). In another example, the segment of content involves a whole movie, and in this case the segment may span hours.

It is noted that "content" as used herein may refer to a segment of content (e.g., a video clip, a part of a song, a box in webpage, an item viewed in a virtual store), as well as content that may include multiple items (e.g., a whole movie, a song, a web site, a description of a visit to a virtual store).

Social Network

The social network 602 may involve various environments. In some embodiments, the social network 602 is an environment, such as a website, application, and/or virtual world, which users may access in order to consume content. Optionally, users accessing the social network 602 may be considered members of the social network and/or assigned usernames, profiles, and/or avatars that represent their identity in the social network 602. Additionally or alternatively, users of the social network 602 may communicate with each other in the social network 602.

In some embodiments, the user 114 may post content on the social network 602. The posted content may be viewed by the user 114, a subset of users on the social network 602, such as acquaintances of the user on the social network (e.g., Facebook™ friends), members of the social network 602, and/or users that may not be members of the social network 602. Additionally or alternatively, the user 114 may consume content on the social network 602, such as content posted by users of the social network 602, content made available by the operators of the social network 602, and/or content from an external source.

Some examples of social networks may include networks for posting content to family and/or acquaintances such as Facebook™, Instagram™, Twitter™, Google+™, Orkut™, LinkedIn™, Filch™, YouTube™, or Pinterest™; Sites that involve special interests: Imdb™, RottenTomatoes™, Last.fm™, or XING™; Online communities and/or aggregator sites such as Reddit™, Fark™, or Digg™; Merchant sites in which users have profiles and/or comment such as Amazon™ or Ebay™; Networks that enable real time conversations between users such as Skype™ or Whatsapp™.

In some embodiments, a first user of the social network 602 may form a connection with a second user of the social network 602 (e.g., friends on Facebook™ or connections on LinkedIn™). Optionally, a connection on a social network may be referred to as a "friend" on the social network. Forming the connection may provide the second user with a privilege allowing the second user to view content posted by the first user and/or information regarding the first user. Optionally, at least some of the content posted by the first user and/or information regarding the first user may not be accessible to other users of the social network who are not granted the privilege.

Often users that connect share an emotional relationship to some degree (e.g., they are family, friends, and/or acquaintances). Thus, in some cases, the user 114 is likely to express natural and/or stronger emotional responses to content suggested by a friend on the social network 602 and/or to content posted and/or created by a friend on the social network 602; in such cases, the user 114 is likely to be more emotionally involved due to the personal nature of the content, compared to cases in which the user 114 consumes content generated by strangers and/or from an unknown source, to which there is no personal attachment.

In one embodiment, the voting mechanism 604 is part of the social network 602 and/or is utilized by the social network 602. The voting mechanism 604 may be utilized by the social network 602 for various purposes, such as to collect user feedback on various segments of content. The voting mechanism 604 may be a mechanism utilized by users of the social network 602, whether their affective response is measured by a sensor or not. Furthermore, the voting mechanism may be offered substantially independently of whether the votes made on it are used to trigger a sensor to acquire the affective response measurements or not. In one example, by "substantially independently" it is meant that at least 90% of the votes cast via the mechanism are not used to generate labels that are provided to a training module and/or sample generator for the purpose of creating a training sample. In another example, by "substantially independently" it is meant that the voting mechanism was originally designed for other purposes, which are widely used by the social network, such as ranking content on the social network.

In one embodiment, the voting mechanism 604 may include one or more of the following: a like voting mechanism, in which the user indicates a positive attitude towards a content item (e.g., by pushing an appropriate button); a dislike voting mechanism, in which the user indicates a negative attitude towards a content item (e.g., by pushing an appropriate button); a star rating mechanism, in which the user indicates how much he likes an item by giving indicating the number of start the user would like to assign to the item; a numerical rating mechanism, in which the user assigns an item with a score (typically the higher the score, the stronger the indication that the user liked the item); an up voting mechanism, in which the user indicates that he/she likes an item (e.g., by pressing an upward pointed arrow next to the item); a down voting mechanism, in which the user indicates that he/she dislikes an item (e.g., by pressing a downward pointed arrow next to the item); and a ranking mechanism, in which the user may change the order and/or rank of one or more items to reflect the order of preference the user has for the items being ranked.

In one embodiment, the voting mechanism 604 is configured to enable the user 114 to enter a comment containing text, or a comment that can be converted to text. A label generator, such as the label generator 608 and/or 600, is configured to perform semantic analysis on the text in order to generate a label. In one example, the label generator may utilize methods such as Latent Semantic Analysis (LSA) or Latent semantic indexing of text in order to associate a comment with concepts and/or categories corresponding to its meaning. In another example, the label generator 608 may utilize a lexicon that associates words and/or phrases with core emotions. The information regarding which emotions are expressed in the comment can be helpful in determining the meaning and/or sentiment expressed in the comment. In yet another example, the label generator utilizes a predictor of emotions expressed in text. Information regarding the emotion expressed in the comment can help to predict a user's emotional response to a segment of content on which the user commented (e.g., a user might enjoy segment that expresses affection, but dislike a segment that expresses confrontation).

The interaction between the user 114 and the computer system in which the user consumes segments of content are performed in natural situations; for example, the user may be at home, or browsing a social network on a mobile device. In addition, the votes issued by the user may be unsolicited (the user usually can choose whether or not to perform them). This means that the emotional response of the user 114 related to votes is usually natural and/or spontaneous; the use typically does not try to express specific emotions when browsing and/or voting on a social network. Thus, in some embodiments, the system is able to acquire samples of affective response measurements corresponding to natural and/or spontaneous emotional responses of the user 114.

Label Generator

In one embodiment, a label generator, such as the label generator 600 and/or the label generator 608, determines that the user 114 consumed the segment in a duration that is shorter than a predetermined threshold. Optionally, if the label generator determines that the user 114 did not consume the segment in a duration that is shorter than the predetermined threshold, the label generator does not generate a label corresponding to the vote on the segment. Optionally, if the label generator determines that the user 114 did not consume the segment in a duration that is shorter than the predetermined threshold, the label generator indicates that training weight, corresponding to a training sample that involves a label generated from a vote on the segment, should be reduced. There are various ways in which the label generator may determine the duration in which the segment was consumed by the user 114.

In one embodiment, the voting mechanism 604 includes in the vote 606 an indication of the duration. For example, the vote 606 may indicate how long the user viewed an image or a clip, or how much time the user spent reading a message. Alternatively or additionally, label generator 608 may determine the duration based on the content. For example, based on the length of a message, and possibly knowledge of how fast the user reads, the label generator may determine how long it took the reader to read the message.

In another embodiment, the label generator may deduce the duration from the difference in times votes generated by the user are received. For example, if the user rates several segments of content (e.g., votes on several images one after the other), then the time difference between two successive votes may serve as an upper bound on the duration the user spent consuming the segment of content corresponding to the latter vote.

In yet another embodiment, the voting mechanism 604 and/or the social network 602 may provide information regarding the duration in which the user 114 consumed the segment of content. For example, after receiving the vote 606, the label generator 608 may submit a query to the voting mechanism 604 and/or the social network 602 in order to receive information regarding the duration.

In one embodiment, a label generated by a label generator, such as the labels 610, 610a, and/or 610b, may include information that indicates one or more of the following: (i) an emotional response, likely felt by the user 114, which is related to a vote, (ii) an affective response likely expressed by the user 114, which is related to the vote, and/or (iii) details regarding the vote, such as the type of vote, and/or a value expressed in the vote (e.g., the score or start rating expressed in the vote).

It is noted that phrases like "to indicate something" or "indicative of something" are to be interpreted as directly and/or indirectly signaling the something. For example, a phrase like "the label is indicative of an emotional response", means that the label directly or indirectly conveys information regarding the emotional response.

In one embodiment, a label is indicative of an expected affective response of the user 114. For example, the label 610 may correspond to a smiling face (e.g., the label may be used to annotate images of the user). In another example, the label 610 may indicate physiological phenomena like "increased heart rate" (of the user) or "brainwave patterns of high arousal levels" that may be associated with the vote (e.g., a "like" vote).

In one embodiment, a label indicates to a training module a period during which measurements of affective response should be taken so they will correspond to the label. For example, the label 610 may specify a specific period of time, and/or a relative period of time (e.g., the period indicated may be a period of 5 seconds before the vote was cast). Additionally or alternatively, the label 610 may indicate how much measurement data to utilize and/or the type of measurement data to utilize (e.g., which data features should be used by the training module 472).

In one embodiment, a label generator, such as the label generator 608 and/or the label generator 600, is configured to suggest to the training module a training weight for an affective response measurement. For example, the label generator may indicate, for at least some measurements, the weight that should be applied to samples derived from the measurements which are used by the training module. Optionally, the training weight is indicated via the label. In one example, the weight suggested is proportional to the vote. For example, if the vote was a strong positive or negative rating, a suggested weight for the sample may be high since it likely reflects a strong emotion of the user. Similarly, a neutral vote of the user may lead to a low suggested weight since the vote indicates that the user did not have a strong emotional response, thus the affective response measurement of the user corresponding to the vote may not be a good representation of an emotional response of the user.

In one embodiment, a label generator, such as the label generator 608 and/or the label generator 600, is configured to receive an analysis of the content, and to utilize the analysis of the content to generate the label. The analysis of the content may help to better define and/or refine the emotional response expressed via the vote. For example, a user may indicate that she likes a segment of content for several reasons, because it excites her, moves her, and/or humors her. However, a vote in which she presses a "like" button may merely express a positive attitude towards the content. By analyzing the content to determine whether the content is an action sequence, contains a recitation of poetry, or a joke, it may be plausible to refine the positive sentiment expressed via the vote, in order to determine a more specific emotional response (e.g., excitement, feeling inspired, or amused).

In one embodiment, a label generator, such as the label generator 608 and/or the label generator 600, is configured to receive an estimated label based on affective responses of other users to substantially the same segment, and to utilize the estimated label to generate the label. In one example, "substantially the same segment" means a segment with very similar characteristics, such similar length, similar genre, the same or similar artist and/or creator, and/or descriptions of the segments are similar. In another example, "substantially the same segment" means the same segment, possibly displayed to users in slight variations (e.g., minor editing difference, slight format changes due to medium on which the segments are displayed, and/or personalized customizations to the segments, such adding personalized special effects to the displayed content).

The estimated label may provide a more refined emotional response than the one that may be deduced from the vote. For example, a vote in which a user up-votes a segment of content expresses that the user likes the content. However, if other users who also indicated that they liked the same, and/or similar content, had increased heart-rate and increased skin conductivity that may be associated with being frightened, it may indicate that a more accurate label for the emotional response may be "frightened". In this case, the user, possibly similar to some of the other users, may be an aficionado of horror movies; for them pressing a "like" button for a horror clip may indicate that the clip does its job, i.e., it frightens them to a great extent.

Sensor

In one embodiment, a sensor, such as the sensor 456, is a device used to measure the user. Optionally, the sensor measures an affective response of the user. Optionally, the sensor coupled to the user 114. "being coupled" may refer to the sensor being in proximity of the user 114 (e.g., a camera capturing images that depicts expressions and/or gestures of the user 114, or a movement sensor such as one embedded in a smart phone carried by the user 114). Additionally or alternatively, "being coupled" may mean that the sensor is attached to the user or the user's clothing, e.g., a bracelet worn by the user 114 the measures GSR (Galvanic Skin Response), or a headset embedded with electroencephalography (EEG) sensors that measure brainwaves of the user 114. Additionally or alternatively, "being coupled" may mean that the sensor is implanted, at least in part, in the body of the user 114, e.g., EEG electrodes implanted in the scalp, or a heart rate, and/or a blood flow monitor implanted in the body.

In one embodiment, an affective response measurement of the user 114 is taken by the sensor 456 during a period that ends in temporal vicinity to when the vote is made. Thus, the affective response measurement is indicative of the emotional response of the user 114 to the segment of content on to which the vote relates. Herein, temporal vicinity refers to closeness in time. For example, two events that occur in temporal vicinity occur at times close to each other. Thus, in some cases, the period during which the vote is taken may typically spans a short duration (e.g., less than a second or less than 10 seconds) starting slightly before the vote is cast. For example, by slightly before it may mean 10 seconds or less than a minute. In some cases, the period may end, and even start, after the vote is cast (such as cases in which the signal being measured changes slowly, e.g., skin temperature). In another example, temporal vicinity to a vote is no longer than 30 seconds before and 10 seconds after the vote is made.

The period during which the affective response measurement is taken by the sensor 456 may be fixed (e.g., 5 seconds or one minute). Optionally, the period may depend on the type of sensor (e.g., EEG may be taken during a period of less than a second, while GSR may be measured during several seconds). Optionally, the label 610 indicates how long the period should be. Optionally, the length of the period depends on the length of the segment of content on which the vote 606 is cast. Optionally, the period may depend on the voting mechanism. For example, simple vote casting (e.g., pushing a "like" button) may correspond to a shorter period than a more complex vote casting (e.g., typing a comment or making a verbal comment that is interpreted by the voting mechanism 604).

In one embodiment, the sensor 456 transmits measurements of affective response of the user 114, essentially after taking them. Optionally, at least some of the measurements are sent to a training module, such as the training module 472 and/or the training module 618. Optionally, at least some of the measurements sent to the training module do not have an associated label.

In one embodiment, a training module, such as the training module 472 and/or the training module 618, may issue a request to the sensor to transmit measurements taken during a certain period. Optionally, the training module may issue the request after receiving a label. Alternatively, other modules in the system may issue a request to the sensor 456 to send measurements of the affective response of the user 114.

In one embodiment, the system is configured not to forward to a training module, such as the training module 472 and/or the training module 618, an affective response measurement that does not have a corresponding label generated from a vote. For example, requests to transmit measurements to the training module are issued according to received labels that are generated from votes.

In one embodiment, the sensor 456 is coupled to, and/or has access to, memory storage capable of buffering measurements for a duration before they are transmitted. For example, the memory may be sufficient to buffer measurements for a duration of 100 milliseconds, 1 second, 1 minute, 1 hour, and/or 1 day. Thus, upon receiving a request to transmit measurements taken during a period that has already passed, at least in part, the sensor may transmit measurements stored in the memory.

Training Module

In one embodiment, a training module, such as the training module 472 and/or the training module 618, is configured utilize a label and an affective response measurement of the user 114 taken by the sensor 456. Optionally, the label and/or the measurements may undergo processing before being and/or after being received by the training module. For example, affective response measurements may be filtered, normalized, processed using signal processing methods, and/or undergo feature extraction. Optionally, the label and affective response measurement represent a training sample to be utilized by the training module. Optionally, a sample generator, such as the sample generator 616 generates and/or collects training samples for the training module.

In one embodiment, the training module receives one or more affective response measurements from the sensor 456. The one or more affective response measurements are taken by the sensor 456 essentially during a period that corresponds to a period indicated in a label, such as the label 610. Optionally, the training module includes a mechanism able to associate the measurements sent by the sensor 456 with their corresponding label.

In one embodiment, the affective response measurement stored by the training module includes a time series with multiple values. For example, the training module may store a plurality of values representing a pattern of brainwave activity of the user 114 corresponding to measurements taken during a plurality of time points. In another example, the training module may store a plurality of images of the user 114, such as a short video clip.

The measurements received by the training module, which correspond to a label, may include multiple values and/or measurements taken at multiple times. In some cases, the training module may need to select a subset that includes one or more measurements (but not all) from the plurality of measurements it received; for instance, in order to generate a training sample that includes the one or more measurements and the label. Optionally, the one or more measurements that are selected are measurements that reflect an emotional response indicated by the label. There are different approaches that may be utilized by the training module in order to select relevant measurements from the plurality of measurements taken in a window.

In one embodiment, the training module selects and/or computes a measurement from a plurality of measurements, in order to store the measurement in a memory. Optionally, the training module selects a value that corresponds to a statistic of the plurality of measurements, such as a maximum, minimum, average, median, and/or other statistics that may be computed from the plurality of measurements.

In one embodiment, the training module utilizes a measurement ERP in order to identify a measurement, from amongst a plurality of measurements received, which corresponds to an emotional response indicated by a label. For example, the label 610 may indicate that the user 114 is disinterested (e.g., after down-voting content). The measurements received by the training module may include EEG measurements taken during a duration of 20 seconds essentially ending at the time of the down-voting. During this time, the user 114 is measured by the sensor 456 which measures EEG brainwave activity. The training module may utilize a measurement ERP that predicts emotional response from EEG measurements in order to determine which time point, or period within those 20 seconds, best reflects a state of disinterest, and store in memory the measurement from that time or period. In another example, the label may indicate the user 114 is excited (e.g., due to pressing a "like" button related to a movie clip). In this example, the user may have been filmed with a video camera for ten seconds prior to pressing the button. The training module may utilize a facial expression analyzer in order to detect which frames reflect an expression of excitement, and use those for a training sample.

In some embodiments, the training module is configured to train an Emotional Response Predictor (ERP) with the label and the received and/or stored affective response measurement. Optionally, the ERP is a measurement ERP that predicts an emotional response from a measurement of affective response.

In one example, the affective response measurement received from the sensor 456 may be converted by the training module to one or more feature values of a training sample, and the label generated by the label generator may serve as the corresponding label for the training sample. The training module may adjust one or more parameters in a model utilized by and ERP, according to the training sample, and by doing so may improve the performance of the ERP, such as making the ERP more accurate. Additionally, the training module may utilize measurements that do not have an associated label, e.g., when semi-supervised training methods are used.

Optionally, training samples utilized by the training module may include samples derived from measurements of the user 114 taken while the user consumed content of the same friend on the social network. Optionally, some of those samples have associated labels, while some do not.

In one embodiment, a training sample used by the training module may have an associated training weight. Optionally, the training weight is determined by a sample generator, such as the sample generator 616. Optionally, the training weight may express how strong an influence the training sample should have on a model being trained. For example, a training sample with a training weight of 2 will have a double affect on model parameters compared to a training sample with a training weight of 1. Training weights for samples may depend on various factors such as: (i) the quality of measurements in the samples (e.g., samples with clean measurements may be given a higher weight than samples with noisy measurements), (ii) the quality and/or type of the label (e.g., a label corresponding to rare vote may be assigned a higher weight than a label corresponding to a common one), and/or (iii) characteristics of the content (e.g., how significant the label is, and/or frequent of the content).

In one embodiment, the training module is configured to apply a significantly higher training weight to a training sample that includes a first measurement having a corresponding label generated from a vote, compared to a training weight applied to a sample that includes a second measurement not having a corresponding label generated from a vote. For example, by significantly higher it is meant at least double, i.e., the training sample with a label generated by a vote has at least double the influence on the model being trained, compared to the sample without a label generated from a vote.

In one embodiment, the ERP trained by the training module is configured to predict emotional response from facial expressions. The affective response measurement received from the sensor 456, which may be an image capturing device, may include a certain representation of an image of a face of the user (e.g., a file of the image and/or feature values derived from the image).

In one embodiment, the ERP is configured to predict emotional response from physiological measurements (measurement ERP), and the affective response measurement used by the ERP includes a physiological measurement of the user. Optionally, the physiological measurement is taken by the sensor 456 while measuring the user 114. For example, the measurement ERP may predict emotional response from physiological signals such as heart rate, GSR, and/or brainwaves measured by EEG.

In one embodiment, the system is implemented on a single device, such as a computer, a laptop, a smart phone, or a tablet. Alternatively or additionally, one or more of the components of the system run, at least in part, on a processor typically remote of the user 114, such as a cloud-based server. For example, the vote 606 may be send to a cloud-based server, which may generate the label 610. The training module may run, at least in part, on a processor belonging to a device of the user 114. Alternatively or additionally, the training module may also run, at least in part, on a remote cloud-based server. The sensor 456 may send, to the cloud-based server, measurements of the affective response of the user 114, to be utilized by the training module.

Vote Analyzer

In one embodiment, a vote analyzer, such as the vote analyzer 652 and/or the vote analyzer 682, is configured to determine whether the user consumed a segment of content in a duration that is short enough that the user likely felt a single dominant emotional response to the segment. The vote analyzer evaluates the duration during which the user consumed a segment of content on which the user cast a vote. This evaluation is performed to determine whether the duration is short enough so that the user likely felt a single dominant emotional response to the segment. Optionally, the vote analyzer is configured to receive a characteristic of the segment, and to estimate whether the user consumed the segment in a duration that is short enough based on the characteristic of the segment. For example, the characteristic may be indicative of statistics such as the length of the segment, volume of sound, and/or size of images. In another example, the characteristic may be indicative of the type and/or genre of the content. In yet another example, the characteristic may include a portion of the segment of content.

In one embodiment, to determine whether the duration is short enough, the duration is compared to a predefined threshold in order to evaluate whether the duration exceeds the threshold. For example, if the duration is shorter than 10 seconds, it is considered short enough. Alternatively, the duration is compared to a threshold that is derived from the volume of the information conveyed in the segment of content. For example, the duration of the consumption of a textual message may be considered short enough if it lasts less than the number of words divided by 5. Optionally, the threshold may depend on the type of segment of content being consumed. For example, the threshold for considering the consumption of an image to be short enough may be 10 seconds, while the threshold for considering the consumption of a video clip to be short enough may be 30 seconds.

In one embodiment, determining whether the duration is short enough takes into consideration information derived from analysis of the segment of content. For example, a video clip may be analyzed to determine if there are more than one scene in the clip (e.g., involving different characters and/or locations). If there are different scenes, this might indicate that there is less of a chance that the user felt a single dominant emotional response, since each scene may elicit a different type of emotional response from the user. In another example, textual content is analyzed using semantic analysis to determine whether one or more emotions are expressed in the text. If multiple types of emotions are expressed, it is more likely that the user may have multiple dominant emotional responses to the text.

In one embodiment, the duration considered ends essentially when the vote is cast (e.g., within two seconds before or after the casting of the vote). Optionally, the consumption of the content may continue after the vote is cast. In this case, the duration being considered may end essentially when the consumption of the content ends.

In one embodiment, the vote analyzer 682 is configured to select, based on the received characteristic of the segment of content, a window during which the user likely expressed an affective response related to the vote. Optionally, the characteristic of the segment of content is received from the social network 602 and/or the voting mechanism 604. Optionally, the length of the window may be shorter than duration in which the user consumes the content, and corresponds to the expected duration of the affective response and/or the duration required to acquire a representative measurement of the affective response. In the embodiments, a first duration that is significantly shorter than a second duration means that the first duration is at most half of the second duration. For example, a user may view a video clip lasting minutes, but the window generated due to a vote might span a few seconds (e.g., in order to collect and/or analyze EEG signals).

In some embodiments, the vote analyzer 682 sets the window to end in temporal vicinity of when the vote is cast by the user. Herein, temporal vicinity refers to closeness in time. For example, two events that occur in temporal vicinity, occur at times close to each other. Thus, in some cases, the window may end slightly after the vote is cast, however the majority of the window may correspond to a period before the vote is cast. Since a large part, if not all, of the window falls before the vote is cast, the measurements of affective response of the user 114 need to be stored in a memory (e.g., the memory 508).

In one embodiment, the duration of the window is set in accordance with the sensor 509 which is used to measure the affective response of the user 114. For example, measuring brainwaves with EEG may require a short measuring period (e.g., around a second) to acquire relevant measurements. However, detecting changes in GSR may require longer periods (e.g., ten seconds).

In some embodiments, the vote analyzer 682 may select the window based on analysis of a characteristic of the segment of content. The characteristic of the segment of content may include a statistic of the content (e.g., the length of the content, type of content, genre, identify of creator). Alternatively, the characteristic may include portion of the content itself. Optionally, the analysis of the characteristic may reveal a portion of the content that likely is associated with the vote cast by the user. Optionally, the portion identified as associated with the vote may have a shorter duration than the content being consumed by the user 114. For example, in a case where the user 114 watches a video clip, and casts a vote on the clip, the window selector may analyze the clip to determine the likely event or portion that triggered the vote. For example, the video might be analyzed to detect changes in the scenes or sound energy (e.g., crowd cheering or sound of a gunshot). A window might be selected around the identified event (e.g., starting when the crowd begins to cheer); the window can be shorter than the whole clip being viewed by the user (e.g., the clip may include game play spanning minutes). In another example, semantic analysis may be analyzed in order to detect portions of content that are likely to evoke an emotional response (e.g., portions that include expressions of strong language and/or emotionally charged expressions). The vote analyzer may place a window at the beginning of the appearance of the identified portions, which are likely associated with the vote cast by the user. These portions are likely to be shorter than the entire segment of content consumed by the user (e.g., a full dialogue between characters in a movie).

Media Controller

In one embodiment, the content presentation module 451 may be part of the same device as other elements of the system. For example, the system 460 may be part of a mobile device such as a smart phone or tablet, and the content presentation module 451 includes a screen that is part of the mobile device. Alternatively, the content presentation module may be part of a device that is different from the device that houses the system 460 or certain portions of the system 460. For example, the content presentation module 451 may be a television screen, while the system 460 may be implemented as a cloud-based service.

It is noted that "content" as used herein may refer to a segment of content (e.g., a video clip, a part of a song, a box in webpage, an item viewed in a virtual store), as well as content that may include multiple items (e.g., a whole movie, a song, a web site, a description of a visit to a virtual store).

In one embodiment, the content presentation module 451 may present multiple content items simultaneously. For example, the content presentation module 451 may be a screen that presents multiple items such as streams of video. A user may perform various actions on the items, which change the progression of the presentation of content, such as move, resize, bringing to foreground, sending to background, opening and/or closing. In addition, the user may perform actions that alter the progression of presentation of content within an item, such as replaying a portion of the content presented in one of the streams.

In one embodiment, the media controller 452 controls, at least in part, the progression of presentation of content to the user 114 on the content presentation module 451. By interacting with the media controller 452, the user 114 may influence the progression of the presentation of the content. The progression of the presentation may involve various aspects of the content, such as which content is presented, how long the presentation lasts, and/or how large/dominant/powerful the presentation is.

In one embodiment, the media controller 452 is in the same device as the content presentation module. For example, the content presentation module 451 includes a touch-screen on a mobile device, and the media controller is implemented, at least in part, as a module on the mobile device which detects and/or interprets user input, such as finger strokes on a touch-screen, which regulates the presentation of content on the screen. In another example, the media controller 452 is part of a headset that receives a user's input from a microphone and/or a camera which capture a user's verbal commands and/or gestures; the content presentation module 451 in this example may be an augmented and/or virtual reality display that is part of the headset.

In another embodiment, the media controller 452 is implemented in a different device from the content presentation module 451. For example, the media controller 452 may be implemented as a program on device separate from the content presentation module 451, such as program running on a remote cloud-based server. In another example, the content presentation module 451 may be a screen such as a television, and the media controller runs on a mobile device such as a tablet, smart phone, and/or a remote control.

Action

As part of the interaction of the user 114 with the media controller 452 that controls presentation of content on the content presentation module 451, the user may take certain actions. In some cases, these actions may change the progression of the presentation of content, and are thus likely to originate from some cognitive process and decision which led the user to desire to alter the way the content is presented. For example, the actions a user takes may originate from thoughts such as "this movie is not going anywhere" or "What was that? I want to see that part again!". These thoughts a user thinks can lead to an emotional response, such as boredom, interest, excitement. Thus, in certain cases, actions taken by a user can be associated with likely emotional responses that originated from the cognitive process that led to taking the action. For example, if a user changes a channel after a short while, it may be associated with an emotional response of boredom, dissatisfaction, disinterest, and/or displeasure in the content presented on the current channel being viewed. Both action and feeling may have arisen from the same thought "this content is silly, there must be something better out there". In another example, if a user revisits a portion of content (e.g., by replaying a portion of video), that may be associated with an emotional response of interest and/or fondness.

In some situations, the user 114 may perform certain actions, at his or her own discretion, as part of the interaction in order to change the progression of the presentation of content. Optionally, the action is performed during the presentation of the content. By performing an action at the user's discretion, it is meant that the user may choose to perform the action, or may choose not to perform the action. Optionally, the timing of when to perform the action (if the user chooses to do so), is also a choice that the user can make. For example, the user may decide to perform an action such as changing a channel on a television whenever the user chooses. Similarly, when viewing video content (e.g., on a mobile device), the user can choose to replay a certain portion of the content, whenever the user chooses, and possibly do so multiple times.

There are various types of actions the user 114 may take as part of the interaction; which actions the user 114 chooses to take may vary and depend on various factors such as the type of content presented to the user on the content presentation module 451, the type of hardware and/or software used by the content presentation module 451, and/or the type of communication channels between the user 114 and the media controller 452.

In one embodiment, an action the user 114 takes as part of an interaction with the media controller 452 may involve changing attributes of the way a content is presented on the content presentation module 451. For example, an action involving content like a video stream and/or an image may involve performing editing operations on the content such as opening, closing, resizing, moving, bringing to the foreground, and/or moving to the background. The type of emotional response that may be associated with an action may differ depending on the type of action. For example, opening, zooming in, and/or bringing to the foreground, may be associated with positive emotional responses and/or interest; however, actions like closing content, or sending it to the background, may be associated with negative emotional responses, boredom, and/or disinterest.

Editing actions a user may request to perform on content can signal the user's interest in the content. For example, the content may include visual items, and the action of the user may be indicative of a request by the user to zoom in on a certain item; this might focus the user's attention on the item an enable the user to perceive it better. Similarly, the action may be indicative of a request by the user to bring a certain item to substantially a center of a display; which again, would allow the user to concentrate on the item. Thus, emotional responses likely felt by the user towards the content may be characterized as interest.

In one embodiment, the user 114 may be exposed to media content. The user may take an action that is indicative of a request of the user to play a portion of media. For example, the user may be exposed to content that includes video, and the action is indicative of a request by the user to play a segment of the video again. In another example, the user is exposed to audio content such as music, and the action of the user involves requesting to play again a certain portion of the content, such as a song. A request to replay a portion of content may be typically associated with an emotional response corresponding to interest and/or arousal.

The user 114 may be exposed to content that includes items presented substantially serially, and the action taken by the user is indicative of a request by the user to have one of the items presented again. In one example, an action of the user 114 may be indicative of a desire to review a certain image on a social media site and/or reread certain content such as a status update or comment. In some cases, revisiting of content may be associated with an emotional response corresponding to interest and/or arousal.

In one embodiment, an action the user 114 may take as part of an interaction with the media controller 452 may involve selecting a content item to which to be exposed. For example, content may include a result returned from a search query, and the action is indicative of a selection by the user of the result. In another example, selecting a content item may involve choosing an item from a menu (e.g., selecting an icon from a group of icons, or selecting a file to download from a directory). In yet another example, content may be selected by altering the speed at which the content is presented, such as changing the scrolling speed at which a webpage is viewed (which may cause a certain content item to be presented on a screen). Selecting items may often be associated with positive emotional responses (since the user wants to consume the selected content items).

Alternatively or additionally, an action the user 114 takes, may involve removing and/or replacing content. The action may be performed by selecting other content (e.g., changing a channel on a television), by closing a content item (e.g., closing a window displaying video), and/or marking content to be moved, discarded and/or deleted (e.g., marking messages as spam). Removing and/or replacing content items, especially after briefly being exposed to them, is likely to correspond to negative emotional responses of the user.

The actions that are part of the interaction between the user 114 and the media controller 452 are performed in natural situations, and are typically unsolicited (the user usually can choose whether or not to perform them). This means that the emotional response of the user 114 related to these actions is usually spontaneous. Thus, in some embodiments, the system is able to acquire samples of affective response measurements corresponding to an unsolicited spontaneous reaction of the user 114.

In one embodiment, the description 453 of an interaction between the user 114 and the media controller 452 may include information that enables the interaction analyzer 462 to identify which actions occurred during the interaction. In particular, the interaction analyzer 462 may identify from the description 453 whether a specific action, which causes a deviation from a regular progression of presentation of content on the content presentation module 451, occurs. The description 453 may contain the information conveyed by the user 114 to the media controller 452 during the interaction, such as a recording of a voice command of the user. Alternatively or additionally, the description 453 may include data derived from the media controller's processing of a command or action of the user, such as the code and/or description of a command the media controller 452 executed as a result of the user's action.

There are various forms of information that may come from different sources, which may be utilized to create the description 453.

In one embodiment, the description 453 includes information such as codes, names, and/or titles. From this information, the interaction analyzer 462 may directly detect actions of a user which may cause a deviation in the presentation of content. For example, the description 453 includes codes which the interaction analyzer 462 can look up in a memory structure such as a hash table. In another example, the description 453 may include titles of specific actions performed by the user, such as "user closed window", "user switched to channel 129", or "user replayed time stamp 1:24-1:29 of video". Optionally, an indication regarding an action described in the description 453 is accompanied by additional information such as the time when the action occurred and/or identified information regarding the content presented on the content presentation module 451.

In one embodiment, the description 453 includes portions of records logging events happening during the interaction of the user with the media controller 452. For example, the media controller 452 may include an API and/or have access API through which the user may control the progression of the presentation of content on the content presentation module 451. The description 453 in this case, may include details of events and/or commands that were issued to and/or executed by the API, such as a log of events or triggers (e.g., the log mentions events like "use pressed fast forward button", "user moved window").

In one embodiment, the description 453 may include portions of the content presented to the user, as it appears on the content presentation module 451. For example, the description 453 may include portions, such as screen shots, of a visual display on which content is presented to the user. Optionally, the portions of content may include information depicting an action of the user that may cause a deviation in the presentation of content. For example, a portion of visual content may include images which depict information such as the location of a cursor, an object selected by the user, and/or a virtual button that is pushed by the user. The interaction analyzer 462 in this example may utilize various image processing procedures in order to identify actions taken by the user. In another example, the description 453 may include portions of content such as sound generated by the content presentation module 451. These sounds may reflect certain actions of the user, such as sounds corresponding to a click of a button, the termination of a conversation, or the changing of a channel (which may be detected by observing a significant change in a soundtrack).

In one embodiment, the description 453 may include portions of measurements of a user, such as values of sensors that measure physiological signals and/or sensors that can be used to record behavioral cues (e.g., cameras, microphones, and/or movement sensors). In one embodiment, the media controller 452 receives signals from a physiological sensor, such as brainwave activity recorded with electroencephalography (EEG), from which user commands may be inferred. In this example, the description 453 may include portions of the brainwave measurements and/or products processing the measurements, and the interaction analyzer 462 may utilize procedures that perform signal analysis on the provided data in order to identify specific actions of the user. In another example, the description 453 may include measurements of the user's behavior such as video images recorded with a camera, or measurements of movement obtained by a movement sensor (e.g., embedded in a user's clothing or in a mobile device carried by the user). The behavior measurements may describe actions of the user, such as gestures, which may be used to control presentation of content. In this example, the interaction analyzer 462, may utilize procedures such as image analysis (to detect actions from the images) and/or signal analysis to detect actions from the movement data. In yet another example, the description 453 may include audio content created by the user (e.g., recording of verbal commands issued by the user). The interaction analyzer 462 may utilize speech-to-text conversion algorithms and/or semantic analysis in order to identify an action taken by the user.

Interaction Analyzer

In one embodiment, the interaction analyzer 462 identifies, based on the description 453, an action of the user that causes a deviation from a typical progression of presentation of the content. The interaction analyzer 462 may forward an indication of the identified action to other modules such as the label generator 464 and/or the window selector 466. In one example, the indication of the action may include portions of the description 453, or may be substantially similar to the description 453. In another example, the indication of the action may include a code, names, and/or title, which may be utilized by other modules in order to determine aspects of the action (e.g., by looking of information included in the indication in a lookup table).

In one embodiment, the interaction analyzer 462 utilizes additional information received from elements other than the media controller 452, such as the content and/or measurements of the user, in order to identify whether an action took place. In one example, the description 453 may include a listing of actions taken by a user, so actions may be identified by simple parsing of the description 453. In another example, the description 453 may undergo analysis such as semantic analysis and/or a search for keywords and/or regular expressions corresponding to actions that may be taken by the user 114. In yet another example, the interaction analyzer may identify actions from portions of content presented to the user and/or measurements of the user 114.

In one embodiment, in order to perform its analysis, the interaction analyzer 462 may receive additional information to the information received in the description 453. The additional information may assist in determining whether an action of the user is an action the causes a deviation from a typical progression of presentation of the content. For example, the interaction analyzer 462 may be provided with a description of the results of actions that may be taken by the user. In this example, the interaction analyzer 462 may be provided with information that a certain content window was closed. In another example, the interaction analyzer 462 may receive (i) a description of the typical progression of the content, and (ii) a description of the progression of content as it was presented to the user 114 on the content presentation module 451. Thus, by comparing the two descriptions, the interaction analyzer may determine whether a deviation from the typical progression occurred and/or what type of deviation occurred. This information may assist the interaction analyzer 462 to determine whether a certain action caused a deviation in the typical progression of the presentation of content.

In one embodiment, the interaction analyzer 462 utilizes knowledge of an identifier, and/or name of an action, in order to determine whether an action causes a deviation from a typical progression of presentation of content. Optionally, from the name and/or identifier of the action, the interaction analyzer 462 may determine the nature of the deviation. For example, the interaction analyzer 462 may utilize a table containing identifiers and/or names of actions that are classified by the system as causing a deviation from a typical progression of presentation of content. Additionally, the table may include information regarding the effects of some of the actions on the progression of the presentation of content. In another example, the interaction analyzer 462 may have knowledge of certain words, codes, and/or structures, which if detected in a name and/or description of an action, are indicative of whether the action causes deviation from a typical progression of presentation of content.

In one embodiment, the interaction analyzer 462 utilizes analysis of content presented on the content presentation module 451 in order to detect whether an action that causes a deviation from a typical progression of content has occurred. For example, analysis of a video stream, such as detecting the size and/or position of a window displaying the video stream, can reveal whether actions such as moving, closing, and/or resizing the window occurred. In another example, content can be compared to previously presented content, in order to detect whether content is being redisplayed. For example, by monitoring what content is displayed on a browser, the interaction analyzer 462 may determine whether a user's browsing is progressing, stalled at a certain point, and/or possibly the user has reverted to observing content previously displayed on the browser.

In some embodiments, content presented to a user may be associated with a typical progression. A typical progression is the default way in which the content is typically presented. For example, a typical progression of a video clip is to play it from start to finish (without stopping, skipping, or replaying portions of it). Similarly, a typical progression of presenting an image on a webpage is to display the image. Thus, zooming into the image, or performing other operations on it, are usually not things that are done in the majority of times an image is viewed.

In one embodiment, a typical progression of presentation of content is a progression of presentation of content that is unaltered due to actions taken by the user. Once content starts being presented, a typical progression of the presentation of the content is the flow of content that naturally occurs if a user interacting with the media controller 452 does not perform, at the user's own discretion, any optional and/or unprompted actions that alter the flow of content. For example, if the user 114 starts watching a movie, a typical progression of the presentation of the movie involves the movie being played from start to finish. However, if during the presentation of the movie, the user takes an action that causes the presentation of the movie to stop, skip portions, zoom in on or out of certain regions, and/or repeat certain segments, this may be considered not to be a typical presentation of content. There might be actions that the user takes because the user is prompted and/or required to do so as part of the interaction with the controller in order for the user to consume the content; in some cases, such actions may not be considered to be performed at the user's discretion. For example, if a user needs to take an action like pushing a button to start or end the presentation of content, that may be considered an action that is not done at the user's discretion, since it is a required action by the system that generally anyone consuming the content needs to perform.

In one embodiment, the typical progression of presentation of content is the most common progression of presentation of content presented to a plurality of users consuming substantially the same content. For example, most users do not pause, skip, or zoom in to portions of a certain video clip, therefore, the typical progression of presentation of the certain video clip is an uninterrupted playing of the clip, without changing the sequence of frames, angle of view, and/or aspect ratio. In another example, users browsing content, such as headlines or thumbnails on a website, typically just read the headline and/or examine a thumbnail. For most content items, selecting to consume the complete content (e.g., read the whole article, or watch the full video), is not what most users do. Thus, a typical progression of the presentation of content in this case might be the presentation of the headlines or thumbnails, while consuming the full content item may be considered a deviation from the typical progression of the presentation of the content.

It is to be noted that "progression of presentation of content" is not limited to presenting visual content, and it may include also playing auditory content and/or other types of content such as haptic content (e.g., a sequence of actions of a massage chair).

Affective Response Measurements

In some embodiments, a sensor may include, without limitation, one or more of the following: a physiological sensor, an image capturing device, a microphone, a movement sensor, a pressure sensor, and/or a magnetic sensor.

Herein, a "sensor" may refer to a whole structure housing a device used for measuring a physical property, or to one or more of the elements comprised in the whole structure. For example, when the sensor is a camera, the word sensor may refer to the entire structure of the camera, or just to its CMOS detector. Additionally, herein, terms like "affective response measurement" and "measurement of affective response" may be used interchangeably.

A physiological signal is a value that reflects a person's physiological state. Some examples of physiological signals that may be measured include: Heart Rate (HR), Blood-Volume Pulse (BVP), Galvanic Skin Response (GSR), Skin Temperature (ST), respiration, electrical activity of various body regions or organs such as brainwaves measured with electroencephalography (EEG), electrical activity of the heart measured by an electrocardiogram (ECG), electrical activity of muscles measured with electromyography (EMG), and electrodermal activity (EDA) that refers to electrical changes measured at the surface of the skin.

A person's affective response may be expressed by behavioral cues, such as facial expressions, gestures, and/or other movements of the body. Behavioral measurements of a user may be obtained utilizing various types of sensors, such as an image capturing device (e.g., a camera), a movement sensor, an acoustic sensor, an accelerometer, a magnetic sensor, and/or a pressure sensor.

In one embodiment, images of the user are captured with an image capturing device such as a camera. In another embodiment, images of the user are captured with an active image capturing device that transmits electromagnetic radiation (such as radio waves, millimeter waves, or near visible waves) and receives reflections of the transmitted radiation from the user. Optionally, captured images are in two dimensions and/or three dimensions. Optionally, captured images are comprised of one or more of the following types: single images, sequences of images, video clips.

Affective response measurement data, such as the data generated by the sensor, may be processed in many ways. The processing of the affective response measurement data may take place before, during and/or after the data is stored and/or transmitted. Optionally, at least some of the processing of the data is performed by a sensor that participates in the collection of the measurement data. Optionally, at least some of the processing of the data is performed by a processor that receives the data in raw (unprocessed) form, or partially processed form. There are various ways in which affective response measurement data may be processed in the different embodiments, some of them are described in the following embodiments and examples:

In some embodiments, at least some of the affective response measurements may undergo signal processing, such as analog signal processing, discrete time signal processing, and/or digital signal processing.

In some embodiments, at least some of the affective response measurements may be scaled and/or normalized. For example, the measurement values may be scaled to be in the range [−1, +1]. In another example, the values of some of the measurements are normalized to z-values, which bring the mean of the values recorded for the modality to 0, with a variance of 1. In yet another example, statistics are extracted from the measurement values, such as statistics of the minimum, maximum, and/or various moments of the distribution, such as the mean, variance, or skewness. Optionally, the statistics are computed for measurement data that includes time-series data, utilizing fixed or sliding windows.

In some embodiments, at least some of the affective response measurements may be subjected to feature extraction and/or reduction techniques. For example, affective response measurements may undergo dimensionality reducing transformations such as Fisher projections, Principal Component Analysis (PCA), and/or feature subset selection techniques like Sequential Forward Selection (SFS) or Sequential Backward Selection (SBS).

In some embodiments, affective response measurements comprising images and/or video may be processed in various ways. In one example, algorithms for identifying cues like movement, smiling, laughter, concentration, body posture, and/or gaze, are used in order to detect high-level image features. Additionally, the images and/or video clips may be analyzed using algorithms and/or filters for detecting and/or localizing facial features such as location of eyes, brows, and/or the shape of mouth. Additionally, the images and/or video clips may be analyzed using algorithms for detecting facial expressions and/or micro-expressions.

In another example, images are processed with algorithms for detecting and/or describing local features such as Scale-Invariant Feature Transform (SIFT), Speeded Up Robust Features (SURF), scale-space representation, and/or other types of low-level image features.

In some embodiments, processing affective response measurements involves compressing and/or encrypting portions of the data. This may be done for a variety of reasons, for instance, in order to reduce the volume of measurement data that needs to be transmitted. Another reason to use compression and/or encryption is that it helps protect the privacy of a measured user by making it difficult for unauthorized parties to examine the data. Additionally, the compressed data may be pre-processed prior to its compression.

In addition, the literature describes various algorithmic approaches that can be used for processing affective response measurements, acquired utilizing various types of sensors. Some embodiments may utilize these known, and possibly other yet to be discovered, methods for processing affective response measurements. Some examples include: (i) a variety of physiological measurements may be preprocessed according to the methods and references listed in van Broek, E. L., Janssen, J. H., Zwaag, M. D., D. M. Westerink, J. H., & Healey, J. A. (2009), Prerequisites for Affective Signal Processing (ASP), In Proceedings of the International Joint Conference on Biomedical Engineering Systems and Technologies, INSTICC Press, incorporated herein by reference; (ii) a variety of acoustic and physiological signals may be pre-processed and have features extracted from them according to the methods described in the references cited in Tables 2 and 4, Gunes, H., & Pantic, M. (2010), Automatic, Dimensional and Continuous Emotion Recognition, International Journal of Synthetic Emotions, 1 (1), 68-99, incorporated herein by reference; (iii) Pre-processing of Audio and visual signals may be performed according to the methods described in the references cited in Tables 2-4 in Zeng, Z., Pantic, M., Roisman, G., & Huang, T. (2009), A survey of affect recognition methods: audio, visual, and spontaneous expressions, IEEE Transactions on Pattern Analysis and Machine Intelligence, 31 (1), 39-58, incorporated herein by reference; and (iv) pre-processing and feature extraction of various data sources such as images, physiological measurements, voice recordings, and text based-features, may be performed according to the methods described in the references cited in Tables 1,2,3,5 in Calvo, R. A., & D'Mello, S. (2010). Affect Detection: An Interdisciplinary Review of Models, Methods, and Their Applications. IEEE Transactions on affective computing 1(1), 18-37, incorporated herein by reference.

In some embodiments, the duration in which the sensor operates in order to measure the user's affective response may differ depending on one or more of the following: (i) the type of content the user is exposed to, (ii) the type of physiological and/or behavioral signal being measured, and (iii) the type of sensor utilized for the measurement. In some cases, the user's affective response to the segment of content may be measured by the sensor essentially continually throughout the period in which the user is exposed to the segment of content. However, in other cases, the duration during which the user's affective response to the segment of content is measured need not necessarily overlap, or be entirely contained in the time in which the user is exposed to the segment of content.

With some physiological signals, there is an inherent delay between the time in which a stimulus occurs and changes the user's emotional state, and the time in which the corresponding affective response is observed via a change in the physiological signal's measurement values. For example, an affective response comprising changes in skin temperature may take several seconds to be detected by a sensor. In addition, some physiological signals may depart very rapidly from baseline values, but take much longer to return to the baseline values.

In some cases, the physiological signal might change quickly as a result of a stimulus, but returning to the previous baseline value (from before the stimulus), may take much longer. For example, the heart rate of a person viewing a movie in which there is a startling event may increase dramatically within a second; however, it can take tens of seconds and even minutes for the person to calm down and for the heart rate return to a baseline level.

The lag in time it takes affective response to be manifested in certain physiological and/or behavioral signals can lead to it that the period in which the affective response is measured occurs after the exposure to the content. Thus, in some embodiments, measuring the affective response of the user to the segment of content may end, and possibly even also start, essentially after the user is exposed to the segment of content. For example, measuring the user's response to a surprising short scene in a video clip (e.g., a gunshot lasting a second), may involve taking a GSR measurement a couple of seconds after the gunshot was played to the user. In another example, the user's affective response to playing a level in a computer game may include taking heart rate measurements lasting even minutes after the game play is completed.

In some embodiments, determining the user's affective response to the segment of content may utilize measurement values corresponding to a fraction of the time the user was exposed to the segment of content. The user's affective response to the segment of content may be measured by obtaining values of a physiological signal that is slow to change, such as skin temperature, and/or slow to return to baseline values, such as heart rate. In such cases, measuring the user's affective response to segment of content does not have to involve continually measuring the user throughout the duration in which the user is exposed to the segment of content. Since such physiological signals are slow to change, reasonably accurate conclusions regarding the user's affective response to the segment of content may be reached from samples of intermittent measurements taken at certain periods during the exposure (the values corresponding to times that are not included in the samples can be essentially extrapolated). In one example, measuring the user's affective response to playing a computer game involves taking measurements during short intervals spaced throughout the user's exposure, such as taking a GSR measurement lasting two seconds, every ten seconds. In another example measuring the user's response to a video clip with a GSR, heart rate and/or skin temperature sensor may involve operating the sensor only during certain portions of the video clip, such as a ten-second period towards the end of the clip.

In some embodiments, determining the user's affective response to the segment of content may involve measuring a physiological and/or behavioral signal of the user before and/or after the user is exposed to the segment of content. Optionally, this is done in order to establish a baseline value for the signal to which measurement values of the user taken during the exposure to the segment of content, and/or shortly after the exposure, can be compared. For example, the user's heart rate may be measured intermittently throughout the duration, of possibly several hours, in which the user plays a multiplayer game. The values of these measurements are used to determine a baseline value to which measurements taken during a short battle in the game can be compared in order to compute the user's affective response to the battle. In another example, the user's brainwave activity is measured a few seconds before displaying an exciting video clip, and also while the clip is played to the user. Both sets of values, the ones measured during the playing of the clip and the ones measured before it, are compared in order to compute the user's affective response to the clip.

Eye Tracking

In some embodiments, "eye tracking" is a process of measuring either the point of gaze of the user (where the user is looking) or the motion of an eye of the user relative to the head of the user. An eye tracker is a device for measuring eye positions and/or movement of the eyes. Optionally, the eye tracker and/or other systems measure positions of the head and/or movement of the head. Optionally, an eye tracker may be head mounted, in which case the eye tracking system measures eye-in-head angles. However, by adding the head position and/or direction to eye-in-head direction, it is possible to determine gaze direction. Optionally, the eye tracker device may be remote relative to the user (e.g., a video camera directed at the user), in which case the eye tracker may measure gaze angles.

Those skilled in the art may realize that there are various types of eye trackers and/or methods for eye tracking that may be used. In one example, eye tracking is done using optical tracking, which track the eye and/or head of the user; e.g., a camera may focus on one or both eyes and record their movement as the user looks at some kind of stimulus. In another example, eye tracking is done by measuring the movement of an object, such as a contact lens, attached to the eye. In yet another example, eye tracking may be done by measuring electric potentials using electrodes placed around the eyes.

In some embodiments, an eye tracker generates eye tracking data by tracking the user 114, for a certain duration. Optionally, eye tracking data related to a segment of content is generated by tracking the user 114 as the user 114 is exposed to the segment. Optionally, the segment of content includes visual content, and the user 114 is exposed to the segment by viewing the segment on a display (e.g., on a screen or on a head-mounted display). Optionally, tracking the user 114 is done utilizing an eye tracker that is part of a content delivery module through which the user is exposed to content (e.g., a camera embedded in a phone or tablet, or a camera or electrodes embedded in a head-mounted device that has a display).

There may be various formats for eye tracking data, and eye tracking data may provide various insights. For example, eye tracking data may indicate a direction and/or an object the user 114 was looking at, a duration the user 114 looked at a certain object and/or in certain direction, and/or a pattern and/or movement of the line of sight of the user 114. Optionally, the eye tracking data may be a time series, describing for certain points in time a direction and/or object the user 114 was looking at. Optionally, the eye tracking data may include a listing, describing total durations and/or time intervals, in which the user was looking in certain directions and/or looking at certain objects.

In one embodiment, eye tracking data is utilized to determine a gaze-based attention. Optionally, the gaze-based attention is a gazed-based attention of the user 114 and is generated from eye tracking data of the user 114. Optionally, the eye tracking data of the user 114 is acquired while the user is consuming content and/or in temporal vicinity of when a user consumes the content. Optionally, gaze-based attention may refer to a level of attention the user 114 paid to the segment of content the user 114 consumed.

For example, if the user looks in a direction of the content and focuses on the content while consuming the segment, the gaze-based attention level at that time may be considered high. However, if the user only glances cursorily at the content, or generally looks in a direction other than the content while being exposed to the segment, the gaze-based attention level to the segment at that time may be low. Optionally, the gaze-based attention level may be determined for a certain duration, such as a portion of the time a segment of content is displayed to the user 114. Thus, for example, different durations that occur within the presentation of a certain segment of content may have different corresponding gaze-based attention levels according to eye tracking data collected in each duration.

In one example, a gaze-based attention level of the user to a segment of content may be computed, at least in part, based on difference between the direction of sight of the user, and the direction from the eyes of the user to a display on which the segment is presented. Optionally, the gaze-based attention level of the user to a segment of content is computed according to the difference between the average direction the user was looking at during a duration in which the segment was being displayed, compared to the average direction of the display (relative to the user), during the duration. Optionally, the smaller the difference between the direction of sight and the direction of the content, the higher the gazed-based attention level. Optionally, the gaze-based attention level may be expressed by a value inversely proportional to the difference in the two directions (e.g., inversely proportional to the angular difference).

In another example, a gaze-based attention level of the user 114 to a segment of content may be computed, at least in part, based on the portion time, during a certain duration, in which the user 114 gazes in the direction of the segment of content (e.g., looking at a module on which the content is displayed). Optionally, the gazed-based attention level is proportional to the time spent viewing the content during the duration. For example, if it is determined that the user 114 spent 60% of the duration looking directly at the content, the gaze-based attention level may be reported as 60%.

In still another example, a gaze-based attention level of the user 114 to a segment of content may be computed, at least in part, based on the time the user 114 spent gazing at certain objects belonging to the content. For example, certain objects in the segment may be deemed more important than others (e.g., a lead actor, a product being advertised). In such a case, if the user 114 is determined to be gazing at the important objects, it may be considered that the user is paying attention to the content. However, if the user 114 is determined to be gazing at the background or at objects that are not important, it may be determined that the user 114 is not paying attention to the content (e.g., the user 114 is daydreaming). Optionally, the gaze-based attention level of the user 114 to the segment of content is a value indicative of the total time and/or percent of time that the user 114 spent during a certain duration gazing at important objects in the segment of content.

In yet another example, a gaze-based attention level of the user 114 to a segment of content may be computed, at least in part, based on a pattern of gaze direction of the user 114 during a certain duration. For example, if the user gazes away from the content many times, during the duration, that may indicate that there were distractions that made it difficult for the user 114 to pay attention to the segment. Thus, the gaze-based attention level of the user 114 to the segment may be inversely proportional to the number of times the user 114 changed the direction at which the user 114 gazed, e.g., looking and looking away from the content), and/or the frequency at which the user looked away from the content.

In one example, a gaze-based attention level of the user 114 to a segment of content may be computed, at least in part, based on physiological cues of the eyes of the user. For example, the size of the pupil is known to be linked to the attention level; pupil dilation may indicate increased attention of the user in the content. In another example, a blinking rate and/or pattern may also be used to determine attention level of the user. In yet another example, if the eyes of the user are shut for extended periods during the presentation of content, that may indicate a low level of attention (at least to visual content).

In one embodiment, a gaze-based attention level of the user 114 to a segment is computed by providing one or more of the data described in the aforementioned examples (e.g., values related to direction and/or duration of gaze, pupil size), are provided to a function that computes a value representing the gaze-based attention level. For example, the function may be part of a machine learning predictor (e.g., neural net, decision tree, regression model). Optionally, computing the gaze-based attention level may rely on additional data extracted from sources other than eye tracking. In one example, values representing the environment are used to predict the value, such as the location (at home vs. in the street), the number of people in the room with the user (if alone it is easier to pay attention than when with company), and/or the physiological condition of the user (if the user is tired or drunk it is more difficult to pay attention). In another example, values derived from the content may be used in computing the attention level, such as the type or genre of content, the duration of the content, may also be factors that may be considered in the computation. In yet another example, prior attention levels of the user and/or other users to similar content may be used in the computation (e.g., a part that many users found distracting may also be distracting to the user).

In one embodiment, a gaze-based attention level is represented by one or more values. For example, the attention level may be a value between 1 and 10, with 10 representing the highest attention level. In another example, the attention level may be a value representing the percentage of time the user was looking at the content. In yet another example, the attention level may be expressed as a class or category (e.g., "low attention"/"medium attention'"/"high attention", or "looking at content"/"looking away"). Optionally, a classifier (e.g., decision tree, neural network, Naive Bayes) may be used to classify eye tracking data, and possibly data from additional sources, into a class representing the gaze-based attention level.

Predictor

In one embodiment, a module that receives a query that includes a sample (e.g., a vector of feature values), and predicts a label for that sample (e.g., a class associated with the sample), is referred to as a "predictor". A sample provided to a predictor in order to receive a prediction for it may be referred to as a "query sample". Additionally, the pair that includes a sample and its corresponding label may be referred to as a "labeled sample".

In some embodiments, a sample for a predictor (e.g., a sample used as training data and/or a query sample) includes one or more feature values. Optionally, at least some of the feature values are numerical values. Optionally, at least some of the feature values may be categorical values that may be represented as numerical values (e.g., via indexes for different categories).

In some embodiments, a label that may serve as prediction value for a query sample provided to a predictor, may take one or more types of values. For example, a label maybe include a discrete categorical value (e.g., a category), a numerical value (e.g., a real number), and/or a multidimensional value (e.g., a point in multidimensional space).

In one embodiment, a predictor utilizes a model in order to make predictions for a given query sample. There is a plethora of machine learning algorithms for training different types of models that can be used for this purpose. Some of the algorithmic approaches that may be used for creating the predictor are classification, clustering, function prediction, and/or density estimation. Those skilled in the art can select the appropriate type of model depending on the characteristics of the training data (e.g., its dimensionality), and/or the type of value used as labels (e.g., discrete value, real value, or multidimensional).

For example, classification methods like Support Vector Machines (SVMs), Naive Bayes, nearest neighbor, and/or neural networks can be used to create a predictor of a discrete class label. In another example, algorithms like a support vector machine for regression, neural networks, and/or gradient boosted decision trees can be used to create a predictor for real-valued labels, and/or multidimensional labels. In yet another example, a predictor may utilize clustering of training samples in order to partition a sample space such that new query samples can be placed in clusters and assigned labels according to the clusters they belong to. In somewhat similar approach, a predictor may utilize a collection of labeled samples in order to perform nearest neighbor classification (in which a query sample is assigned a label according to the labeled samples that are nearest to them in some space).

In one embodiment, semi-supervised learning methods are used to train a predictor's model, such as bootstrapping, mixture models and Expectation Maximization, and/or co-training. Semi-supervised learning methods are able to utilize as training data unlabeled samples in addition to the labeled samples.

In one embodiment, a predictor may return as a label other samples that are similar to a given query sample. For example, a nearest neighbor approach method may return one or more samples that are closest in the data space to the query sample (and thus in a sense are most similar to it.)

The type and quantity of training data used to train a predictor's model can have a dramatic influence on the quality of the predictions made by the predictor. Generally speaking, the more data available for training a model, and the more the training samples are similar to the samples on which the predictor will be used (also referred to as test samples), the more accurate the predictions for the test samples are likely to be. Therefore, when training a model that will be used to make predictions regarding a specific user, it may be beneficial to collect training data from the user (e.g., data comprising measurements of the specific user).

Emotional Response Predictors (ERP)

In the embodiments, a predictor that predicts a label that is related to an emotional response may be referred to as a "predictor of emotional response" or an Emotional Response Predictor (ERP). A predictor of emotional response that receives a query sample that includes features that describe a segment of content may be referred to as a predictor of emotional response from content, a "content emotional response predictor", and/or a "content ERP". Similarly, a predictor of emotional response that receives a query sample that includes features derived from measurements of a user, such as affective response measurements taken with a sensor, may be referred to as a predictor of emotional response from measurements, a "measurement emotional response predictor", and/or a "measurement ERP". Additionally, a model utilized by an ERP to make predictions may be referred to as an "emotional response model".

In some embodiments, a model used by an ERP (e.g., a content ERP and/or a measurement ERP), is primarily trained on data collected from one or more different users that are not the user 114; for instance, at least 50% of the training data used to train the model does not involve the user 114. In such a case, a prediction of emotional response made utilizing such a model may be considered a prediction of the emotional response of a representative user. It is to be noted that the representative user may in fact not correspond to an actual single user, but rather correspond to an "average" of a plurality of users. Additionally, under the assumption that the user 114 has emotional responses that are somewhat similar to other users' emotional responses, the prediction of emotional response for the representative user may be used in order to determine the likely emotional response of the user 114.

In some embodiments, a label returned by an ERP may represent an affective response, such as a value of a physiological signal (e.g., GSR, heart rate) and/or a behavioral cue (e.g., smile, frown, blush).

In some embodiments, a label returned by an ERP may be a value representing a type of emotional response and/or derived from an emotional response. For example, the label my indicate a level of interest and/or whether the response can be classified as positive or negative (e.g., "like" or "dislike").

In some embodiments, a label returned by an ERP may be a value representing an emotion. In the embodiments, there are several ways to represent emotions (which may be used to represent emotional states and emotional responses as well). Optionally, but not necessarily, an ERP utilizes one or more of the following formats for representing emotions returned as its predictions.

In one embodiment, emotions are represented using discrete categories. For example, the categories may include three emotional states: negatively excited, positively excited, and neutral. In another example, the categories include emotions such as happiness, surprise, anger, fear, disgust, and sadness.

In one embodiment, emotions are represented using a multidimensional representation, which typically characterizes the emotion in terms of a small number of dimensions. In one example, emotional states are represented as points in a two dimensional space of Arousal and Valence. Arousal describes the physical activation and valence the pleasantness or hedonic value. Each detectable experienced emotion is assumed to fall in a specified region in that 2D space. Other dimensions that are typically used to represent emotions include: potency/control (refers to the individual's sense of power or control over the eliciting event), expectation (the degree of anticipating or being taken unaware), and intensity (how far a person is away from a state of pure, cool rationality). The various dimensions used to represent emotions are often correlated. For example, the values of arousal and valence are often correlated, with very few emotional displays being recorded with high arousal and neutral valence. In one example, emotions are represented as points on a circle in a two dimensional space pleasure and arousal, such as the circumflex of emotions.

In one embodiment, emotions are represented using a numerical value that represents the intensity of the emotional state with respect to a specific emotion. For example, a numerical value stating how much the user is enthusiastic, interested, and/or happy. Optionally, the numeric value for the emotional state may be derived from a multidimensional space representation of emotion; for instance, by projecting the multidimensional representation of emotion to the nearest point on a line in the multidimensional space.

In one embodiment, emotional states are modeled using componential models that are based on the appraisal theory, as described by the OCC model (Ortony, A.; Clore, G. L.; and Collins, A. 1988. The Cognitive Structure of Emotions. Cambridge University Press). According to this theory, a person's emotions are derived by appraising the current situation (including events, agents, and objects) with respect to the person goals and preferences.

In one embodiment, a measurement ERP is used to predict an emotional response of a user from a query sample that includes feature values derived from affective response measurements. Optionally, the affective response measurements are preprocessed and/or undergo feature extraction prior to being received by the measurement ERP. Optionally, the prediction of emotional response made by the measurement ERP is a prediction of the emotional response of the user 114. Alternatively or additionally, the prediction of emotional response made by the measurement ERP is a prediction of emotional response of a representative user.

There are various methods in which a measurement ERP may predict emotional response from measurements of affective response. Examples of methods that may be used in some embodiments include: (i) physiological-based predictors as described in Table 2 in van den Broek, E. L., et al. (2010) Prerequisites for Affective Signal Processing (ASP)—Part II. In: Third International Conference on Bio-Inspired Systems and Signal Processing, Biosignals 2010; and/or (ii) Audio- and visual-based predictors as described in Tables 2-4 in Zeng, Z., Pantic, M., Roisman, G. I., and Huang, T. S. (2009) A Survey of Affect Recognition Methods: Audio, Visual, and Spontaneous Expressions. IEEE Transaction on Pattern Analysis and Machine Intelligence, Vol. 31(1), 39-58.

In one embodiment, a measurement ERP may need to make decisions based on measurement data from multiple types of sensors (often referred to in the literature as multiple modalities). This typically involves fusion of measurement data from the multiple modalities. Different types of data fusion may be employed, for example feature-level fusion, decision-level fusion, or model-level fusion, as discussed in Nicolaou, M. A., Gunes, H., & Pantic, M. (2011), Continuous Prediction of Spontaneous Affect from Multiple Cues and Modalities in Valence-Arousal Space, IEEE Transactions on Affective Computing.

In one embodiment, a content ERP is used to predict an emotional response of a user from a query sample that includes feature values derived from a segment of content. Optionally, the segment of content is preprocessed and/or undergoes feature extraction prior to being received by the content ERP. Optionally, the prediction of emotional response to the segment of content made by the content ERP is a prediction of the emotional response of the user 114 to the segment of content. Alternatively or additionally, the prediction of emotional response to the segment of content made by the content ERP is a prediction of emotional response of a representative user.

In one embodiment, feature values are used to represent at least some aspects of a segment of content. Various methods may be utilized to represent aspects of a segment of content into feature values. For example, the text in a segment that includes text content can be converted to N-gram or bag of words representations, in order to set the values of at least some of the feature values. In another example, an image or video clip from a segment that includes visual content may be converted to features by applying various low-pass and/or high-pass filters; object, gesture and/or face recognition procedures; genre recognition; and/or dimension reduction techniques. In yet another example, auditory signals are converted to features values such as low-level features describing acoustic characteristics such as loudness, pitch period, and/or bandwidth of the audio signal. In still another example, semantic analysis may be utilized in order to determine feature values that represent the meaning of the content of a segment.

There are many feature extraction methods mentioned in the literature that can be utilized to create features for audio-, image-, and/or video-containing content. For example, useful feature extraction methods are used in areas such as visual content-based video indexing and retrieval, automatic video highlighting, and affective video content representation and modeling.

Browsing a Virtual and/or Augmented Store

In one embodiment, the user may view content that includes items in a virtual store. For example, the store may be operated in a virtual world, on a website online, and/or in a game. The store may provide virtual and/or real goods, media content, and/or other forms of information. In this example, the user may be exposed to content from the virtual store via a screen (e.g., television, tablet, smart phone, and/or head-mounted display). Alternatively and/or additionally, the store might operate, at least in part, as an augmented reality store, in which the store overlays information on images of the real world regarding the goods it purveys. For example, in an augmented reality store, the user may view augmented information on a mobile device (e.g., smart phone and/or head mounted display such as glasses that can display images and digital information).

While interacting with the store, the user may communicate with a media controller that controls the presentation of content on a media presentation device (e.g., a screen or head-mounted display). Optionally, the store may also communicate with the media controller. In one example, the media controller is a program that runs on behalf of the store and provides the user with an API. By communicating with the media controller, the user may influence the progression of presentation of content related to the store. A typical progression of presentation of content to the user in this embodiment may be considered viewing items in the store, possibly serially (one item at a time), and/or examining groups of items. In the typical progression of presentation of items, the user does not focus attention on a specific item for long periods; rather, the user typically spends a short time, such as 1 to 10 seconds, examining an item or group of items before moving on to the next item or group of items. However, while browsing the items, the user may take one or more actions that may cause a deviation from the normal progression of the presentation of content of the store. For example, the user may return to view a previously viewed item; request and/or access additional information regarding an item; examine an item more thoroughly and/or examine an item from a different perspective (e.g., by zooming in, rotating, and/or taking apart the item); dismiss and/or discard an item or group of items; and/or select an item or group of items (e.g., by adding an item to the shopping cart).

The user's interaction with the store may be monitored by an interaction analyzer. The interaction may receive information that includes a description of aspects of the user's interaction with the store. The description may enable the interaction analyzer to identify, in certain instances, an action that causes a deviation from a typical progression of presentation of content (e.g., a request by the user to reexamine an item). In one example, the interaction analyzer may be a program that runs, at least in part, on servers controlled by an owner and/or host of the store. In another example, the interaction analyzer may be a program that runs, at least in part, on hardware that belongs and/or is controlled by the user (e.g., a program that runs, at least in part, on a mobile device belonging to the user such as a smart phone). In yet another example, the interaction analyzer may be a program that runs on a cloud-based server and receives information from the store and/or the user describing aspects of the user's interaction with the store.

The interaction analyzer can forward the information regarding the identified action that causes a deviation from a typical progression of presentation of content to other elements in the system such as a label generator and/or a window selector. Depending on the type of identified action, the label generator may assign different labels. For example, if the user reexamines an item, requests additional information on an item, selects to buy an item and/or views the item from different perspectives, the assigned label may indicate interest and/or a positive attitude. If the user chooses to discard and/or skip an item, the label may indicate disinterest and/or a negative attitude towards the item. The window selector may also utilize the identified action in order to select a window in time, from which affective response measurements may be taken. For example, the window may be proportional and/or overlapping with the time during which an item, on which the identified action operates, is in the user's view and/or focus of attention. For instance, if a user requests to reexamine an item in the store, the window may correspond to the time in which the item was originally in the user's view and/or to the period in time during which the user reexamines the item. Similarly, if the user decides to skip an item presented in the store, the window may correspond to the time in which the item was in the user's view. In one example, the system utilizes eye tracking for identifying the item in the user's view.

The generated label and window are forwarded to a training module that trains a measurement ERP (Emotional Response Predictor). The training module also receives affective response measurements of the user, which at least some of which, correspond to the period of time designated by the window. For example, the affective response measurements may originate from sensors such as an image capturing device that generates images of the user's facial expression and/or gestures, an EEG sensor capable of providing data regarding the user's brainwave activity, a heart rate monitor and/or a GSR sensor. The training module can then utilize measurements taken during the window along with the label to create a sample that can be used to train and/or refine the measurement ERP (e.g., by updating a model used by the measurement ERP according to the sample). The type of samples collected using this system can capture spontaneous expressions of emotion by the user. These expressions can describe subtle signals through which an affective computing system may detect emotional responses such as when the user is interested or disinterested in items in the store. By obtaining samples collected unobtrusively in the user's natural environment and while the user is performing natural activities, it is possible to train the model on natural and spontaneous, often subtle, expressions of emotion by the user. Such training samples are not likely to be collected in controlled settings (e.g., when the user is prompted to provide a sample of the emotion), since they are often involuntary. In addition, since each user's emotional expressions are unique to a certain extent, training a measurement ERP on samples of the user is likely to increase the accuracy of the predictions for the user, compared to using a general model trained on samples that do not involve the user.

Collecting samples as described in this embodiment can enable affective computing systems to monitor a user unobtrusively (e.g., using a video camera), and detect when a user is interested in certain items and/or when the user is not interested. The systems can utilize this information to improve the user's experience. For example, by monitoring how the user browses certain items, the store can decide what items are most likely to interest the user and/or other users, and should thus be suggested next to the user and/or other users. These decisions may be made by the system without burdening the user by requesting the user to actively provide feedback regarding items examined by the user in the store. In another example, data collected by monitoring how the user interacts in a store may be used by a game running in a virtual world to detect what elements of the game the user likes or dislikes, thus enabling the game to adapt the plot and/or visual aspects of the game in order to make it more pleasing for the user.

Browsing Content on a Social Network

In one embodiment, the user may view content from a social network such as posts, status updates, images, videos, and/or other types of content directed to the user by the social network and/or other members on the social network. For example, the user may be viewing tweets on Twitter™, posts on Facebook™, videos on YouTube™, images on Instagram™, and/or reviews on Amazon™. While viewing the content, the user may interact with a media controller, which may be an application, API, or webpage belonging to the social network. The user's communications with the media controller may control some aspects of the presentation of content to the user on a media presentation device (e.g., a screen or head-mounted display on which the user views the content from the social network).

A typical progression of presentation of content to the user in this embodiment may be considered viewing social network content items, possibly serially (one item at a time), and/or examining groups of items. In the typical progression of presentation of items, the user does not focus attention on a specific item for long, and typically spends a short time, such as a few seconds sufficient to grasp what the item is about. For example, an image may be typically viewed for less than three seconds. In another example, a post comprising text may be viewed for a time that is approximately required for brisk reading or browsing of the text of the item. After viewing a content item on the social network, the user typically moves to another item without taking any specific action that may alter the flow of the presentation of content. However, while browsing the items, the user may take one or more actions that may be considered a deviation from the normal progression of the presentation of content of the social network. For example, the user may return to view a previously viewed content item; request and/or access additional information regarding an item; examine an item more thoroughly and/or examine an item from a different perspective (e.g., by zooming in, and/or rotating); hide and/or delete an item or group of items; and/or comment on and/or forward the item.

The user's interaction with the social network may be monitored by an interaction analyzer. The interaction may receive information that includes a description of aspects of the user's interaction with the social network. The description may enable the interaction analyzer to identify, in certain instances, an action that cause a deviation from a typical progression of presentation of content. In one example, the interaction analyzer may be a program that runs on servers controlled, at least in part, by the social network. In another example, the interaction analyzer may be a program that runs, at least in part, on hardware that belongs and/or is controlled by the user and/or runs on a cloud-based server. The interaction analyzer can forward the information regarding the identified action that causes a deviation from a typical progression of presentation of content to other elements in the system such as a label generator and/or a window selector. Depending on the type of identified action, the label generator may assign different labels. For example, if the user reexamines an item, comments and/or forwards a content item, and/or spends more time than the user typically spends on similar items (e.g., the user examines an image for ten seconds instead of a typical period of two seconds), the assigned label may indicate interest and/or a positive attitude. If the user chooses to skip an item, or spends less time than typically spent on a similar item (e.g., skims over a 300 word post in two seconds), the label may indicate disinterest and/or a negative attitude towards the item. The window selector may also utilize the identified action in order to select a window in time from which affective response measurements may be taken. For example, the window may be proportional and/or overlapping with the time during which an item, on which the identified action operates, was in the user's view and/or focus of attention. For instance, if a user reexamines a content item on the social network, the window may correspond to the time in which the item was in the user's view. Similarly, if the user decides to skip a content item, the window may correspond to the time in which the item was in the user's view.

The generated label and window are forwarded to a training module that trains a measurement ERP (Emotional Response Predictor). The training module also receives affective response measurements of the user, which at least some of which, correspond to the period of time designated by the window. The training module can then utilize measurements taken during the window along with the label to create a sample that can be used to train and/or refine the measurement ERP. Collecting samples as described in this embodiment can enable affective computing systems to monitor a user unobtrusively (e.g., using a video camera), and detect when the user in interested in certain items and/or when the user is not interested. The affective computing systems can utilize this information to improve the user's experience. For example, simply by monitoring how the user browses certain items on the social network, can help the social network decide how the user feels towards practically every content item. Since many users actively provide feedback only on a small portion of the items (e.g., they rarely comment or push a "like" button), a measurement ERP may be capable of providing a much more comprehensive view of the user's preferences. This comprehensive view may be utilized by the social network to improve the presentation of content to the user (e.g., determine which posts and/or which friends to feature more prominently). The social network may also utilize the feedback provided by detected emotional response in order to train a more accurate predictor of emotional response to content (a content ERP) than could be trained based on the limited feedback explicitly expressed by the user (e.g., via a "like" button). The more thoroughly trained content ERP may be utilized to select and/or adapt content for the user both from the social network, and from other sources such as selecting content from news sites, or adapting the behavior of characters in a virtual world visited by the user.

Viewing Video Content

In one embodiment, the user may view video content such as movies, television shows, and/or music videos. Optionally, the video content may be substantially produced prior to the user's viewing (e.g., a blockbuster movie). Alternatively, the content may be substantially generated on-the-fly for the user, such as a personalized commercial. While viewing the video content, the user may interact with a media controller, which may be an application and/or an API, in order to control the presentation of the video. A typical progression of presentation of content to the user in this embodiment may be considered uninterrupted viewing of the video by the user. However, while viewing a video, the user may perform certain actions that may alter the flow of the presentation of the video, thus deviating from a typical progression of presentation of content. For example, the user may perform certain control and/or editing operations such as slowing down or speeding up portions of the video, looping or repeating a portion, changing perspectives and/or camera angle, zooming in or out, closing the video stream, and/or changing a channel.

The user's interaction with the application or API controlling the presentation of the content may be monitored by an interaction analyzer. The interaction may receive information that includes a description of aspects of the user's interaction. The description may enable the interaction analyzer to identify, in certain instances, an action that cause a deviation from a typical progression of presentation of content. In one example, the interaction analyzer may be a program that runs on the servers controlled, at least in part, by provider of the video content. In another example, the interaction analyzer may be a program that runs, at least in part, on hardware that belongs and/or is controlled by the user, and/or it may run on a cloud-based server. The interaction analyzer can forward the information regarding the identified action that causes a deviation from a typical progression of presentation of content to other elements in the system such as a label generator and/or a window selector. Depending on the type of identified action, the label generator may assign different labels. For example, if the user slows a portion of video, repeats a portion, changes a perspective, and/or zooms in or out, the assigned label may indicate interest and/or a positive attitude. If the user chooses to stop a video, change a channel, skip a portion, and/or speed up the playing of the video, the generated label may indicate disinterest and/or a negative attitude towards the video. The window selector may also utilize the identified action in order to select a window in time from which affective response measurements may be taken. For example, the window may be proportional and/or overlapping with the time during which a video is played. For instance, if the user loops on a certain portion of video, the window may correspond to the duration of the portion. In another example, the window may have a fixed length, essentially ending when the action takes place. For instance, if the action involves the user closing a video before it ends or changing a channel, the window may be selected to correspond to period starting five seconds before the action was performed and ending essentially when the action was performed.

The generated label and window are forwarded to a training module that trains a measurement ERP (Emotional Response Predictor). The training module also receives affective response measurements of the user, which at least some of which, correspond to the period of time designated by the window. The training module can then utilize measurements taken during the window along with the label to create a sample that can be used to train and/or refine the measurement ERP. Collecting samples as described in this embodiment can enable affective computing systems to monitor a user unobtrusively (e.g., using a heart rate monitor, GSR sensor, EEG, and/or video camera), and detect when a user in interested in certain video content and/or when the user is not interested. The systems can utilize this information to improve the user's experience. For example, simply monitoring how the user watches videos, can help detect how the user feels towards the content at practically any time. This can help the affective computing system determine which programs, elements, characters, and/or genres the user likes and select and/or adapt content for the user accordingly. Since the samples collected by this system may involve spontaneous, often subtle, expressions of emotion, models trained with the collected samples are more likely to enable accurate predictions of the user's emotional response; this is compared to general models that are not trained on samples involving the user, and thus may not be able to detect unique aspects of the user's expression of emotions. Being able to accurately predict how the user feels towards content can help the system to proactively select and adapt personalized content for users.

While the above embodiments described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, including hand-held devices, multiprocessor systems, microprocessor-based or programmable consumer electronics, minicomputers, mainframe computers, and comparable computing devices. The embodiments may also be practiced in a distributed computing environment where tasks are performed by remote processing devices that are linked through a communications network. In a distributed computing environment, program components may be located in both local and remote memory storage devices.

Embodiments may be implemented as a computer-implemented process, a computing system, or as an article of manufacture, such as a computer program product or computer readable media. The computer program product may be a computer storage medium readable by a computer system and encoding a computer program that comprises instructions for causing a computer or computing system to perform example processes. The computer-readable storage medium can for example be implemented via one or more of a volatile computer memory, a non-volatile memory, a hard drive, a flash drive, a disk, a compact disk, and/or comparable media.

Throughout this specification, references are made to services. A service as used herein describes any networked/on line applications that may receive a user's personal information as part of its regular operations and process/store/forward that information. Such applications may be executed on a single computing device, on multiple computing devices in a distributed manner, and so on. Embodiments may also be implemented in a hosted service executed over a plurality of servers or comparable systems. The term "server" generally refers to a computing device executing one or more software programs typically in a networked environment. However, a server may also be implemented as a virtual server (software programs) executed on one or more computing devices viewed as a server on the network. Moreover, embodiments are not limited to personal data. Systems for handling preferences and policies may be implemented in systems for right management and/or usage control using the principles described above.

Herein, a predetermined value, such as a predetermined confidence level or a predetermined threshold, is a fixed value and/or a value determined any time before performing a calculation that compares its result with the predetermined value. A value is also considered to be a predetermined value when the logic used to determine a threshold is known before start calculating the threshold.

In this description, references to "one embodiment" mean that the feature being referred to may be included in at least one embodiment of the invention. Moreover, separate references to "one embodiment" or "some embodiments" in this description do not necessarily refer to the same embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements.

While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in one embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, it is intended to embrace all such alternatives, modifications, and variations that fall within the spirit and scope of the appended claims and their equivalents.

What is claimed is:

1. A system configured to collect naturally expressed affective responses for training an emotional response predictor utilizing voting on content, comprising:
a voting mechanism configured to receive a vote from a user upon the user consuming a segment of content; wherein the user provides the vote via one or more of the following mechanisms: a like voting mechanism, a dislike voting mechanism, a star rating mechanism, a numerical rating mechanism, an up voting mechanism, a down voting mechanism, a ranking mechanism, and a mechanism for entering comments comprising data representing text;
a label generator configured to receive the vote and an indication of a duration during which the user consumed the segment of content; the label generator is further configured to: determine that the duration is shorter than a predetermined threshold, and utilize the vote to generate a label related to an emotional response to the segment; and
a training module configured to receive the label and an affective response measurement of the user taken with a sensor coupled to the user while the user consumed the segment of content, and to train the emotional response predictor with the measurement and the label; wherein the measurement is taken, at least in part, during a period that starts at most 30 seconds before the vote is provided.

2. The system of claim 1, wherein the voting mechanism is a voting mechanism belonging to a social network, and the predetermined threshold is less than 15 seconds.

3. The system of claim 1, wherein the voting mechanism is offered independently of whether the vote is used to trigger a sensor to acquire the naturally expressed affective responses.

4. The system of claim 3, wherein the period at which the affective response measurement is taken ends at most 10 seconds after the vote is provided.

5. The system of claim 3, wherein the voting mechanism is configured to enable the user to enter a comment comprising data representing text; and wherein the label generator is further configured to perform semantic analysis on the text in order to generate the label.

6. The system of claim 1, wherein the system is configured not to forward to the training module a second affective response measurement that does not have a corresponding label generated from a vote.

7. The system of claim 1, wherein the label generator is further configured to suggest to the training module a training weight for the affective response measurement of the user.

8. The system of claim 1, wherein the label generator is further configured to receive data derived from an analysis of the segment of content, and to utilize the data to generate the label.

9. The system of claim 1, wherein the label generator is further configured to receive an estimated label based on affective responses of other users to the segment of content, and to utilize the estimated label to generate the label.

10. The system of claim 1, wherein at least one affective response measurement that has a corresponding label generated from a vote, and at least one affective response measurement that does not have a corresponding label generated from a vote, are affective response measurements of the user to content provided by the same friend of the user on a social network.

11. The system of claim 1, wherein the training module is further configured to apply a training weight to a first affective response measurement that has a corresponding label generated from a vote that is at least double the training weight applied to a second affective response measurement that does not have a corresponding label generated from a vote.

12. A method for collecting naturally expressed affective responses for training an emotional response predictor utilizing voting on content, comprising:
receiving a vote from a user upon the user consuming a segment of content; wherein the user provides the vote via a voting mechanism; and wherein the voting mechanism comprises one or more of the following: a like voting mechanism, a dislike voting mechanism, a star rating mechanism, a numerical rating mechanism, an up voting mechanism, a down voting mechanism, a ranking mechanism, and a mechanism for entering comments comprising data representing text;
receiving an indication of a duration during which the user consumed the segment of content;
determining that the duration is shorter than a predetermined threshold, and utilizing the vote for generating a label related to an emotional response to the segment;
receiving an affective response measurement of the user taken with a sensor coupled to the user while the user consumed the segment of content; wherein the measurement is taken, at least in part, during a period that starts at most 30 seconds before the vote is provided; and
training the emotional response predictor with the label and the affective response measurement.

13. The method of claim 12, wherein the voting mechanism is a voting mechanism belonging to a social network, and the voting mechanism is offered independently of whether the vote is used to trigger a sensor to acquire the affective response measurements.

14. The method of claim 13, wherein the period at which the affective response measurement is taken ends at most 10 second after the vote is made.

15. The method of claim 13, wherein the voting mechanism enables the user to enter a comment comprising data representing text, and generating the label involves performing semantic analysis on the text.

16. The method of claim 12, further comprising suggesting a training weight for the affective response measurement of the user.

17. The method of claim 12, wherein the training of the emotional response predictor further comprises applying a training weight to a first measurement that has a corresponding label generated from a vote that is at least double the training weight applied to a second measurement that does not have a corresponding label generated from a vote.

18. The method of claim 12, further comprising receiving data derived from an analysis of the content and utilizing the data to generate the label.

19. The method of claim 12, further comprising receiving a comment provided by the user comprising data representing text, and generating the label by performing semantic analysis on the text.

20. A non-transitory computer-readable medium for use in a computer to collect naturally expressed affective responses for training an emotional response predictor utilizing voting on content; the computer comprises a processor, and the non-transitory computer-readable medium comprising:
program code for receiving a vote from a user upon the user consuming a segment of content; wherein the user provides the vote via a voting mechanism; and wherein the voting mechanism comprises one or more of the following: a like voting mechanism, a dislike voting mechanism, a star rating mechanism, a numerical rating mechanism, an up voting mechanism, a down voting mechanism, a ranking mechanism, and a mechanism for entering comments comprising data representing text;

program code for receiving an indication of a duration during which the user consumed the segment of content;

program code for determining that the duration is shorter than a predetermined threshold, and for utilizing the vote for generating a label related to an emotional response to the segment;

program code for receiving an affective response measurement of the user taken with a sensor coupled to the user while the user consumed the segment of content;

wherein the measurement is taken, at least in part, during a period that starts at most 30 seconds before the vote is provided; and program code for training the emotional response predictor with the label and the affective response measurement.

* * * * *